(12) United States Patent
Chuang et al.

(10) Patent No.: US 10,306,186 B2
(45) Date of Patent: *May 28, 2019

(54) IMAGING SYSTEMS AND METHODS FOR IMMERSIVE SURVEILLANCE

(71) Applicant: Massachusetts Institute of Technology, Cambridge, MA (US)

(72) Inventors: Daniel B. Chuang, Cambridge, MA (US); Lawrence M. Candell, Arlington, MA (US); William D. Ross, Westford, MA (US); Mark E. Beattie, Westford, MA (US); Cindy Y. Fang, Arlington, MA (US); Bobby Ren, Cambridge, MA (US); Jonathan P. Blanchard, Sterling, MA (US); Gary M. Long, Jr., Lowell, MA (US); Lauren L. White, Burlington, MA (US); Svetlana V. Panasyuk, Lexington, MA (US); Mark Bury, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 495 days.

This patent is subject to a terminal disclaimer.

(21) Appl. No.: 14/639,244

(22) Filed: Mar. 5, 2015

(65) Prior Publication Data

US 2015/0271453 A1 Sep. 24, 2015

Related U.S. Application Data

(62) Division of application No. 13/327,416, filed on Dec. 15, 2011, now Pat. No. 9,007,432.
(Continued)

(51) Int. Cl.
*H04N 7/18* (2006.01)
*H04N 5/247* (2006.01)
(Continued)

(52) U.S. Cl.
CPC ......... *H04N 7/181* (2013.01); *G08B 13/1968* (2013.01); *G08B 13/19619* (2013.01);
(Continued)

(58) Field of Classification Search
None
See application file for complete search history.

(56) References Cited

U.S. PATENT DOCUMENTS 5,023,725 A 6/1991 McCutchen
5,067,019 A 11/1991 Juday
(Continued)

OTHER PUBLICATIONS

Immersive Media, "Dodeca 2360 Camera System", www.immersivemedia.com; 2011 Immersive Media Corp.
(Continued)

*Primary Examiner* — Kate H Luo
(74) *Attorney, Agent, or Firm* — Smith Baluch LLP

(57) ABSTRACT

Security guards at large facilities, such as airports, monitor multiple screens that display images from individual surveillance cameras dispersed throughout the facility. If a guard zooms with a particular camera, he may lose image resolution, along with perspective on the surrounding area. Embodiments of the inventive Imaging System for Immersive Surveillance (ISIS) solve these problems by combining multiple cameras in one device. When properly mounted, example ISIS systems offer up to 360-degree, 240-megapixel views on a single screen. (Other fields of view and resolutions are also possible.) Image-stitching software merges multiple video feeds into one scene. The system also allows operators to tag and follow targets, and can monitor restricted areas and sound an alert when intruders breach them.

15 Claims, 42 Drawing Sheets

Related U.S. Application Data

(60) Provisional application No. 61/423,938, filed on Dec. 16, 2010.

(51) Int. Cl.
*H04N 5/341* (2011.01)
*H04N 5/232* (2006.01)
*G08B 13/196* (2006.01)

(52) U.S. Cl.
CPC . *G08B 13/19628* (2013.01); *G08B 13/19682* (2013.01); *H04N 5/23238* (2013.01); *H04N 5/247* (2013.01); *H04N 5/3415* (2013.01); *G08B 13/19608* (2013.01)

(56) References Cited

U.S. PATENT DOCUMENTS

| | | | |
|---|---|---|---|
| 5,068,735 A | 11/1991 | Tuchiya | |
| 5,764,276 A | 6/1998 | Martin | |
| 5,877,801 A | 3/1999 | Martin | |
| 5,903,319 A | 5/1999 | Busko | |
| 5,990,941 A | 11/1999 | Jackson | |
| 6,002,430 A | 12/1999 | McCall | |
| 6,141,034 A | 10/2000 | McCutchen | |
| 6,147,709 A | 11/2000 | Martin | |
| 6,201,574 B1 | 3/2001 | Martin | |
| 6,243,131 B1 | 6/2001 | Martin | |
| 6,256,061 B1 | 7/2001 | Martin | |
| 6,301,447 B1 | 10/2001 | Jackson | |
| 6,757,008 B1* | 6/2004 | Smith | H04N 5/225 348/143 |
| 6,782,294 B2 | 8/2004 | Reich | |
| 6,795,113 B1 | 9/2004 | Jackson | |
| 6,895,557 B1 | 5/2005 | Wood | |
| 6,947,059 B2 | 9/2005 | Pierce | |
| 7,009,645 B1 | 3/2006 | Sandini | |
| 7,015,949 B1 | 3/2006 | Sah | |
| 7,023,913 B1 | 4/2006 | Monroe | |
| 7,024,488 B1 | 4/2006 | Sah | |
| 7,076,085 B1 | 7/2006 | Sah | |
| 7,119,961 B2 | 10/2006 | Yoshikawa | |
| 7,148,914 B2 | 12/2006 | Bronson | |
| 7,177,448 B1 | 2/2007 | Sah | |
| 7,312,820 B2 | 12/2007 | Zimmermann | |
| 7,388,982 B2 | 6/2008 | Endo | |
| 7,492,390 B2 | 2/2009 | Kaplinsky | |
| 7,492,391 B1 | 2/2009 | Kaplinsky | |
| 7,532,975 B2 | 5/2009 | Ishikawa | |
| 7,543,327 B1 | 6/2009 | Kaplinsky | |
| 7,548,258 B2 | 6/2009 | Kaplinsky | |
| 7,599,550 B1 | 10/2009 | Kaplinsky | |
| 7,623,152 B1 | 11/2009 | Kaplinsky | |
| 7,680,192 B2 | 3/2010 | Kaplinsky | |
| 7,750,936 B2 | 7/2010 | Provinsal | |
| 7,865,013 B2 | 1/2011 | Hack | |
| 7,903,871 B2 | 3/2011 | Kaplinsky | |
| 8,013,899 B2 | 9/2011 | Gillard | |
| 2002/0075258 A1* | 6/2002 | Park | H04N 5/232 345/419 |
| 2003/0026588 A1 | 2/2003 | Elder et al. | |
| 2003/0071891 A1* | 4/2003 | Geng | H04N 5/2259 348/39 |
| 2003/0095338 A1* | 5/2003 | Singh | G02B 13/06 359/725 |
| 2005/0071047 A1 | 3/2005 | Okabayashi et al. | |
| 2005/0084136 A1* | 4/2005 | Xie | G06F 17/30905 382/107 |
| 2005/0207487 A1* | 9/2005 | Monroe | G08B 13/19628 375/240.01 |
| 2006/0028550 A1 | 2/2006 | Palmer | |
| 2006/0033813 A1 | 2/2006 | Provinsal | |
| 2006/0069189 A1 | 3/2006 | Yang | |
| 2006/0125921 A1 | 6/2006 | Foote | |
| 2006/0197839 A1* | 9/2006 | Senior | H04N 5/232 348/169 |
| 2007/0070190 A1* | 3/2007 | Yin | G08B 13/19626 348/36 |
| 2007/0109407 A1 | 5/2007 | Thompson | |
| 2007/0182819 A1 | 8/2007 | Monroe | |
| 2007/0188653 A1 | 8/2007 | Pollock | |
| 2008/0117288 A1* | 5/2008 | Park | B60R 1/00 348/36 |
| 2008/0143842 A1 | 6/2008 | Gillard | |
| 2008/0170140 A1 | 7/2008 | Silver | |
| 2008/0192116 A1 | 8/2008 | Tamir et al. | |
| 2009/0058988 A1 | 3/2009 | Strzempko et al. | |
| 2009/0073254 A1* | 3/2009 | Li | G03B 17/00 348/36 |
| 2009/0122175 A1 | 5/2009 | Yamagata | |
| 2009/0290033 A1* | 11/2009 | Jones | G08B 13/19693 348/218.1 |
| 2009/0295924 A1 | 12/2009 | Peters | |
| 2009/0317020 A1 | 12/2009 | Gerhard et al. | |
| 2009/0322874 A1* | 12/2009 | Knutson | G08B 13/196 348/143 |
| 2010/0002070 A1* | 1/2010 | Ahiska | G08B 13/19691 348/36 |
| 2010/0002082 A1* | 1/2010 | Buehler | G08B 13/19645 348/159 |
| 2010/0026822 A1 | 2/2010 | Hahm | |
| 2010/0040297 A1 | 2/2010 | Ohba et al. | |
| 2010/0045773 A1 | 2/2010 | Ritchey | |
| 2010/0129000 A1 | 5/2010 | Strom | |
| 2010/0165134 A1 | 7/2010 | Dowski | |
| 2010/0287161 A1* | 11/2010 | Naqvi | G06K 9/00771 707/740 |
| 2010/0321471 A1 | 12/2010 | Casolara | |
| 2011/0050929 A1 | 3/2011 | Lee | |
| 2011/0069148 A1 | 3/2011 | Jones | |
| 2011/0069189 A1 | 3/2011 | Venkataraman | |
| 2011/0128393 A1 | 6/2011 | Tavi | |
| 2012/0242788 A1 | 9/2012 | Chuang et al. | |

OTHER PUBLICATIONS

International Search Report and Written Opinion issued in PCT/US2010/060822 dated Jan. 10, 2012.
International Preliminary Report on Patentability in PCT/US2010/060822 dated Jun. 18, 2013, 7 pages.
Non-Final Office Action in related U.S. Appl. No. 13/438,693, filed Apr. 3, 2012, dated Aug. 15, 2014, 10 pages.

* cited by examiner

VIEWER 1100

VIDEO RECORD
DIALOG BOX

IMAGING SYSTEMS AND METHODS FOR IMMERSIVE SURVEILLANCE

CROSS-REFERENCE TO RELATED PATENT APPLICATIONS

This application claims the benefit, under 35 U.S.C. § 121, as a divisional application of U.S. non-provisional application Ser. No. 13/327,416, filed on Dec. 15, 2011, entitled "Imaging Systems and Methods for Immersive Surveillance", which application in hereby incorporated herein by reference in its entirety. Ser. No. 13/327,416 in turn claims benefit, under 35 U.S.C. § 119(e), of U.S. Provisional Application No. 61/423,938, filed on Dec. 16, 2010, and entitled "Imaging System for Immersive Surveillance," which application is hereby incorporated herein by reference in its entirety.

GOVERNMENT SUPPORT

This invention was made with Government support under Contract FA8721-05-C-0002 awarded by the U.S. Air Force. The Government has certain rights in the invention.

BACKGROUND

In order to provide video surveillance of a wide area at high resolution, a conventional surveillance system employs many cameras, each emplaced at a different location throughout the scene being surveilled. Each camera has its own pan, tilt and zoom mechanism, and is connected to its own video feed at a video operator control console.

This approach has several problems. First, the spatial resolution of available cameras is not fine enough to cover a wide area at high resolution. Thus, the user must choose whether to zoom in or out using a particular camera. Zooming out provides wide area coverage, but makes the resolution insufficient to identify faces or other important features. Zooming in provides high resolution images, but creates significant gaps in video surveillance coverage of the scene. Furthermore, tying each camera to an individual video view creates many disparate views of the scene, which can be confusing and overwhelming for a single end user or require multiple users to monitor.

In addition, the spatial resolution of images acquired by conventional surveillance systems varies with the distance to the target and the particular optical arrangement of the cameras. Thus, not all imagery collected by conventional surveillance systems is suitable for target tracking, pattern (face) recognition, etc.

SUMMARY

Embodiments of the present invention include a system for monitoring a wide-area scene and corresponding method of monitoring a wide-area system. An illustrative system includes an array of first cameras and an array of second cameras. Each first camera has a first field of view, and each second camera has a second field of view that is different than the first field of view. In another example, the first field of view may be a first angular field of view, and the second field of view may be a second angular field of view that is smaller than the first angular field of view. The array of first cameras and the array of second cameras acquire first imagery and second imagery, respectively, which is used to form an image of the wide-area scene.

An alternative embodiment include a surveillance system comprising an array of first cameras, an array of second cameras, a processor, a server, and an interface. Each first camera has a first angular field of view and is configured to provide respective first real-time imagery of a corresponding portion of the wide-area scene. Similarly, each second camera has a second angular field of view different (e.g., smaller) than the first angular field of view and is configured to provide respective second real-time imagery of a corresponding portion of the wide-area scene. The processor is operably coupled to the array of first cameras and the array of second cameras and is configured to decompose the first real-time imagery and the second real-time imagery into image tiles and to compress the image tiles at each of a plurality of resolutions. The server, which is operably coupled to the processor, is configured to serve one or more image tiles at one of the plurality of resolutions in response to a request for an image of a particular portion of the wide-area scene. An interface communicatively coupled to the server (e.g., via a communications network) is configured to render a real-time image of the wide-area scene represented by the one or more image tiles.

Still another embodiment includes a (computer) method of compressing, transmitting, and, optionally, rendering image data. A processor decomposes images into image tiles and compresses the image tiles at each of a plurality of resolutions. The processor, or a server operably coupled to the processor, serves one or more image tiles at one of the plurality of resolutions in response to a request for an image of a particular portion of the wide-area scene. Optionally, an interface communicatively coupled to the server (e.g., via a communications network) renders a real-time image of the wide-area scene represented by the one or more image tiles.

Yet another embodiment includes a (computer) method of determining a model representing views of a scene from cameras in an array of cameras, where each camera in the array of cameras has a field of view that overlaps with the field of view of another camera in the array of cameras. For each pair of overlapping fields of view, a processor selects image features in a region common to the overlapping fields of view and matches points corresponding to a subset of the image features in one field of view in the pair of overlapping fields of view to points corresponding the subset of the image features in the other field of view in the pair of overlapping fields to form a set of matched points. Next, the processor merges at least a subset of each set of the matched points to form a set of merged points. The processor then estimates parameters associated with each field of view based on the set of merged points to form the model representing the views of the scene.

Still another embodiment includes a (computer) method of compensating for imbalances in color and white levels in color images of respective portions of a wide-area scene, where each color image comprises red, green, and blue color channels acquired by a respective camera in a camera array disposed to image the wide-area scene. A processor normalizes values representing the red, green, and blue color channels to a reference value representing a response of the cameras in the camera array to white light. The processor equalizes the values representing the red, green, and blue color channels to red, green, and blue equalization values, respectively, then identifies high- and low-percentile values among each of the red, green, and blue color channels. The processor scales each of the red, green, and blue color channels based on the high- and low-percentile values to provide compensated values representing the red, green, and blue color channels.

A yet further embodiment comprises a calibration apparatus suitable for performing white and color balancing of a sensor array or camera head. An illustrative calibration apparatus includes a hemispherical shell of diffusive material with a first surface that defines a cavity to receive the sensor array or camera head. The illustrative calibration apparatus also includes a reflective material disposed about a second surface of hemispherical shell of diffusive material. One or more light sources disposed between the hemispherical shell of diffusive material and the reflective material are configured to emit light that diffuses through the hemispherical shell of diffusive material towards the cavity.

A further embodiment includes an interface for a surveillance system that monitors a scene. The interface may include a full-scene view configured to render a real-time panoramic image of the entire scene monitored by the surveillance system and a zoom view configured to render a close-up of a region of the panoramic view. In at least one example, the full-scene view and/or the zoom view may display a pre-warped image. An illustrative interface may optionally be configured to enable a user to select a region of the scene in the full-scene view for display in the zoom view. An illustrative interface may also be configured to enable a user to set a zone in the panoramic image to be monitored for activity and, optionally, to alert the user upon detection of activity in the zone. The illustrative interface may further populate an activity database with an indication of detected activity in the zone; the illustrative interface may also include an activity view configured to display the indication of detected activity to the user in a manner that indicates a time and a location of the detected activity and/or to display images of detected activity in the full-scene view and/or the zoom view. An exemplary interface may be further configured to track a target throughout the scene and to display an indication of the target's location in at least one of the full-scene view and the zoom view, and, further optionally, to enable a user to select the target.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
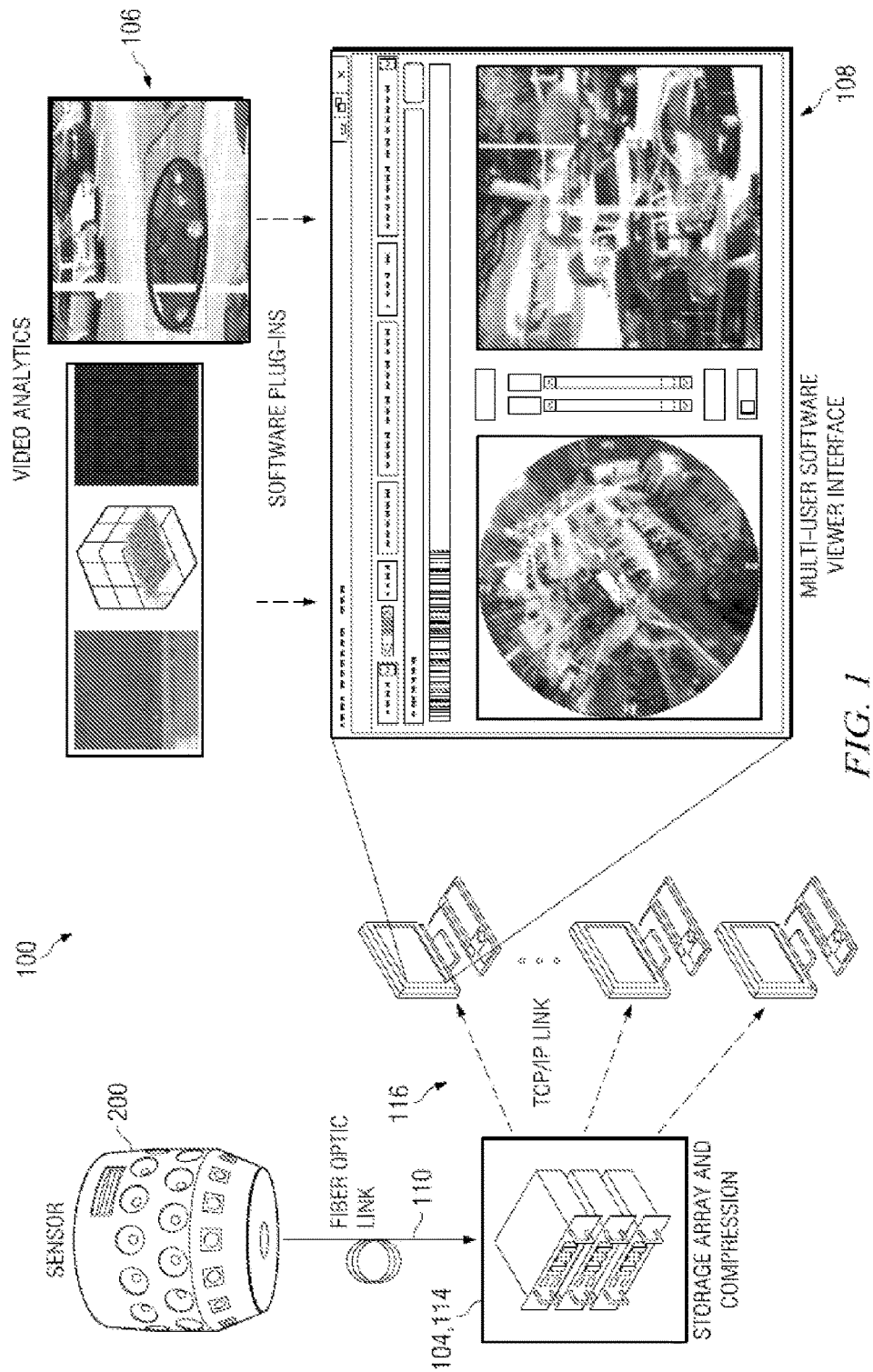
FIG. 1 is a diagram that illustrates an imaging system for immersive surveillance (ISIS) and major ISIS components according to an embodiment of the present invention.

A description of example embodiments of the invention follows. The teachings of all patents, published applications and references cited herein are incorporated by reference in their entirety.

An Imaging System for Immersive Surveillance (ISIS) is a video surveillance system that provides wide-area, persistent surveillance from a single vantage point. The system provides 360-degree video surveillance coverage in the scene by being mounted to a ceiling, tower or wall. Example applications of the system include supporting security personnel in maintaining situational awareness in an area, aiding operators in real-time decision-making, and providing a comprehensive and high-resolution record of all activity in an area of interest.

The system has other applications as well, including but not limited to the provision of operational support for facilities operators, and the acquisition of high resolution video coverage for media applications. For example, an ISIS could be used for military base protection, port security, border security, airport security, and/or casino security. An ISIS could be used at train and subway stations, indoor and outdoor stadiums, shopping malls, entertainment venues, theme parks, convention centers, and even refugee centers.

Exemplary ISIS systems can also be used for sports, entertainment, and news broadcasting. For instance, a portable ISIS system can be used instead of or as a supplement to a conventional camera crew to provide coverage of sporting events, parades, and breaking news. An ISIS system mounted in baseball or football stadium or hung from the ceiling of a basketball arena can provide real-time, 360-degree coverage of the entire field or court. ISIS can provide such coverage to multiple viewers simultaneously. The "virtual camera" features of ISIS mimic the pan/tilt/zoom (PTZ) functionality of conventional video cameras and allow television producers—and even individual viewers—to zoom in, zoom out, or follow particular sections of the shot. Exemplary ISIS systems give fans instant replay on demand, enable referees to review close calls, and allow investigators to track the movements of suspects through crowded areas.

ISIS unifies two or more arrays of cameras (each of which includes a lens and a detector array), custom image processing, custom hardware compression boards, a smart compression architecture and parallel processing to provide wide-area (e.g., 180°, 270°, or 360°) scene surveillance at a spatial resolution sufficient to identify a human face out to a radius of 10, 25, 50, 75, 100, or even 200 meters in all directions simultaneously. In some embodiments, the spatial resolution is about 0.5 cm, 1.0 cm, 1.2 cm, 1.5 cm, 2 cm, 13 cm, 20 cm, or 50 cm. As understood by those of skill in the art, 1.2 cm resolution is sufficient to recognize a person's face, 0.5 cm resolution is enough to read a license plate, 13 cm resolution is sufficient to identify a car, 20 cm resolution allows motion detection for people, and 50 cm resolution allows motion detection for cars.

To provide this kind of wide-area coverage, most surveillance systems use many cameras with individual pan/tilt/zoom mechanisms emplaced at various points throughout the scene. This approach means that each camera provides either a wide field of view at low resolution, which makes it difficult or impossible to identify individuals, or a narrow field of view at high resolution, which means that situational awareness outside the field of view is lost. The ISIS sensor provides both wide area coverage and high resolution in a single sensor.

Furthermore, existing camera systems tie each individual camera to a single discrete view at a control center, where each operator monitors one or more camera views. As the ability of an operator to adequately monitor separately presented views from multiple cameras decreases as the number of views increases, increasing the number of camera views leads to increases in the number of operators required to man the control center. In contrast, ISIS combines imagery from many cameras into a single, continuous image that appears to the end user as if it were a from a single lens-imager combination. As a result, ISIS enables a single user to monitor an entire wide-area scene—the number of users does not scale with the number of cameras (or the camera resolution). In some embodiments, an ISIS interface may extract and present sub-regions of the single, continuous image in separate windows so that the number of displays in an ISIS system scales with the number of events of interest in a scene. In addition, adding cameras or improving spatial resolution does not necessarily increase the complexity of an illustrative ISIS use interface.

An exemplary ISIS system may include a very large number (e.g., 100 million, 120 million, 240 million, or 480 million) of individual sensing elements (pixels) to provide fine spatial resolution throughout the wide-area scene. The use of inexpensive imagers, lenses, and custom electronic boards that can be manufactured a low cost in quantity, combined with the use of a single installation point means that the cost per pixel is very low compared to other surveillance solutions. Further, the unification of an illustrative ISIS systems into a complete, end-to-end, transportable platform means that the solution is cost effective, quickly deployable and bypasses the need for a system integration effort in which similar components are purchased separately.

An exemplary ISIS system may also provide a memory, or data storage, solution that is capable of handling these very high data rates (e.g., 240 million pixels at eight frames per second). ISIS also provides a tiled, multi-resolution compression scheme, accelerated through hardware-based compression in combination with an image client-server architecture, that allows for efficient bandwidth usage and fast playback speeds.

Finally, embodiments of ISIS provide a combination of image processing, viewer software design, and video analytics that enable the user to interact with the very large data in an efficient way. An illustrative ISIS viewer gives one or more users the ability to maintain wide-area situational awareness with a contextual view while simultaneously viewing different parts of the scene at high resolution through the means of the virtual pan/tilt/zoom view of the scene. Automated detection and tracking of moving objects in the scene can cue users to activity of interest instead of requiring an active search of the scene for activity.

Overview of ISIS

FIG. 1 is a diagram of an ISIS system 100 showing major ISIS components: a high-resolution camera head 200 (also called a sensor assembly 200); a video data compression server array 104 and storage array 114; a video analytics engine 106; and a multi-user video data interface 108. The camera head 200 can be mounted at a position that provides mostly unobstructed views of the scene, such as on a ceiling, tower or wall. In one example, the camera head 200 includes two or more arrays of cameras selected to image a wide-area scene from a height of approximately 30 feet, although different mount heights are possible. Image data, such as real-time video data, from the camera head 200 is transmitted to an array of computers or "servers" 104 over a bundle of fiber optic cables 110. Fiber optic cables 110 provide high bandwidth transmissions over distances as short as several feet or as long as several kilometers. In one example, a bundle of 32 fibers 110 provides a 100 Gbps link from the camera head 200 to an array of server computers 104 and an associated hard drive array 114.

The server computers 104 compress the video data using hierarchical image compression (described below) and write the compressed to an array of disks 114. The servers 104 also serving image and video data to video data viewer interfaces 108 resident on respective client computers. The client computers include the data browsing interfaces 108 that are connected to the data servers 104 by a transmission control protocol/internet protocol (TCP/IP) connection 116. This connection may be Ethernet (copper), fiber, or wireless in nature. Multiple clients may connect to the servers 104 simultaneously, providing multiple users with simultaneous access to both current and past image data.

While the system 100 described below uses a wired, gigabit ethernet link 116, the link 116 between the server cluster 104 and client PC/interface 108 may be any packet-switching based network, including wireless and wired links. A wireless link may make a physical connection between the client PCs and server cluster 104 unnecessary, for example. Other links, for example, free space optical links, can also be used as understood by those of skill in the art.

The video data browsing interface also includes or is operably coupled to a video processing (analytics) engine 106 responsible for providing automated activity detection and image registration, and can incorporate external video analytics software as well. This video processing engine 106 may also run on the server computers 104.

Camera Head

The camera head 200 includes two or more arrays of cameras arranged to provide imagery of substantially all of a wide-area scene. Each camera in the camera head 200 includes a lens that images a respective portion of the wide-area scene onto a detector, such as a charge-coupled device (CCD), complementary metal-oxide-semiconductor (CMOS) array, bolometer array, or any other suitable detector (or combination of detectors). The detector may detect visible, infrared, or ultraviolet radiation. In the example below, the camera head includes a total of forty-eight cameras arranged in two different arrays, or tiers. Each camera includes a lens, a five-megapixel detector array, and associated electronics. Depending on both the application and the geometry of the scene, different numbers of imagers and a different number of pixels per imager may be used.

The lens and detector array of each camera are selected to provide a particular field of view of the wide-area scene. Each camera's field of view may be characterized as an angular field of view, which is the range of angles detected by the camera, or as a linear (or areal) field of view, which the length (or area) of the portion of the scene detected by the camera. The angular field of view depends on the lens and the detector array and is independent of the scene, whereas the linear field of view depends on the angular field of view and the distance from the camera to the scene. Depending on the embodiment, an ISIS camera head may includes cameras whose fields of view ranges from about 1-2 degrees to as high as 360 degrees. Each camera's field of view overlaps with the field of view of at least one other camera in the array to provide spatially continuous monitoring of the wide-are scene. In some examples, each camera's field of view overlaps with the fields of view of the neighboring cameras in the arrays of cameras.

The angular field of view of each camera in the camera head is chosen (e.g., by selecting a lens of a particular focal length) to provide relatively uniform spatial resolution throughout substantially all of the wide-area scene. As described in more detail below, each cameras in one array of cameras may have a relatively narrow angular field of view (e.g., about 10° to about 30°) and may be positioned to image portion of the scene that is relatively far away from the camera head (e.g., a portion of the horizon). Each camera in another array of cameras may have a relative wide angular field of view (e.g., about 30° to about 60°) and may be positioned to image a portion of the scene that is relatively close to the camera head (e.g., a portion of the scene below the camera head). In general, the variation in angular field of view as a function of camera position yields progressively varying angular resolution across the scene; in turn, this yields images having a spatial resolution that is optimally designed for the geometry of the surveilled scene.

Figure 2A:
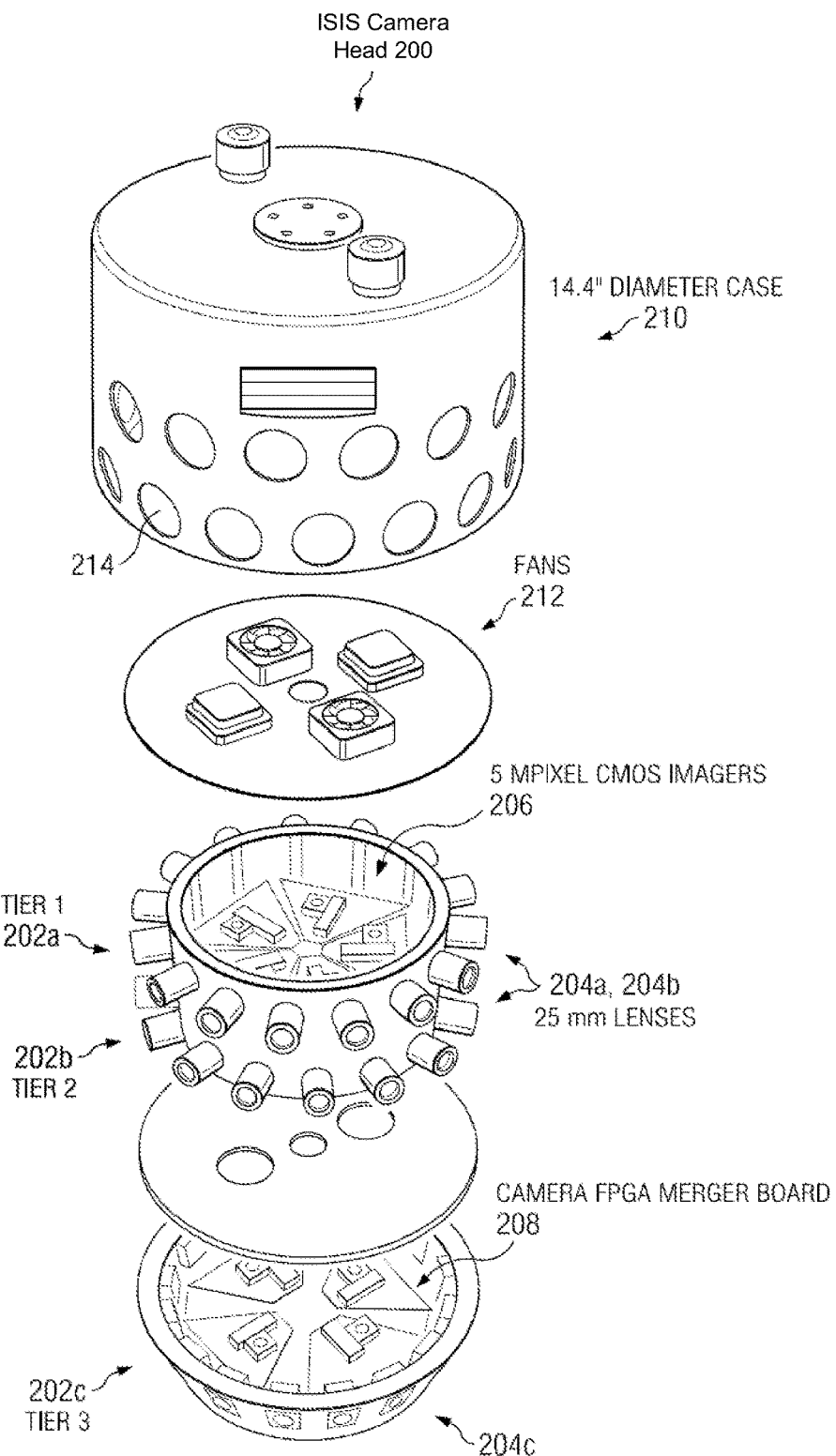
FIG. 2A is an exploded view of an ISIS camera head according to an embodiment of the present invention.

FIG. 2A shows an example camera head 200 that contains three arrays (tiers) 202a, 202b, and 202c (collectively, arrays 202), each with its own group of lenses 204a, 204b, and 204c (collectively, lenses 204), imager boards 206, and camera merger boards 208. Each lens 204/imager 206 pair forms a respective camera. In some embodiments, the frame to which the lenses 204 and electronics 206, 208 are mounted is made of Duraform GF, a glass-filled nylon material, formed by a technique called selective laser sintering (SLS), a type of three-dimensional printing. The use of SLS as a manufacturing technique allowed more complex structures to be fabricated than through other methods. For example, a five-axis CNC (computer numerical controls) machine cannot be controlled as precisely as an SLS machine. One example of such a structure is the set of imager board insets 206 on the inside of each array 202, which may be difficult to machine using more traditional methods. The use of a rapid prototyping methodology like SLS also can reduce production times, for example, from several months to one week. The imagers 206 and merger boards 208 are mounted in a protective case 210, which also encloses fans 212 used to cool the electronics in the camera head 200.

The top two arrays 202a, 202b are capped by an aluminum plate that holds two ventilation fans 212 which blow the air out of the casing. Also resident on the plate are two 150 W power supplies and an RJ-45 power connector for the boards. Removing the plate breaks the power connection to reduce the risks of accidental electrocution and human contact with the internal electronics.

Another aluminum plate, attached to the support rods, provides structural support and separates the second array 202b from the third array 202c. This additional plate holds two additional fans which move the air upwards from the third tier up into the top two tiers. The third array 202c holds eighteen lens-imager pairs (cameras). Sixteen of the lenses 204c are 9.6-mm lenses, which provide coverage of the scene between approximately 10 and 50 meters from the sensor. In one embodiment, the camera head 200 includes another array of two cameras with 1.27 mm lenses mounted towards the bottom of the camera head 200. Alternatively, or in addition, one imager 206 is paired with a 2.6-mm lens, which provides coverage of the scene from 0 to 10 meters from the sensor, and another imager 206 is paired with a 1.1 mm lens (i.e., a fisheye lens) to provide full 360-degree coverage of the scene, providing reference imagery for image registration.

A 13.5-inch diameter case 210 covers the top two arrays 202a, 202b. This case 210 also contains transparent windows 214 that provide limited resistance to moisture and outdoor weather conditions. The case 210 contains two vents to allow the hot air being blown out of the camera to escape. The fiber bundles and power cables attached to the camera merger boards 208 inside the camera head 200 are threaded through the center of the aluminum plates and then out through the commercially available liquid-tight non-metallic conduits that are installed in the top of the case 210. Five support rods that attach to an external mount are inserted through holes in the top of the case 210, through the first aluminum plate, and to the second plate separating the second and third arrays 202a, 202b. The two pieces of glass-filled vinyl frame (the top two tiers are a single unit and the bottom tier is separated) are attached by screws to the aluminum plate along their outer rim.

Camera Geometry and Field of View

Figure 2B:
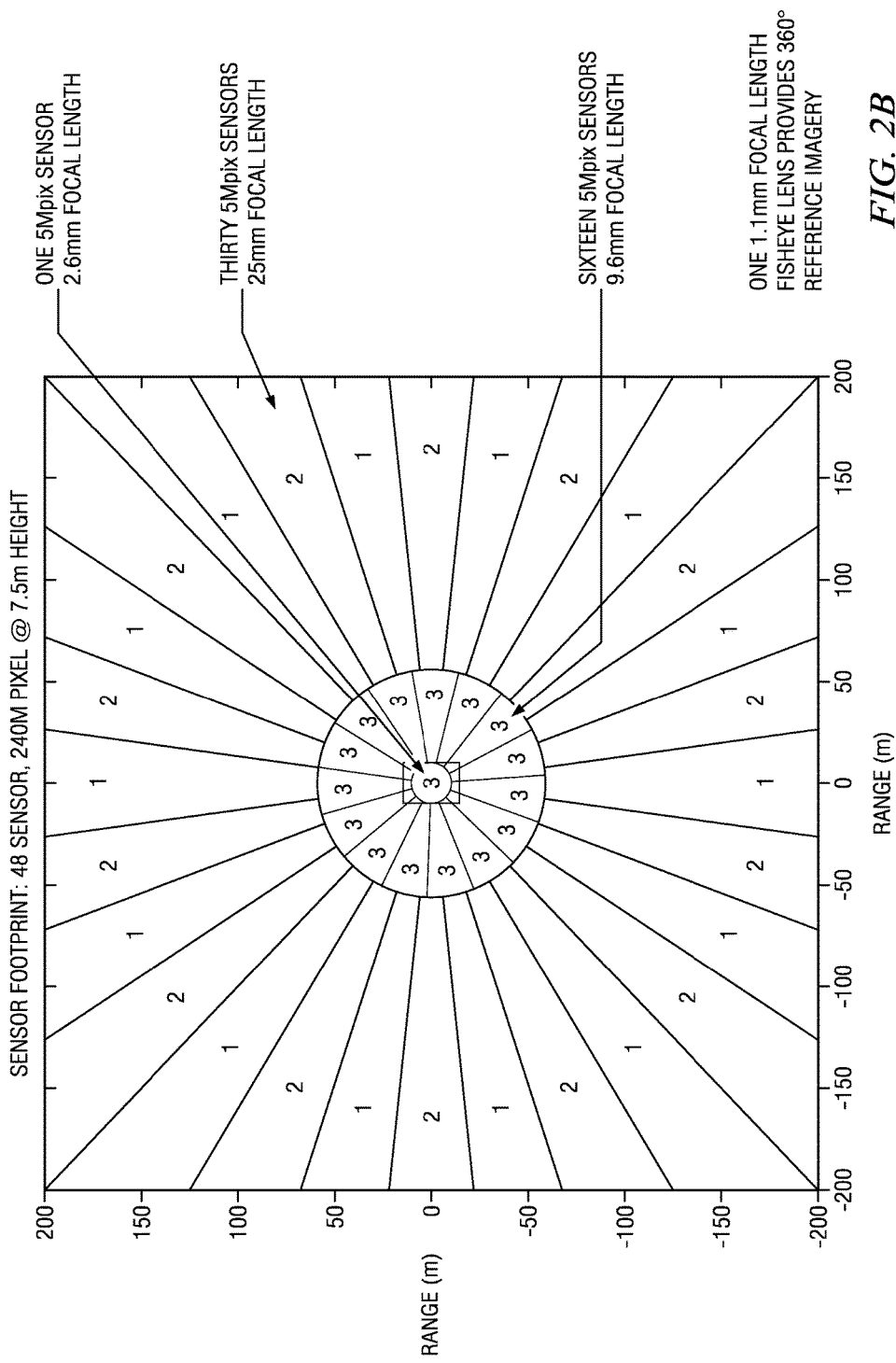
FIG. 2B is a plot that shows coverage provided by the cameras in the ISIS camera head of FIG. 2A.

FIG. 2B illustrates coverage provided by lenses of the camera head 200 shown in FIG. 2A. The top two arrays 202a, 202b of the frame each hold fifteen 25-mm focal length lenses 204a, 204b, fifteen imager boards 206, and five camera merger boards 208. In some examples, each lens 204 is paired with a single imager 206. Other arrangements of arrays and camera focal lengths are possible and may be selected based on the height of the sensor and the three-dimensional geometry of the scene being monitored. The geometry of the frame is designed such that the lenses 204 cover a continuous circular region approximately 50 m and farther from the lens 204 when the camera is placed at a height of 7.5 meters (the region beyond the circle of sixteen sensors in FIG. 2B). The fields of view of the sensors in each of the top two arrays 202a, 202b are offset (e.g., by the width of one-half of an imager) so that the field of view of one imager 206 is adjacent to the two imagers 206 immediately above or below it. Each camera's field of view may overlap with the fields of view of the neighboring cameras. Overlap helps to ensure that there are no gaps between imagers, and helps to provide enough common imagery between adjacent imagers to provide imagery for relative registration (described below).

The geometry of the imagers 206 and lenses 204 may be chosen so that (1) the area of interest is covered with no gaps, and (2) the resolution on the objects of interest over the field of view is within a desired range no matter what the range from the object of interest to the camera head 200. Assuming that a high level of resolution is desired everywhere in the scene, then the optimal use of the number of pixels in the sensor array 200 is to make the resolution stay within a particular range, or as constant as possible within the scene. In other words, the cameras (imagers 206) and their respective lenses 204 may be chosen to vary progressively in order to provide a substantially constant resolution across the entire scene.

In some embodiments, the ISIS system 100 achieves this goal through a tiered lens approach. Different tiers (arrays) of cameras have lenses 204 with different focal lengths, so that a given tier (e.g., an upper array 202a) includes lenses 204 having a given focal length (e.g., lenses 204a have relatively long focal lengths) and a corresponding angular field of view. In one such embodiment, the upper arrays 202a of the ISIS system 100 contains lenses 204a having longer focal lengths (and narrower fields of view), and the lower arrays 202b, 202c contain lenses 204b, 204c having shorter focal lengths (and wider fields of view). In this way, the upper arrays 202a give a higher angular resolution to maintain constant spatial resolution on more distant objects, and the lower arrays 202b, 202c have a coarser angular resolution, but because of the closer proximity to the targets in question, maintain a relatively constant spatial resolution on the target with in the field of view of interest—in one such embodiment, 100 meters or less from the sensor. Other arrangements are possible, for example, an alternative ISIS system having shorter focal-length lenses in the upper tiers and longer focal-length lenses in the lower tiers, or an alternative ISIS system having tiers that contain both shorter and longer focal-length lenses.

As described above, the ISIS sensor 200 of FIG. 2A has three arrays 202 of lenses 204. The top two arrays 202a, 202b of cameras contain lenses 204a, 204b with focal lengths of 25 mm. The cameras' fields of view are staggered such that each camera's field of view overlaps with the fields of view of azimuthally adjacent cameras in the other tier of cameras. This arrangement allows the lenses 204 and imagers 206 to be packed in a tighter configuration and allows the sensor 200 to be significantly smaller. The bottom array 202c contains shorter focal length lenses 204c because the imagers 206 on the bottom array 202c are looking directly down. The upper arrays 202a and 202b provide coverage over the horizon, which appears as an outer ring, or annular portion, of the wide-area scene viewed from the perspective of a fisheye lens, and the lower array 202c provides coverage over a central portion (e.g., a circular region or inner annular region) of the wide-area scene viewed from the perspective of a fisheye lens.

The tiered design allows a graduated focal length along the sensor in a vertical direction—much like a bifocal/trifocal design on a pair of human glasses, or a graduated lens. The cameras need not be arrange in tiers—they can be arranged in arrays of different geometries, including interweaved geometries—and that the number and arrangement of tiers depends on the application. In addition, the number of lenses and number of different focal lengths can be varied depending on the desired spatial resolution and the desired uniformity of spatial resolution across the scene.

Figure 2C:
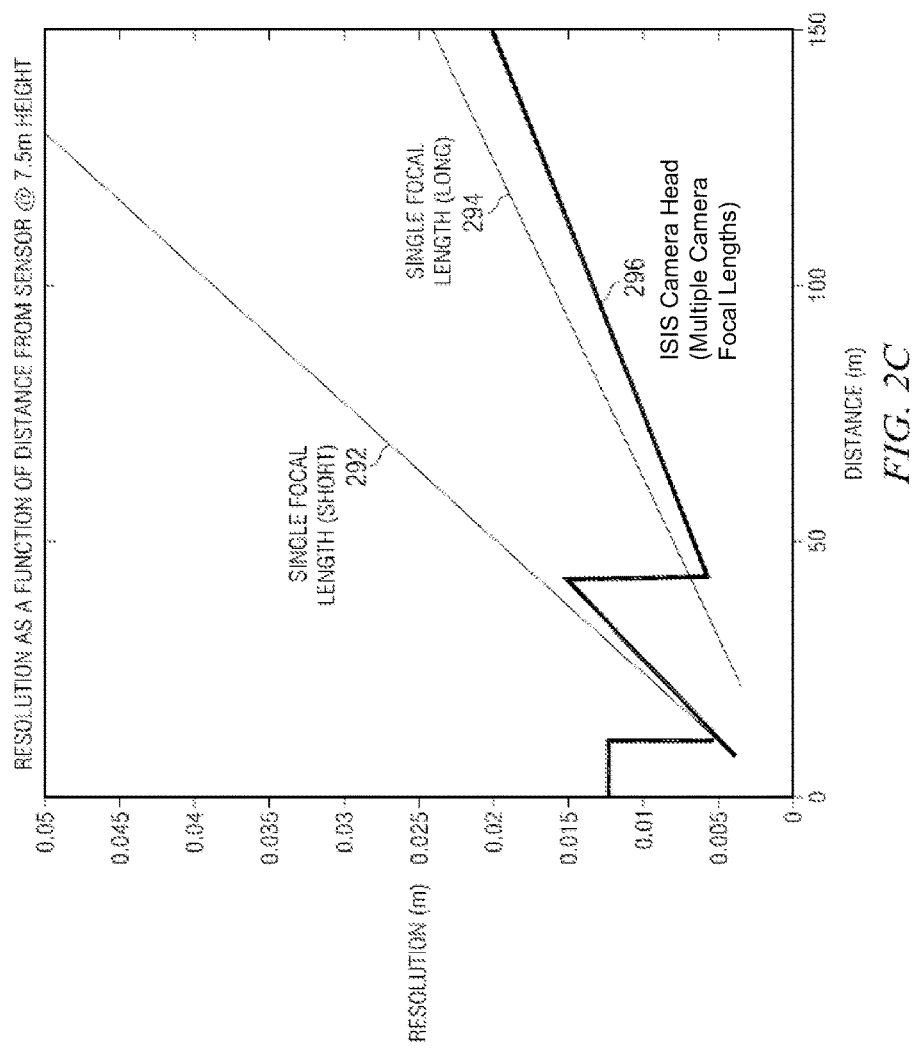
FIG. 2C is a plot of resolution versus target system for the ISIS camera head of FIG. 2A and two single-focal-length surveillance systems.

FIG. 2C is a plot of the spatial resolution of targets as a function of distance for surveillance systems with single focal lengths and for the ISIS sensor 200 (FIG. 2A) mounted at an example height of 7.5 m above the ground plane. Targets are assumed to be on the ground plane for the purposes of this graph. The spatial resolution of a camera with a single-focal length lens varies linearly with distance to the target at a slope depending on the focal length as shown by lines 292 and 294. In contrast, the ISIS sensor 200, which includes cameras with multiple focal lengths, provides a substantially constant resolution (e.g., between about 5 mm and about 15 mm) over the entire field of view as shown by line 296. The line 296 is jagged because each array 202 of the sensor 200 has lenses 204 of different focal lengths and because the lenses 204 in each array 202 have different distances to their respective targets. Note that the optical design of the sensor head 200 is optimized to see out to a distance of 100 meters, although the diagram shows a coverage area of 200 meters.

A sensor head with more tiers and/or lenses of a greater number of different focal lengths enables the sensor to obtain imagery whose spatial resolution is more uniform as a function of target distance. A greater number of different focal lengths also yields a spatial resolution versus target distance that would be represented by a line on the plot in FIG. 2C with many small "jags," each of which may be centered about a mean spatial resolution. The number of lenses, number of different lens focal lengths, lens focal length values, and target distance(s) determine an ISIS system's exact spatial resolution and the uniformity of the spatial resolution across the entire scene.

Camera Head Electronics

Besides the lenses 204, frame and cover, the sensor head 200 shown in FIG. 2A contains three major categories of electronic components: forty-eight imager printed circuit boards (PCBs) 206, sixteen camera merger PCBs 208, and two power boards.

Each of the imager boards 206 can be paired with a single lens 204, as described above, and carries a single detector array (e.g., a Micron Technology MT9P001 5-megapixel CMOS 12-bit digital RGB Bayer pattern image sensor array). In one example, the imager board 206 provides 15 frames of image data per second (fps) at full resolution while consuming less then 400 mW of power. It incorporates sophisticated camera functions such as windowing, column and row skip mode, and snapshot mode, and is programmable through a two-wire serial interface. The board 206 also contains a programmable read-only memory (PROM) for imager identification purposes and a ribbon cable connector for bidirectional data/control signals and power.

Each camera merger PCB 208 interfaces to three of the imager PCBs 206 via ribbon cables. A field programmable gate array (FPGA) (e.g., a Xilinx® Virtex 5 FPGA) on the camera merger PCB 208 is used to clock the imagers 206 at 96 MHz and capture data acquired by the imagers 206. One frame at a time, the data from all three imagers 206 is transferred from the FPGA to a 1-Gigabyte double data rate (DDR2) synchronous dynamic random-access memory (SDRAM) module at 400 MHz. The camera merger PCB 208 has two DDR SDRAM modules in order to perform a ping-pong data transfer scheme, i.e., data is written to one memory while being read back from the other. The data being read from memory is transferred, via a 3.125 Gigabit fiber-optic interface, to a data server containing a custom PCI JPEG2000 compression board. The camera merger PCB 208 also contains power conditioning circuitry for local components as well as for the imager board 206. Other FPGAs and memory configurations may be used as well. Two power boards (not shown) are located in the top array 202a of the sensor head 200. Each power board contains a 150 Watt DC-DC converter that accepts 24 volts and outputs 3.3 volts. In other embodiments, the power boards may be located elsewhere in the ISIS system.

Modular Camera Head Construction

The electronics in the camera head are designed in a modular fashion so that the camera head itself can be broken into several pieces to accommodate the geometry of the mounting point. For example, the camera head 206 can be broken down into four pieces, each of which is mounted to a face of a building to provide 360-degree coverage. The electronics in the camera are designed so that sub-cameras may be broken out without the need to modify the back end collection electronics or viewer software. In one example, the cameras are divided into groups of three, but other groupings or arrangements of cameras may be selected as desired.

Figure 3A:
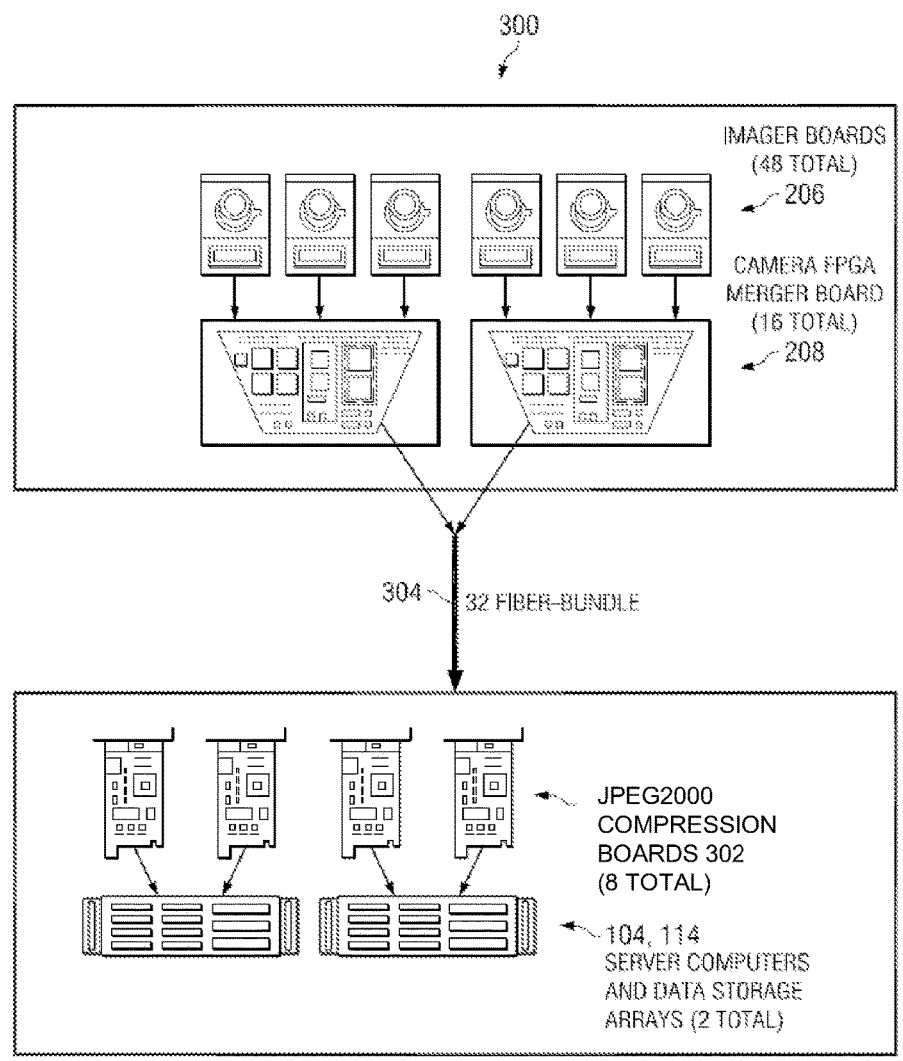
FIGS. 3A and 3B illustrate example modular architectures suitable for use in ISIS systems according to embodiments of the present invention.
Figure 3B:
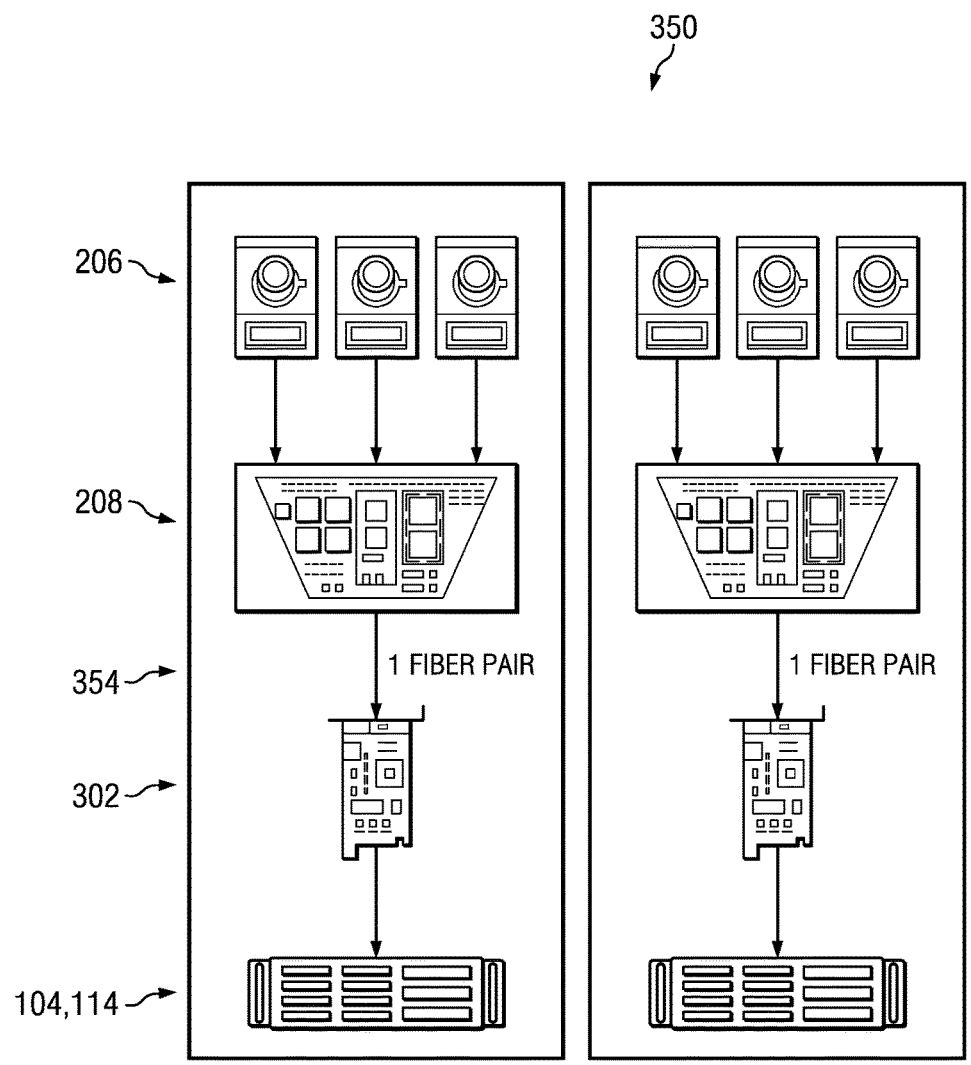

FIGS. 3A and 3B illustrate alternative architectures 300 and 350, respectively, for image data acquired by the ISIS system 100 and camera head 200 described above. The ISIS system 100 includes four compression boards 302 per computer server 104, for a total of eight compression boards 302 distributed over two computer servers 104. Each computer server 104 receives a compressed data stream from each of the compression cards 302 over the internal data bus. The data is written to a multiple terabyte array of hard drives 114 that is also resident in each computer server 104. The array of hard drives 114 are configured as a redundant array of independent drives (RAID) to maximize both throughput and data redundancy for robustness to drive failure. The compression boards 302 export the data to a computer server over a data bus and the data is stored on a hard drive array.

Each camera merger board 208 can transmit data over a single fiber pair 354 and thus this makes a natural module and working unit. In a single-camera module embodiment 300 of the sensor 200, shown in FIG. 3A, all sixteen camera merger boards 208 reside in a single housing, and the fiber pairs 354 are grouped into a single fiber bundle 304. However, each camera merger board 208 or group of camera merger boards 208 can be broken into its own unit, as shown in the architecture 350 of FIG. 3B, so that if the camera head 200 were to be broken into multiple pieces, the system 100 would not need to be redesigned—rather each merger board 208 and associated imagers 206 could reside in its own housing, be mounted separately, and each fiber pair 354 could be run separately to an associated compression card 302 or server 104, as shown in FIG. 3B. Furthermore, each compression card 302 could reside in a different server 104, and the servers 104 need not be co-located, as long as they reside on the same network. Thus, the system 100 is modular at the camera head level, the compression card level, and the server level, and these items need not be co-located.

Video and Image Data Compression

The video data being transmitted from the camera merger boards are compressed using JPEG2000 compression engines, or compression boards. (Other image and video compression techniques may be used as well). Each compression engine receives video data from two camera merger boards over 3.125 Gigabit fiber. The compression engine decomposes each frame of the video data into tiles, which may be 128×128, 256×256 pixels, 512×512 pixels, or any other suitable size, including asymmetric (e.g., rectangular) sizes, which are stored at a plurality of resolutions. In one embodiment, an ISIS system encodes the data from each image tile at four different resolutions levels, each one half of the width and height of the preceding resolution. The data is encoded progressively such that multiple quality levels of imagery with varied regions of interest (ROIs) can be requested at a later time.

Figure 4:
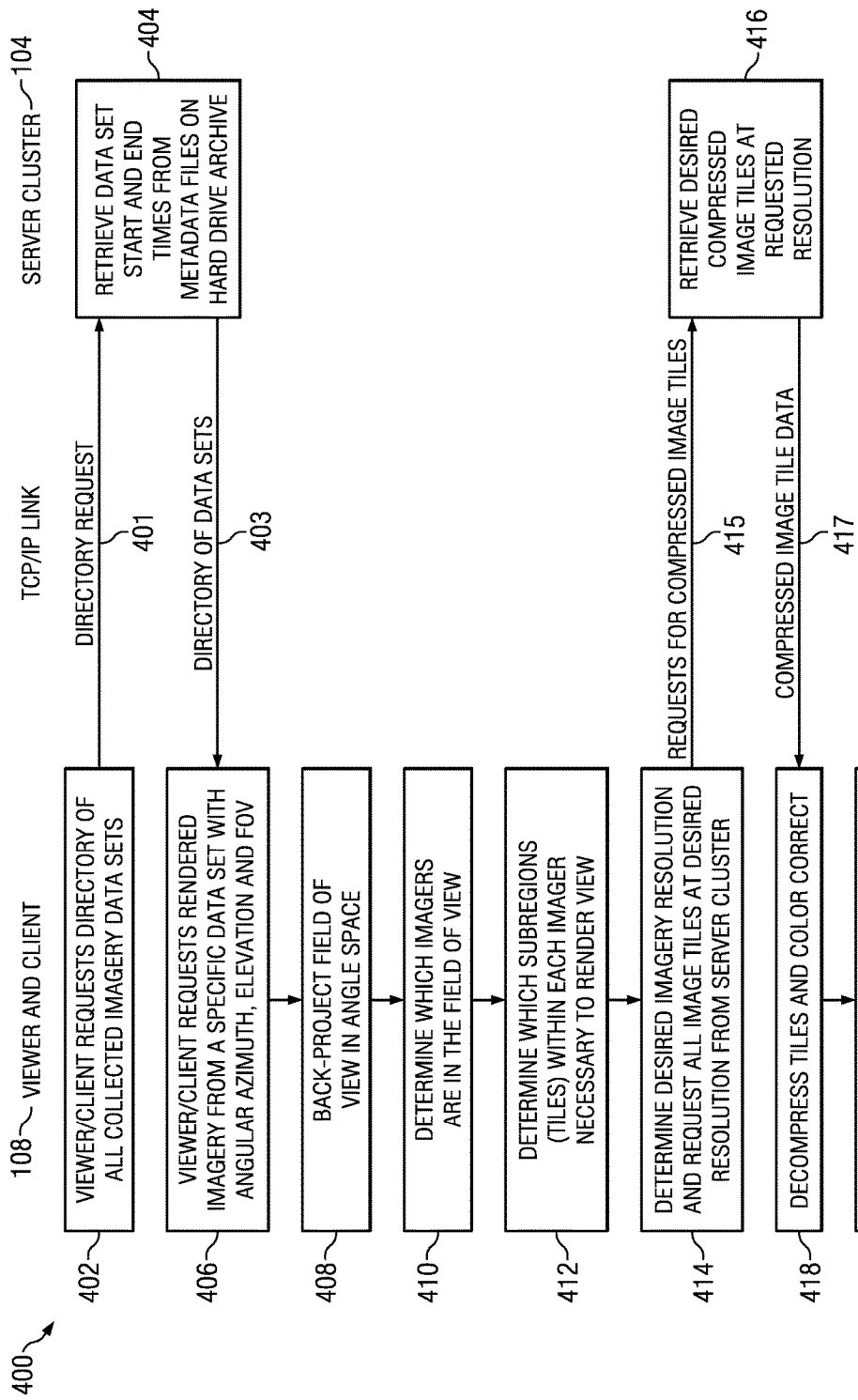
FIG. 4 illustrates client-server operation for an example ISIS system according to an embodiment of the present invention.

FIG. 4 illustrates an example operation 400 of an image client-server software architecture that serves image data efficiently, such as the architecture 300 of FIG. 3. A viewer interface 108 on a client computer sends a directory request 401 to the server cluster 104 for a directory of all collected imagery data sets (402). The server cluster 104 retrieves the data set start and end times (404) from metadata files stored in the hard drive archive 114, then forwards the requested directory 403 to the viewer/client 108.

Next, the viewer/client 108 requests imagery for a particular angular field of view (azimuth, elevation and angular width) sufficient to render an image of a particular size (406). Using image registration information (described below), the viewer/client 108 is able to back-project (408) the field of view in angle space to regions on specific imagers. This allows the viewer/client 108 to determine which cameras in the camera arrays are collecting video from a desired angular coverage area (410); the "tiles" or sub-regions within each imager to render the view (412); and the quality level or resolution of imagery to render the view of the scene at the desired size (414).

The viewer/client 108 then sends a request 415 for compressed data with the appropriate message headers over TCP/IP to the cluster of servers 104 for imagery for the tiles of imagery from the desired imagers at the desired resolution/quality level. The server 104 retrieves the requested data from the hard drive array (416), packages the data with the appropriate headers, and sends the packaged data 417 back to the viewer/client 108 that requested the data over the TCP/IP network connection. By sending only those image tiles at the resolution level necessary to render a particular angular view, the server 104 reduces the data bandwidth over the TCP/IP link. The viewer/client 108 decompresses and color corrects (418) the compressed image tile data, then renders the decompressed image tiles in a composite view (420).

Illustrative ISIS architectures may include video-based compression (which takes advantage of temporal correlation between frames and uses key frames to reduce data size), still image compression (where each image is stored as a separate image with no correlation between frames), or both video-based and image compression. One advantage of using still image compression is that the user, upon "seeking" in the browser to a particular moment in time, may pull up the image very quickly without waiting for the video to "buffer" and being able to play back. Instant seek allows the user to more efficiently browse the data for a particular object, person, or event.

Video and Image Processing

Figure 5A:
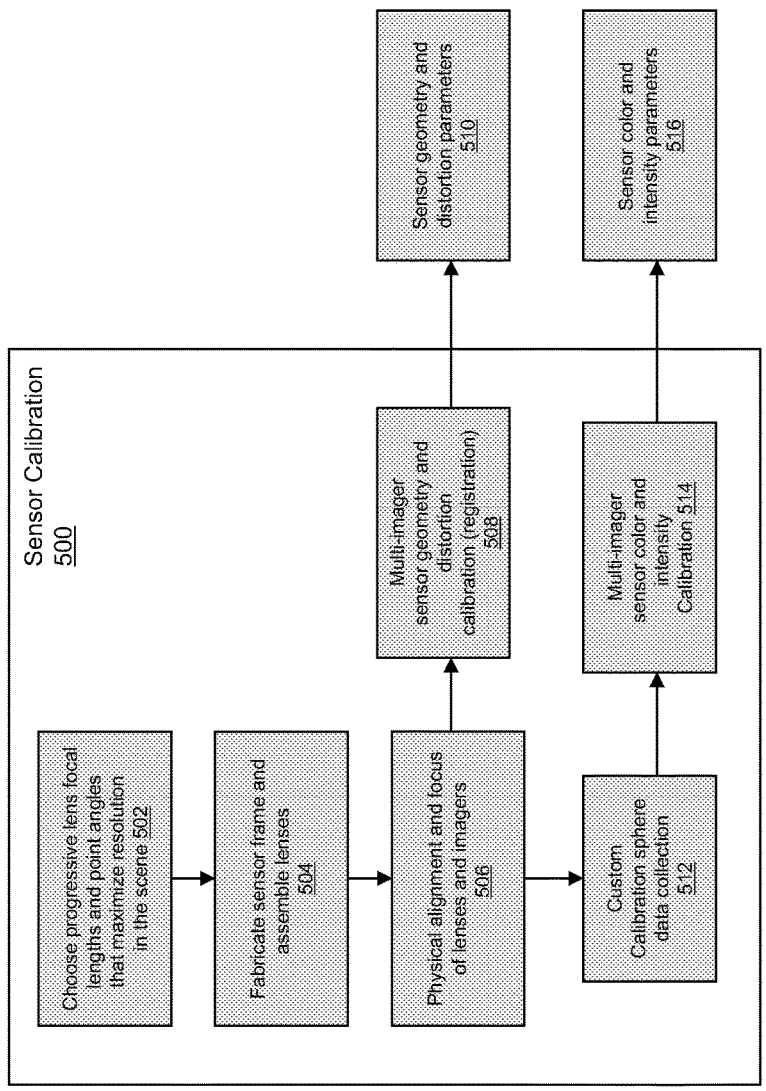
FIG. 5A illustrates an illustrative sensor calibration process according to an embodiment of the present invention.
Figure 5B:
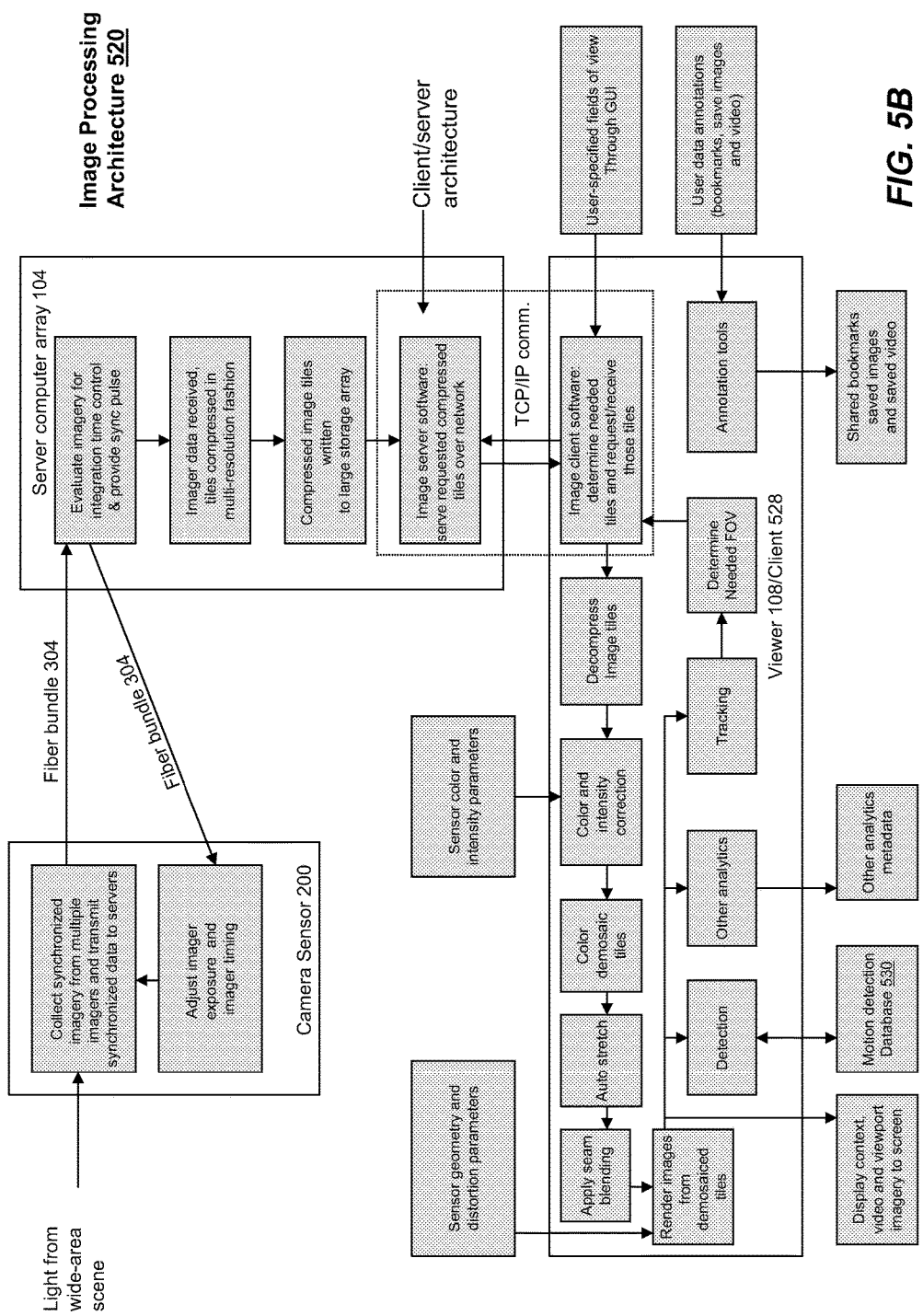
FIG. 5B illustrates ISIS processing architecture and data flow according to an embodiment of the present invention.

FIGS. 5A and 5B illustrate exemplary video and image processing chains, respectively, according to embodiments of the present invention. FIG. 5A shows the calibration process of the camera head 200 itself, and FIG. 5B shows how the imagery collected from the imagers makes its way to the end user.

FIG. 5A shows a calibration process 500 suitable for aligning the cameras in the camera head (sensor assembly). Once the progressive focal lengths and point angles of each lens have been chosen to optimize the resolution throughout the scene (502), the sensor frame is fabricated to hold the lenses in the computed geometry (504). The individual cameras (lens/imager pairs) are then physically aligned so that they overlap slightly with no gaps in coverage, and each camera is focused onto a corresponding (e.g., unique, but overlapping) portion of the wide-area scene (also 506). At this time, video data from the imager is collected in a typical scene. The collected imagery is used to estimate physical parameters 510 of the system, such as focal length, pixel size, point angle and lens distortion (508). This estimation process (also called registration) is described below. These parameters 510 may be stored in a memory for later processing during image processing. Also, the imagery is collected from the sensor inside a custom calibration sphere as well (512) for multi-imager sensor color and intensity calibration (514) as described below. This imagery is used to compute color and intensity correction parameters (516), also to be used during the image processing chain.

FIG. 5B shows an exemplary image processing architecture 520 suitable for use during ISIS system operation. Light from the wide-area scene being covered by the sensor is collected by the cameras (lenses and imagers) in a synchronized fashion. The camera sensor 102 formats and transmits the image data over the fiber bundle 304 to a server computer array 104, which analyzes the data and sends back commands to the camera head 200, also via fiber 304, to control the integration time (exposure) of each of the cameras (imager/lens pairs) to maximize dynamic range in the camera head 200.

The server computer array 104 then tiles the imagery and compresses each tile in a hierarchical, multi-resolution fashion. In some implementations of the system 500, JPEG2000 was used, but any suitable hierarchical data compression techniques may be used. The compressed tiles are written to a large storage array 114 (FIG. 1).

One or more client computers 528 can connect to the server computer array 104 via TCP/IP (or similar communication protocol) over an Ethernet (copper) or wireless communication link. A user may use the client's graphical user interface (GUI) 108 to specify a desired field of view (or desired fields of view) of the scene in terms of azimuth, elevation, desired angular field of view, and time (current or past). The client 528 uses the sensor geometry and distortion parameters 510 (FIG. 5A) computed during calibration 500 to determine which image tiles, cameras, and resolution can be used to render the requested view(s). The client 528 requests those tiles and camera data from the server computer array 104. The client 528 and server computer array 104 together form the client-server architecture described later.

Once the server 104 has received the tile requests, it retrieves the desired image tiles at the requested resolution levels from the storage array 114 and sends them to the client computer 528 over the TCP/IP network. The client computer 528 receives and decompresses the tiles. It then corrects the decompressed tiles for color and intensity using the color and intensity parameters 516 (FIG. 5A) computed during the calibration stage 500. The client 528 then demosaics the color-corrected images into RGB imagery, which is stretched according the specified controls on the GUI 108. The client 528 processes the stretched imagery for seam blending, a process by which the overlapping regions between the imagers are combined in a way so as to reduce the visibility of the seam to the end user. The client 528 renders the seam-blended image tiles on a display (not shown), for example, as projected onto a virtual camera space for the fields of view specified by the user and displayed on the GUI 108. This process may be repeated each time an image is output to the screen, e.g., as part of the display refresh or when the user selects a new point of view or portion of the scene as described below.

The client 528 may also process the rendered imagery using image processing plug-ins, including, but not limited to (motion) detection, object tracking and other video analytics. The client 528 may store indications of motion detection in a motion detection database 530 that can be accessed by one or more other clients 528 on the network. The client 528 may also re-load stored indications of motion detection at a later time. The results of object tracking can be fed back into the client-server architecture 520 to cue (e.g., continuously) the virtual camera view to be centered on one or more objects of interest. Other video analytics, such as behavior analysis and incident detection, can be subsequently applied to some or all of the processed data. Annotation tools also store operator-annotated events and specific incidents in the scene.

Image Registration and Conditioning

In some examples, the ISIS system viewer 108 renders an interactive virtual camera view of the scene and displaying it to a viewer (user). This virtual camera view represents an arbitrary angular field of view into the scene that is independent of the field of view of any single camera. The user has the ability to request a particular angular field of view and have the resultant imagery appear as if it came from a single camera (image-lens combination), even if the viewer 108 uses imagery from multiple imagers to create that imagery. Thus, the relative position, point angle, pixel size, radial distortion, and focal lengths of each camera (imager/lens combination) should be determined to a sufficient degree of accuracy, and the imagery from each camera should be warped, resized, and placed in the virtual camera at the correct position so that the transition from one camera to another appears to be seamless. The process of determining the relative locations, relative pointing angles, appropriate image scale factors, and distortion correction for the cameras in the cameras arrays to provide a seamless image is called image registration.

An ISIS system may use any suitable registration technique, including registration of imagery from individual cameras to a panoramic (e.g., fisheye) reference image of substantially of the scene and registration of imagery from individual cameras to imagery from other cameras in the camera arrays. In theory, registration only needs to be done once per camera. In practice, however, cameras are re-calibrated periodically to compensate for mechanical drift, thermally induced expansion and contraction, and other environmental perturbations. For instance, outdoor ISIS systems may be re-calibrated once every two months, depending on the weather; indoor ISIS systems may be re-calibrated less frequently, and ISIS systems on moving platforms (e.g., unmanned aerial vehicles, ships, cars, and trucks) may be re-registered as indicated by visual inspection or as indicated when an error metric computed from image data reaches or exceeds a predefined threshold.

Image Registration to a Wide Angle ("Fisheye") Reference

As described above, the camera head 200 of FIG. 2A is comprised of forty-eight lens-imager combinations, or forty-eight cameras (forty-eight is an arbitrary number, other numbers can be used). Most of these cameras have a narrow field of view (e.g., <30 degrees); these are designated "projective" cameras because they can be modeled fairly accurately as a flat projection of a three-dimensional world onto a plane perpendicular to the camera's optical axis. The camera head 200 may also include another camera (not shown) with a fisheye lens to provide a reference image that encompasses substantially all of the wide-area scene.

ISIS employs different models for the projective cameras and the fisheye camera to compensate for the unique distortion characteristics of the conventional (e.g., spherical) lenses in the projective cameras and the fisheye lens in the fisheye camera. These models are applied to the imagery to remove distortion. For projective cameras, the ISIS system 100 calculates distortion parameters and combines these parameters with the projection matrix, which is computed from an initial gross azimuth/elevation point angle estimation of the camera. For the fisheye lens/imager combination, the fisheye distortion parameters were computed using a publically available calibration software toolbox. These distortion parameters were used to more accurately map camera pixels to three-dimensional world coordinates.

Because the fisheye camera provides imagery that covers 360 degrees, the field of view of each projective camera covers a subset of the fisheye camera's field of view. As a result, the fisheye camera provides a single, seamless common reference frame for all of the projective cameras. The ISIS system 100 overlays imagery taken by a given projective camera on top of imagery captured by the fisheye lens camera, then matches the projective camera imagery to the underlying fisheye reference image in a process called image registration.

Figure 6A:
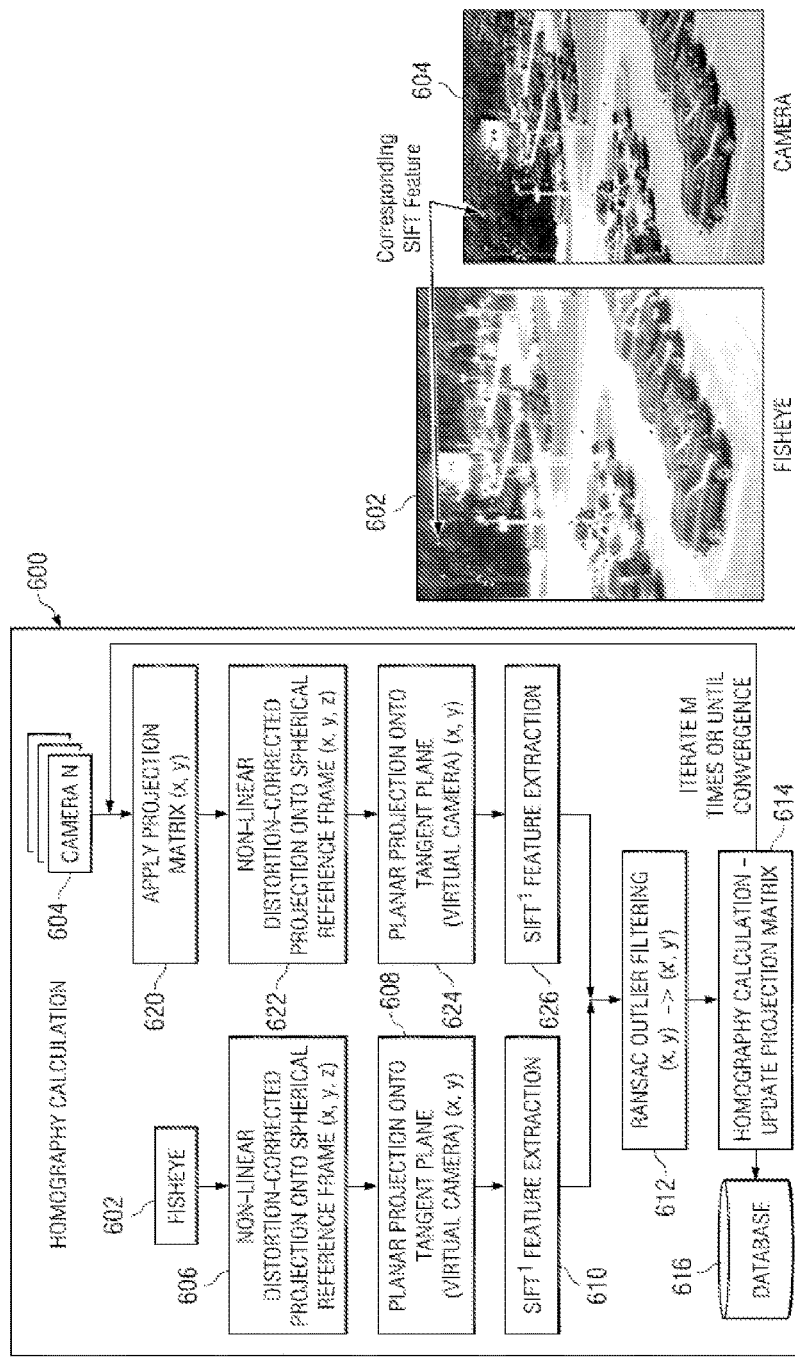
FIGS. 6A and 6B illustrate ISIS registration processes with (FIG. 6A) and without (FIG. 6B) the use of a wide-angle reference image according to embodiments of the present invention.

FIG. 6A illustrates an example image registration 600 performed by the ISIS system 100 using imagery 602 acquired by the fisheye camera and imagery 604 acquired by at least one other camera in the sensor head 200. To project image data onto an image plane perpendicular to the optical axis of the virtual camera view being generated, the image is warped using a "transform" or a linear algebra operation on the image data. Because of the 360-degree nature of the fisheye camera imagery 602, the fisheye camera imagery 602 is best represented with a three-dimensional spherical model. The registration process 600 performed for each projective camera by the ISIS system 100 is as follows.

First, one or more processors (e.g., on the client side) in the ISIS system 100 projects projective camera imagery 604 according to current projection matrix (initialized to default value based on rough estimate of point angle) (620), and renders a non-linear, distortion-corrected projection of the reprojected camera imagery onto a spherical, three-dimensional model in (x, y, z) space (622). Next, the processor renders a non-linear, distortion-corrected projection of the fisheye camera imagery 602 onto the spherical, three-dimensional model in (x, y, z) space (606). The processor then renders a "camera view" planar projection from the spherically projected imagery of both fisheye and projective imagery 602, 604 in a local angular area of overlap onto the tangent plane (virtual camera) in (x,y) space (608, 624).

The processor then finds robust image features in both images (610, 626) using the Scale Invariant Feature Transform (SIFT), Speeded Up Robust Feature (SURF), corner detection, edge filtering, hand selection or any other suitable technique. (For more on SIFT, see U.S. Pat. No. 6,711,293 to Lowe, which is hereby incorporated herein by reference in its entirety.) Suitable image features are relatively robust to slight differences in color and scale and relatively well-localized features (e.g., bright points, not blobs). The processor filters outliers from among the image features using random sample consensus (RANSAC; developed by Fischler and Bolles in 1981) or any other suitable technique (612). It then computes a homography between the filtered image features in the fisheye camera and projective camera views and uses the homography to determine a registration matrix (614). As understood by those of skill in the art, a homography is a circle-preserving transformation composed of an even number of inversions that can be used to map features from one image (projection) onto the same features in another image (projection). This registration matrix updates the projection matrix used above. The processor iterates through the registration process 600 until the homography converges, or until it reaches specified maximum number of iterations (e.g., M).

Relative Image Registration

Figure 6B:
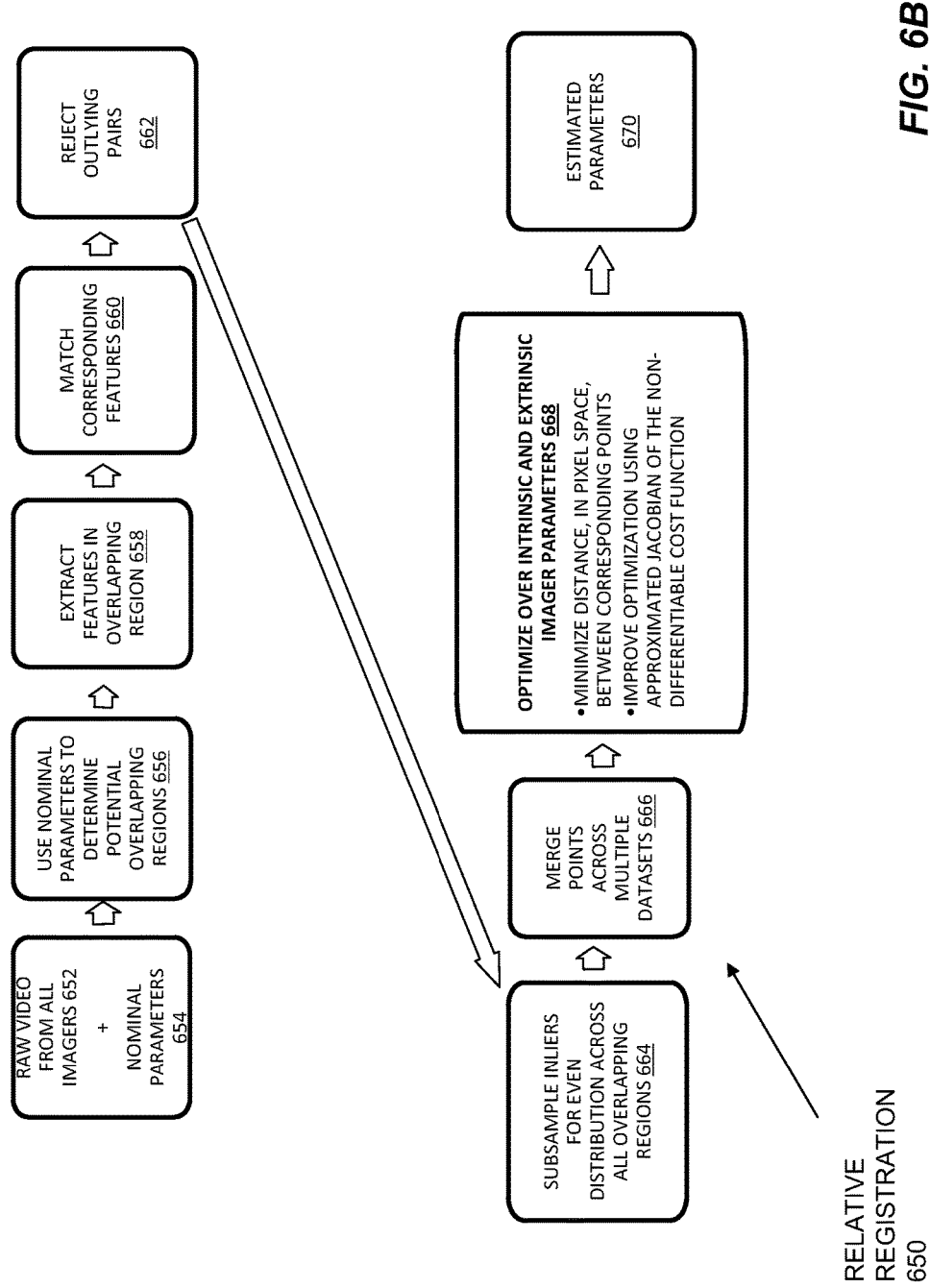
Figure 6C:
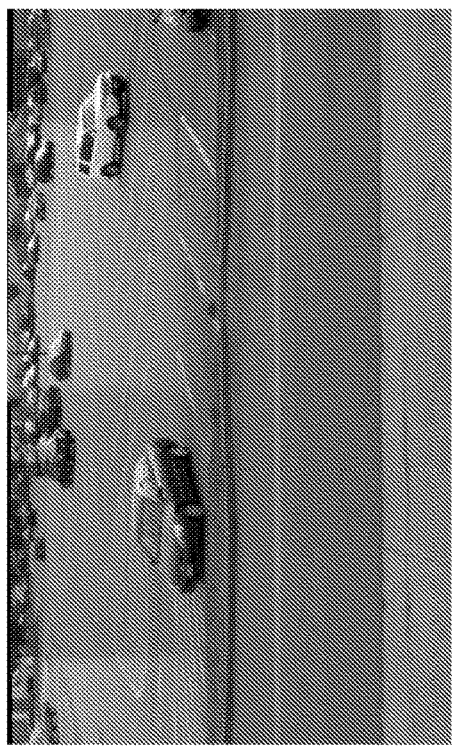
FIG. 6C illustrates images acquired with an illustrative ISIS system before (left) and after (right) relative registration (FIG. 6B) according to one embodiment of the present invention.
Figure 6C:
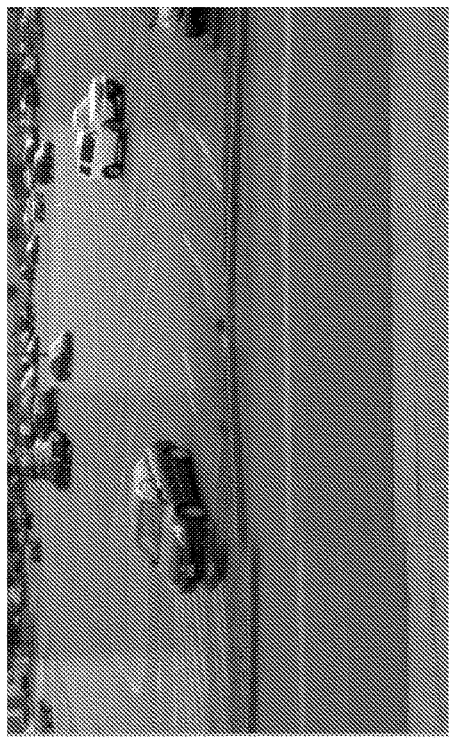

FIG. 6B illustrates a relative registration process 650 in which overlapping images from the cameras on an ISIS camera head are registered to each other rather than to a reference image. A processor locates robust image features in a region of overlap, or image seam, common to an overlapping pair of images (or field of view). The processor uses the locations of the image features to solve for intrinsic and extrinsic camera parameters, such as camera position, camera (angular or linear) field of view, camera pointing angle, camera offset, etc., by minimizing an error associated with re-projecting the image features onto the image seams using the camera parameters. Precise estimates of point angle, focal length and pixel size are especially useful for registering cameras to each other without introducing perceptually significant discontinuities in the composite image. The relative registration process 650 yields a set of equations, or model, of the cameras' locations and attitudes relative to each other and to the scene. This model can be used to register imagery from the cameras to form continuous image of all or substantially all of the wide-area scene. For instance, the registration process can be used to transform imagery that is aligned using initial estimates of camera parameters (shown at left in FIG. 6C) into registered imagery (shown at right in FIG. 6C).

FIG. 6B shows that the relative image registration process 650 begins with obtaining raw video or image data from cameras in the array (652) and generating or loading a set of nominal sensor parameters (654). A processor, such as a graphics processing unit (GPU) on the server side or the client side, uses the nominal sensor parameters to find regions of overlap, or seams, in the video and image data. The processor identifies and extracts points representing image features (658) that are robust to slight differences in color and scale (e.g., bright point sources) in each seam using SIFT, corner detection, edge filtering, user input, or any other suitable selection technique.

Once the processor has extracted the image feature points, it filters the extracted image feature points to reject outliers using the following RANSAC procedure. The processor selects a random set of at least four non-colinear image features in a seam common to images from a pair of cameras, then calculates a planar homography, which defines a transform from one camera perspective to another camera perspective, based on the selected non-colinear features. Using at least four points, each which is characterized by an x coordinate and a y coordinate, yields eight constraints—enough to solve for a 3×3 matrix to transform one plane to another.

The processor tests the homography on all of the filtered image features as follows. First, the processor determines an inlier consensus set by projecting points representing the image features using the homography from one camera view (image) to the other camera view (image) sharing a common seam (660). The processor selects those points from one camera view that lie within a pre-defined Euclidean distance to the matching points in the other camera view and rejects outlying pairs of points (662). If desired, the processor may select another set of at least four image features, compute a new homography, and test the new homography until it reaches a maximum number of iterations or until it determines that the probability of choosing an outlier is less than a predefined probability. The processor retains the largest inlier consensus set on each seam for parameter optimization.

Next, the processor subsamples the inlier consensus set to produce an even distribution of points across the image seams (664). In general, the processor finds a large number of image features that contribute to the inlier consensus set, but highly spatially correlated features add very few additional constraints for the calibration software. Therefore, the processor prunes the matched points spatially so that there is an even sampling of points in a set of tiles distributed across every seam in the scene. Point reduction helps reduce the optimizer's sensitivity to specific seams, e.g., seams that have excess features. Point pruning also increases the speed of the calibration since fewer points are being re-projected at each iteration of the optimization. If a set of points in the world have a known three-dimensional location, a user can select the corresponding points in the raw imagery during a one-time initialization step and the calibration software will produce a solution with metrically accurate absolute orientation.

The processor merges the pruned points from each seam in a procedure called multi-dataset calibration (666). Feature locations are scene dependent with more features being found in regions of the scene with higher entropy. Rotating the sensor (camera head) and acquiring additional images causes locations in the scene with many feature to other overlap regions (image seams). The inclusion of more data samples avoids solutions that settle into local minima. In addition, using more samples averages out uncertainties in the location of each image feature.

Relative image registration 650 concludes with an optimization routine (668) to calculate the sensor model parameters. The optimizer uses the pruned point pairs from the overlap regions (image seams) to minimize a cost function based on the re-projection error. The processor iteratively minimizes a global cost equal to the sum of the re-projection errors using a boundary-constrained non-linear objective function that accounts for the camera parameters. Each camera parameter can be scaled with respect to other camera parameters to weight certain camera parameters more or less in the objective function at each iteration.

Because the some of the functions defining the sensor model are non-differentiable, a completely analytic Jacobian of the cost function cannot be derived. (As understood by those of skill in the art, the Jacobian of the cost function is the matrix of all first-order partial derivatives of the cost function with respect to another vector.) The derivatives of non-differentiable functions, like lens distortion, are differentiated using a three-point numerical approximation. The combined analytic and numerical Jacobian of the cost function is used to direct the gradient descent iterations of the optimization routine to optimal parameter values more rapidly than a pure numerical approach. The Jacobian of the cost function is used in the gradient descent update portion of the software to predict the change in parameters at the next iteration that will yield a lower overall cost. Parameter estimation proceeds until a maximum number of iterations is reached, the error objective reaches a specified lower limit, or a particular parameter moves outside a defined interval.

The parameter optimization technique may be used to calibrate sub-groups of imagers to achieve more optimal results. For example, the thirty longer focal length cameras (i.e., those with 25 mm focal length lenses) in FIG. 2A may be registered to each other by solving for the point angle, pixel size and focal length of each camera, and the sixteen medium focal length imagers (i.e., those with 9.6 mm focal length lenses) in FIG. 2A may be registered to each other using the same process. These two arrays of cameras may then be registered to each other using the global iterative process. Finally, any wide-angle, downward-pointing lenses (1.3 mm) in the array have more inherent distortion and that distortion may be modeled as well through the global optimization process and are registered to the medium focal length lenses.

Seam Blending

Figure 6D:
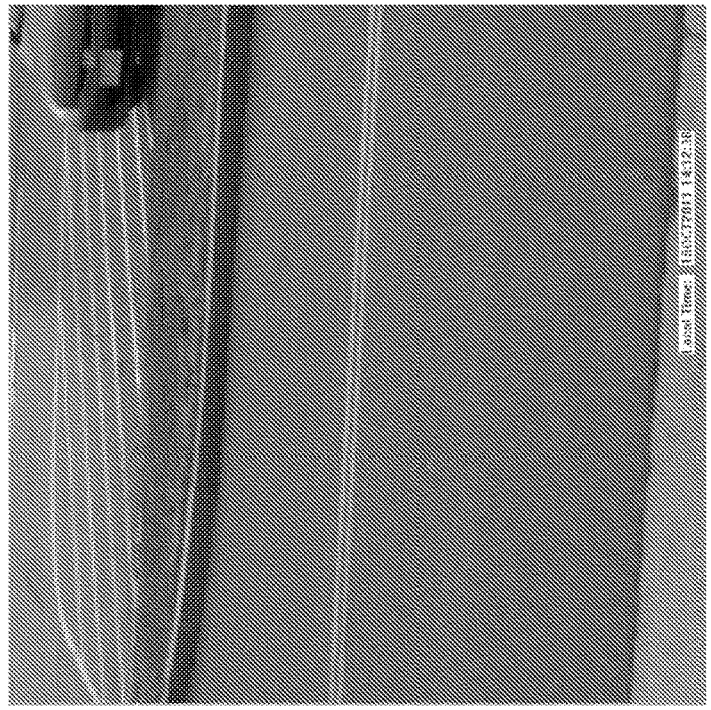
FIG. 6D illustrates images acquired with an illustrative ISIS system before (left) and after (right) seam blending according to one embodiment of the present invention.
Figure 6D:
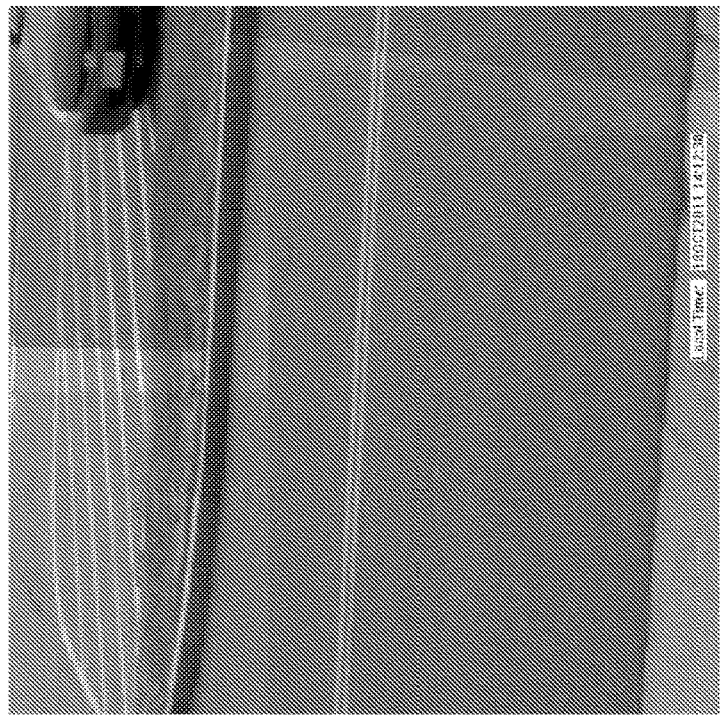

Demosaicing yields an image like the one shown at left in FIG. 6D. Once demosaicing is finished, one or more processors (e.g., GPUs) performs a seam blending operation to blend the registered images together to produce an image such as the one shown at right in FIG. 6D. In some embodiments, seam blending includes two part—first, by introducing an opacity mask for each pixel in each image and then by blending the opacity masks together during the rendering process.

An opacity mask for an underlying image is a secondary image with the dimensions (number of pixels) as the underlying image. Each pixel in the opacity mask has an opacity value between 0 and 1. The user may choose a number N which, in some embodiments, is slightly larger than the expected number of overlapping pixels in the registered images. Consider a border of width N on the edge of an image tile from a given camera. At the inside of the border, N pixels away from the outside edge of the image tile, the opacity mask has an opacity value of 1, and along the edge of the image, the opacity mask has a value of 0. In between the inside and outside edges of the border region, the opacity mask value transitions smoothly from 1 to 0. The transition may be linear in nature, or may fall off in another fashion, e.g., exponentially. Each border of a given image tile may have a different width.

Once processor has created the opacity masks for each of the requested image tiles, it projects the opacity masks onto the virtual camera space and resamples them accordingly. Each pixel on the projected image may have an opacity mask associated with between 1 and M image tiles, depending on the number of overlapping images (camera fields of view). All of the opacity mask values associated with a single pixel are all normalized such that they have a total value of one. For example if a single pixel in an image appears in an image seem common to three image tiles, the corresponding opacity mask values t1, t2, and t3 are each multiplied by a factor F, where F=1/(t1+t2+t3). If there is only one opacity value t1 associated with a given pixel, it is also normalized by F=1/t1, which is the same as setting that value to one.

Once the processor has created the opacity masks, it applies the masks to the imagery—that is, it multiplies each pixel value from each image tile by its associated opacity mask value. In this way, edges of each image tile are blended into each other to create imagery that appears smoother, e.g., as shown at right in FIG. 6D.

Distortion Modeling

Exemplary ISIS systems may use models of the radial distortion of certain cameras (lenses) to correct the imagery to maximize the accuracy of the projection. For some of the shorter focal length lenses in the system, the distortion in the lens may be severe enough to warrant estimating distortion parameters and applying the estimated distortion parameters to the imagery to undistort the imagery. Camera distortion may be estimated using the global parameter estimation described above or with any suitable camera calibration toolbox.

Demosaicing Using Edge Sensing

Figure 8:
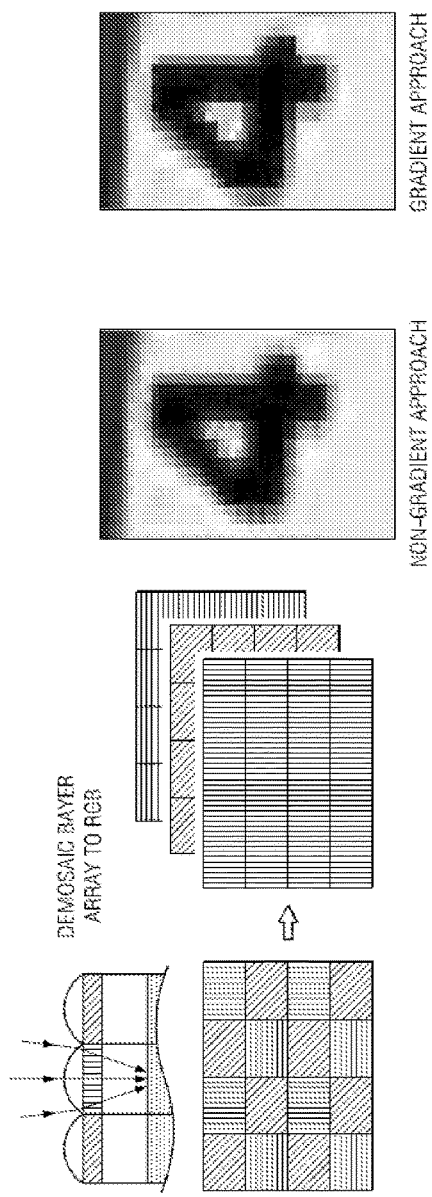
FIG. 8 shows how demosiacing can be used to improve image quality according to an embodiment of the present invention.

Many imagers, including those used by this project, incorporate micro-lens color arrays to create a single image with pixels that alternately represent the blue, red and green light in the image at a given point. The image read off of such an imager is said to be mosaiced. The imagery can be converted to three individual full-resolution images, each representing a separate color component (blue, red, green). This process is called demosaicing and is shown in FIG. 8. One problem that can occur is that the process of filling in the missing pixels for each color to create a whole image can cause visually distracting artifacts, particularly along strong edges in the images (sometimes called "zippering"). To sharpen edges of the color-interpolated image to better represent the actual transitions in the imagery, a gradient-following approach is used. The interpolated pixels follow the direction of the strongest edge as determined by examining its neighboring pixels. Demosaicing is a common problem in image conditioning. For descriptions of demosaicing methods suitable for use with ISIS imagery, see K. Kirakawa, T. W. Parks, "Chromatic Adaptation and White-Balance Problem," IEEE ICIP, 2005, or Edward Chang, Shiufun Cheung and Davis Pan, "Color filter array recovery using a threshold-based variable number of gradients", Proc. SPIE, Vol. 3650, 36 (1999), each of which is incorporated herein by reference in its entirety.

White and Color Balancing Using a Reference Image

In addition to registration, which determines the geometry of the reconstructed imager, the imagery can be "conditioned" or adjusted so that the user can view imagery that has excellent color balance, contrast and sharpness. White balancing is used to remove unrealistic color casts in the image, so that white images "look" white. Over the course of the day, the color temperature of the light may change, requiring occasional adjustments to the image. A white balancing tool was implemented, allowing the user to select a region that "should" be white in the image, the scaling factors to bring that imagery to true white are computed, and all of the imagery from the imager/lens combinations are adjusted to match that new ratio.

Even after flat-fielding and applying corrections for the non-uniformity gain factors computed from the integration sphere experiments, differences in the images produced by each image/lens combination exist. Because each imager produces a field of view that is adjacent to the one next to it, any differences in color and roll-off may appear as visible borders or lines in the virtual camera view, detracting from the user's perception of a virtual pan/tilt/zoom. To remedy this, a processor may use its image registration capabilities as a tool for balancing the color profile across all imagers. Once the processor has registered the imagery from the camera array to the panoramic (fisheye) reference image, which provides coverage substantially everywhere in the scene, the processor can render both the fisheye imagery and each projective camera at the same resolution on the same plane. In this mode, a processor compares 32×32 pixel blocks of imagery from the projective camera to the fisheye reference imagery in the same angular field of view and adjusts the gains of the component color channels for the block in the projective camera to match the corresponding block in the fisheye lens. Because the color in the fisheye 360-degree field of view changes gradually and continuously, images formed of imagery from the camera arrays appears smooth and continuous.

Non-Uniformity Correction (NUC)—Lens-by-Lens Method

Figure 7A:
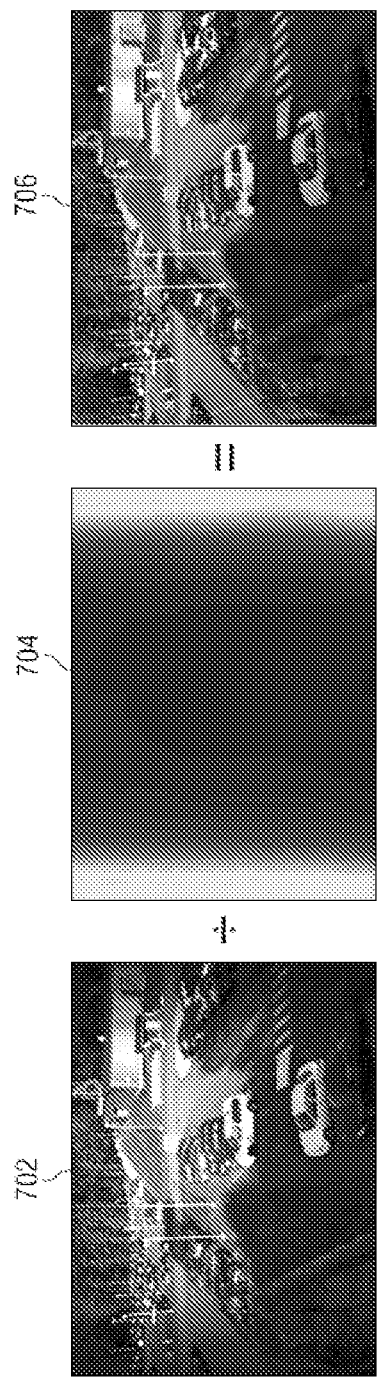
FIG. 7A shows how non-uniformity correction can be used to reduce image roll-off according to an embodiment of the present invention.

One characteristic of lenses and apertures in a typical camera is that there is some natural fall off from the center of the optical axis on the imager going towards the edge of the imager. This falloff would result in imagery that looks "faded" at the edges of each imager, as shown in the left-hand image 702 in FIG. 7A. To prevent this effect, the imager/lens combination is "flat fielded" to compensate for intensity roll-off and non-uniformities in the light path to the imager, and to compensate for the relative color sensitivity of each imager.

To correct for this roll-off, an integration sphere with an internal xenon lamp was used with each with lens/imager combination at the desired f-stop/focus configuration. For each lens-imager pair (camera) in the ISIS 100 of FIG. 1, fifteen frames were collected and averaged to form a single frame on a single pixel-by-pixel basis. The overall mean value of all of the pixels in the average frame was computed. An adjustment image 704 was computed. Each pixel in the adjustment image 704 is the overall mean value divided the value of the average frame at that same pixel location. This adjustment image 704 was saved to disk and applied to raw images 702 as it was collected; that is, the raw image 702 is divided it, pixel by pixel, by the adjustment image 704 to produce a compensated image 706 that is saved to the disk array 114.

White Balancing and Color Calibration without a Reference Image

Figure 7B:
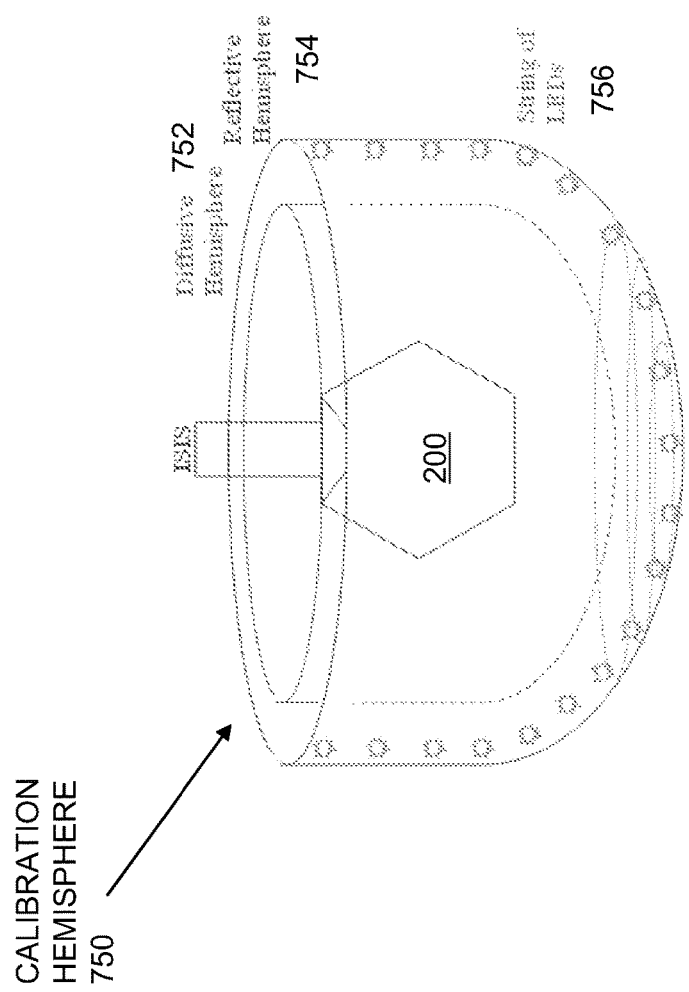
FIG. 7B illustrates a novel diffuse-reflectance hemisphere used for color calibration of an ISIS system according to an embodiment of the present invention.

FIG. 7B shows a novel calibration hemisphere 750 that be used to generate reference values for white balancing and color calibration real-time and archived data acquired with an exemplary ISIS system. The calibration hemisphere 750 includes a diffusive hemisphere 752 made of white, highly diffusive (e.g., 90% diffusive) plastic that is roughly 0.5 cm thick. The diffusive hemisphere 752 sits inside (and may be concentric with) a reflective hemisphere 754 made of thin, highly reflective material, such as mylar.

Light-emitting diode (LED) chips 756 sit between the diffusive hemisphere 752 and the reflective hemisphere 754. In one embodiment, each LED chip 756 has red, green, and blue channels in addition to a white channel—each LED chip 756 has 4 corners: white, red, green, blue. A controller (not shown) provides power to the LEDs 756 and allows a user to set the LEDs 756 to produce almost any desired color for calibrating the ISIS camera head's response to the desired. Alternatively, the calibration hemisphere may include ultra-bright white light LEDs and a colored diffusive hemisphere to calibrate ISIS camera head's color response.

To calibrate ISIS, the camera head 200 is placed inside the calibration hemisphere 752 such that the cameras are approximately equally distant from the diffuse screen (see FIG. 7B). If desired, the open portion of the hemisphere 754 may be covered to prevent stray light from reading the camera head 200 during testing. Once positioned properly, the camera head 200 captures a full set of images with the LEDs 756 off to provide a baseline background measurement for each pixel on the camera head 200. Next, the camera head 200 captures another set of images with the LEDs 756 over an integration time $T_w$ to yield a white count W for each pixel on the camera head 200. Because the diffusive hemisphere 752 is white and highly diffusive, and reflective hemisphere 754 is highly reflective (e.g., >95% reflective), the light from LEDs 756 bounces and mixes up very uniformly while being recorded by each camera in the camera head 200. (If desired, the ISIS system may average several frames of images with the LEDs 756 on to yield a white count with reduced noise.) A memory stores the background and white count values for image color calibration for each pixel or at lower resolution; low-resolution values may be expanded to each pixel location.

A processor applies the saved background and white count values as follows. In operation, the camera head 200 acquires photon counts J over an integration time $T_j$ for each pixel in the camera head. The processor computes a corrected intensity I for each pixel:

$$I = \frac{J - dark_j}{W - dark_w} \cdot \frac{T_w}{T_j}$$

where $dark_j$ and $dark_w$ are the dark levels in operation and during calibration, respectively. As understood by those of skill in the art, the dark levels may vary as a function of sensor type, temperature, and other parameters.

Color calibration involves acquiring monochromatic image data at each of several different colors—again, averaging a few frames increases the signal-to-noise ratio. For each pixel, the processor solves a system of linear equations in order to find a scalar that modifies each color plane (e.g., a RGB or Bayer pattern) to get the true color. Assuming that there is no cross-talk between the colors, this yields three scalars for an RGB pattern and four scalars for a Bayer pattern per pixel. These scalars may be applied instead of white balancing to adjust both the intensity and the colors and to provide uniformity across the cameras in the camera head 200.

Real-time color calibration during ISIS data acquisition provides true color representation with minimal effect from ever-changing ambient conditions (including darkness). Color calibration includes two steps: the first is evaluation of color representative parameters across the entire scene (or a subset of the scene), and second is application of the parameters within a given region of interest.

First, the processor evaluates the color-equalization parameters. The ambient light conditions can change (e.g., become pink due to sunset, sunrise, or have other color tint due to artificial illumination), thereby altering the true color spectra of the observed scenery. To reduce this effect, the processor balances the corrected intensity I in color space. For each color channel (e.g., in an RGB or Bayer pattern), the median value across entire field of view is calculated and normalized to its total light intensity:

$$E_{channel} = \frac{\text{median(channel)}_{FoV}}{\text{mean(all medians)}_{FoV}}$$

The memory stores the calculated color-equalization coefficient $E_{channel}$ for each color channel.

Second, the processor evaluates the color-equalized intensity ranges across the entire scene (or a subset of the scene) and stores the results in memory. For each color channel, the processor calculates low and high percentile values (e.g., 0.01 and 99.99), and uses these values later to "stretch" the intensity in any given region of interest to fill the given dynamic range of digital representation.

In real-time operation, the processor applies the color representative parameters to image data on a pixel-by-pixel basis by: (1) white-balancing the acquired intensity with W, $T_w$, $dark_j$, $dark_w$; (2) equalizing color with the corresponding color channel parameter $E_{channel}$; (3) offsetting and scaling the corrected intensity with low-high percentile values; and, if using cameras with Bayer filters, (4) demosaicing imagery from a Bayer pattern to red, green, and blue color channels. The processor then reduces the effects of significantly changing ambient light intensity (e.g., low-light conditions during night) in real-time by: (5) evaluating the intensity component from the color channels (for each pixel the intensity is the maximal value of all color channels at this pixel location); (6) taking a power function (e.g., with a power coefficient of about 0.3) of the intensity to optimize visibility in low-light areas; and (7) normalizing the corrected intensity (e.g., from (4) above) by modified intensity value. This process can be optimized for computational speed and efficiency, e.g., by approximating the power operation in (6) with a look-up table. The processor may improve the visual quality further with standard stretching methods applied to all color channels based on low-high percentile values across a given region of interest.

Figure 7C:
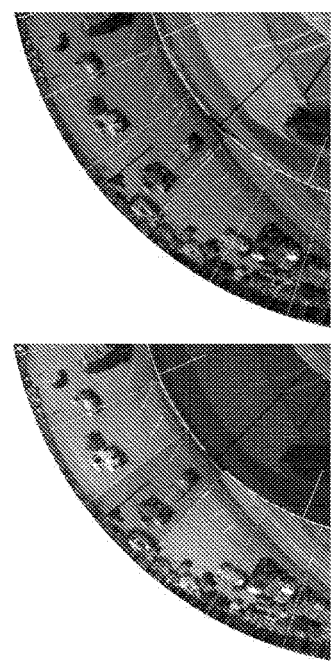
FIG. 7C includes low-resolution images of part of a wide-area scene before (left) and after (right) white balancing and color equalization.

FIG. 7C shows raw (left) and processed (right) imagery of one quarter of a wide-area scene imaged by a working ISIS system. White lines indicates breaks between images from adjacent cameras, since for this example the images are co-aligned but not registered completely. The intensity and color variation between and within the apertures are caused by difference in lenses, imagers, and probably some other variability in the optical paths. The majority of differences disappear after white balancing.

Figure 7D:
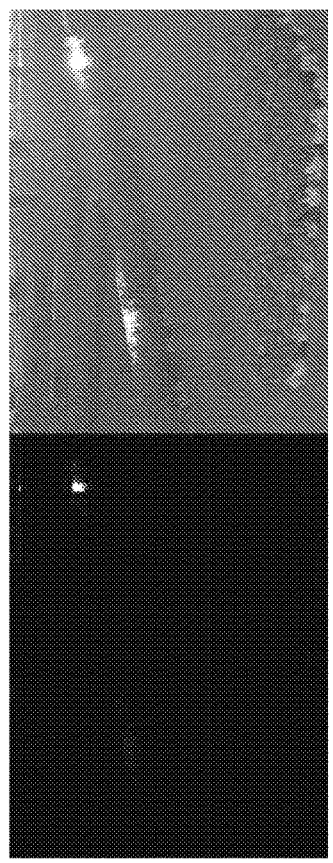
FIG. 7D includes low-resolution images of a wide-area scene at night, in the rain, from a working ISIS system with visible-wavelength cameras before (left) and after (right) white balancing and color equalization.

FIG. 7D show a low resolution region of interest from a working ISIS system with visible-wavelength cameras. The image on the left is raw data—taken at night during rain. The image to the right is result of processing of that raw data in real time as described above. The approach described above allows the observation of features details with a signal to noise ratio as low as 0.1 (e.g., 20 counts above 170 counts of dark level).

Automatic Contrast Adjustment

An auto-contrast process automatically stretches the dynamic range of the pixels being displayed as the composition of the virtual camera view changes. A subset of pixels in the image is sampled and a histogram of those pixels is computed. The pixel values corresponding to the 5th and 95th percentile are remapped with a gamma factor (log stretch) to the full dynamic range of the display, improving the ability of the user to see objects in the scene, especially darker scenes.

Hierarchical Data Compression

Figure 9A:
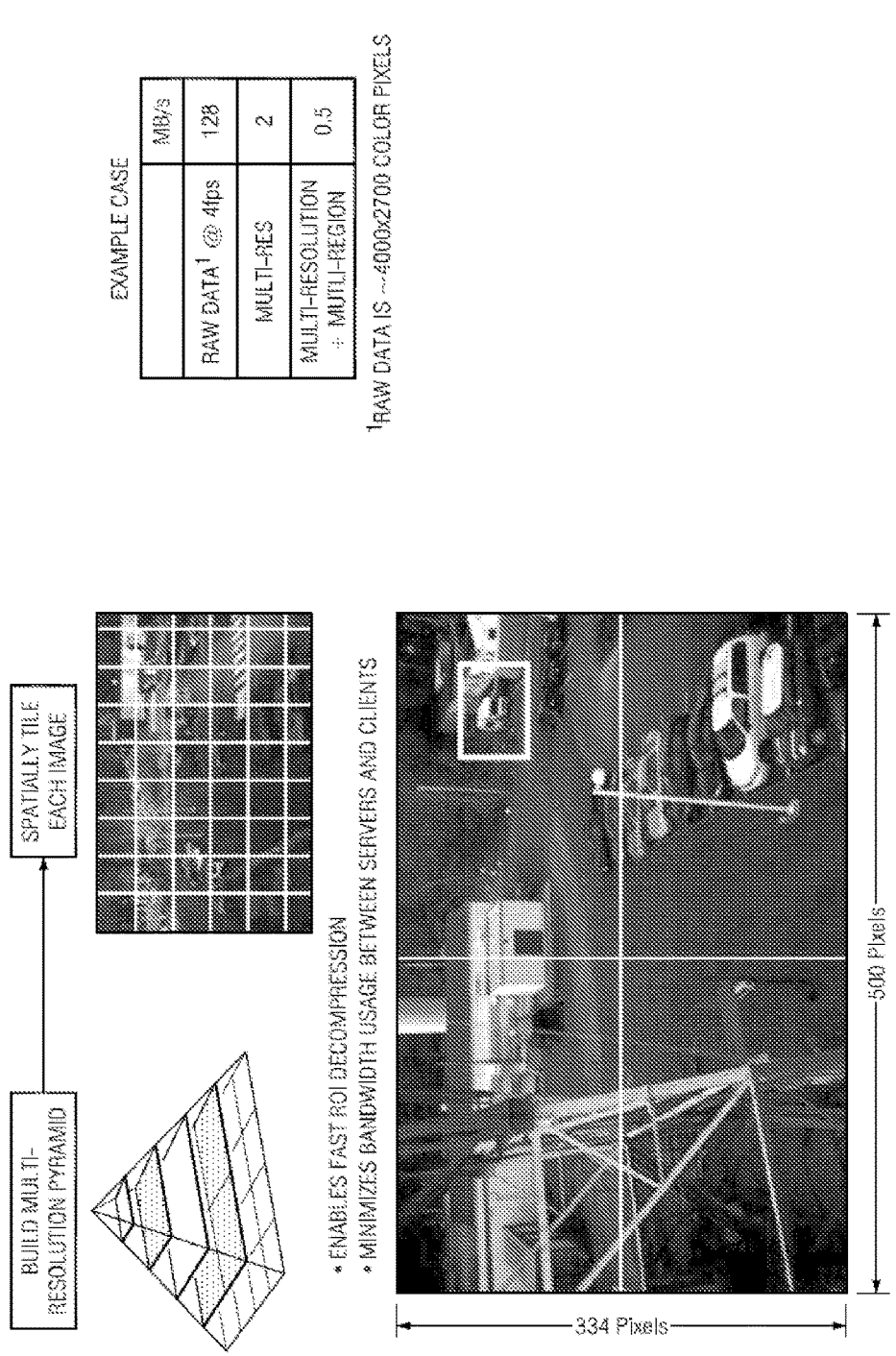
FIGS. 9A and 9B illustrate exemplary ISIS compression processes according to an embodiment of the present invention.

FIG. 9A illustrates a tiled, multi-resolution compression technique that can be used to compress data acquired with an ISIS system. Tiling allows the data to be retrieved in a modular way to render a particular field of view without the need to access all of the data in a spatial sense. Multi-resolution encoding allows the user to retrieve data at a resolution appropriate to the field of view and screen resolution of the viewer. Both of these characteristics work to reduce the usage of network bandwidth. A custom pyramid and tiling format was developed by MIT Lincoln Laboratory; this compression format can be used instead of the commercially available JPEG2000 format.

Figure 9B:
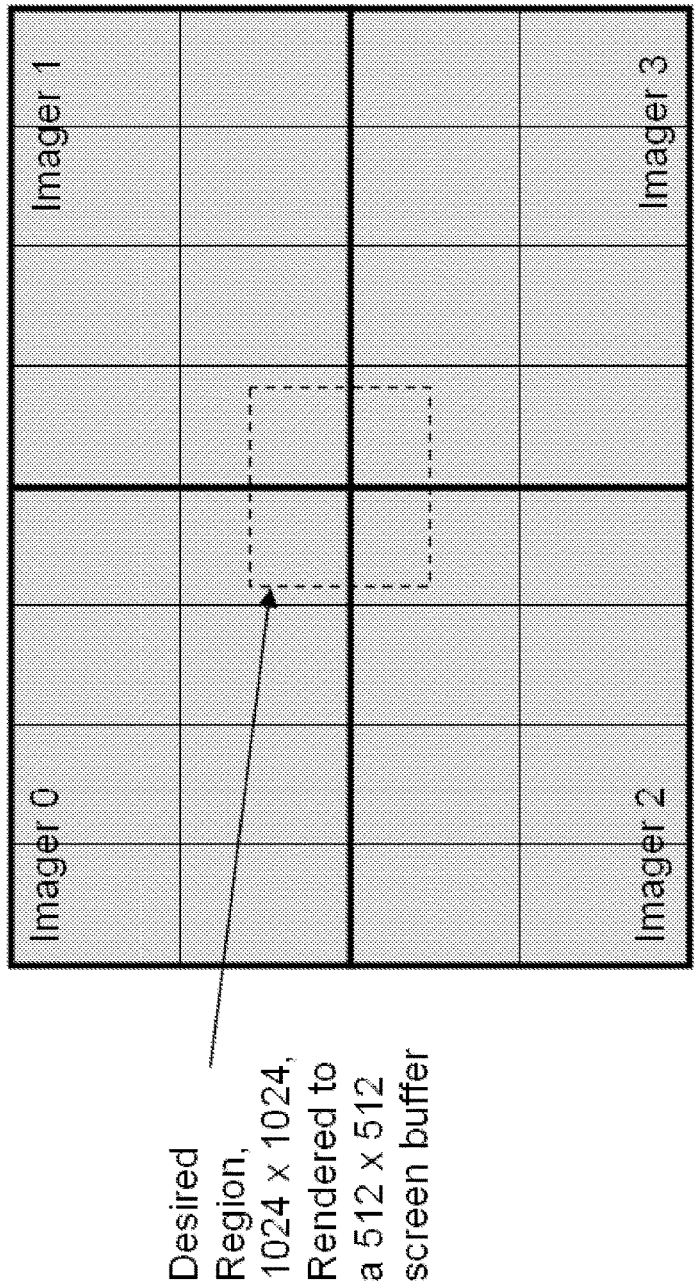

FIG. 9B shows another example of how a tiled image pyramid can allow for a more efficient codestream from the server to the client can be taken from the actual ISIS sensor and system. As a described above, a camera head (sensor) may contains hundreds of millions of pixels distributed across multiple cameras with relatively large dynamic ranges. For instance, the camera head 200 of FIG. 2A has 240 million pixels distributed across forty-eight cameras, each having 2592×1944 pixels, or approximately 5 million pixels each, each with a dynamic range of 12 bits. The imagery from each camera is decomposed into eight tiles of 648×972 pixels. A Compression engine (processor) compresses each tile at a compression ratio (e.g., 2:1, 4:1, 10:1, 20:1, etc.) In a tiled pyramid format, so that the image is stored in a memory at each of a plurality of resolutions (e.g., two, four, eight, or sixteen resolutions). In a scheme with four resolutions, level 0 of the pyramid is stored at full resolution, level 1 at half resolution each of dimension (width and height), level 2 at one-quarter resolution, and level 3 at one-eighth resolution. In general, ISIS may operate with different numbers of imagers, imager pixel counts, tile sizes, compression ratios, and numbers of pyramid levels.

By storing and serving requested data at an appropriate resolution (e.g., the minimum resolution necessary to meet the viewer's request), an ISIS system reduces the bandwidth used for data transmission. An ISIS system with the pixel and resolution parameters given above may operate with a data rate of approximately 276 MB per second from the sensor after compression, or 5.8 MB per second per image. Assume that a user wants to render a view into the scene that its 512×512 in size as it is displayed on the screen. The user's requested field of view spans images from four cameras, as in FIG. 9B, and spans an area that is 1024×1024 in raw pixels. Forcing the user to request all available imagery from a specific frame to render any sub-image pushes the data rate to 276.8 MB/second. If the user can request images from individual cameras, but does not have access to image tiling or the image pyramid of spatial resolutions, fulfilling a request for an image spanning four fields of view may requires a bandwidth of 5.8 MB/second. By allowing requests from different cameras and access to the image pyramid, but not tiling, the user could request a level 1 version of the image since the screen buffer is one half the resolution of raw imagery at a data rate of 1.44 MB/second. With independent imager requests and tiling, but no image pyramid, the user could request the four tiles containing the desired scene at full resolution for a data rate of 0.72 MB/second. Allowing requests from independent cameras, access to the image pyramid, and tiling makes it possible for the user to request only the desired tiles at level 1 of the imager pyramid for a bandwidth 0.18 MB/second. In this case, the use of both tiling and image pyramid reduces the bandwidth by a factor of up to 1536! Even greater bandwidth savings can be achieved in other implementations of the ISIS system by using smaller tile sizes or more pyramid levels.

Video Analytics

The video analytics engine 106 performs adaptive statistical background modeling and model-based tracking to supply information about activity in the scene to the operator both in real time and forensically.

Directional Activity Detection

Figure 10:
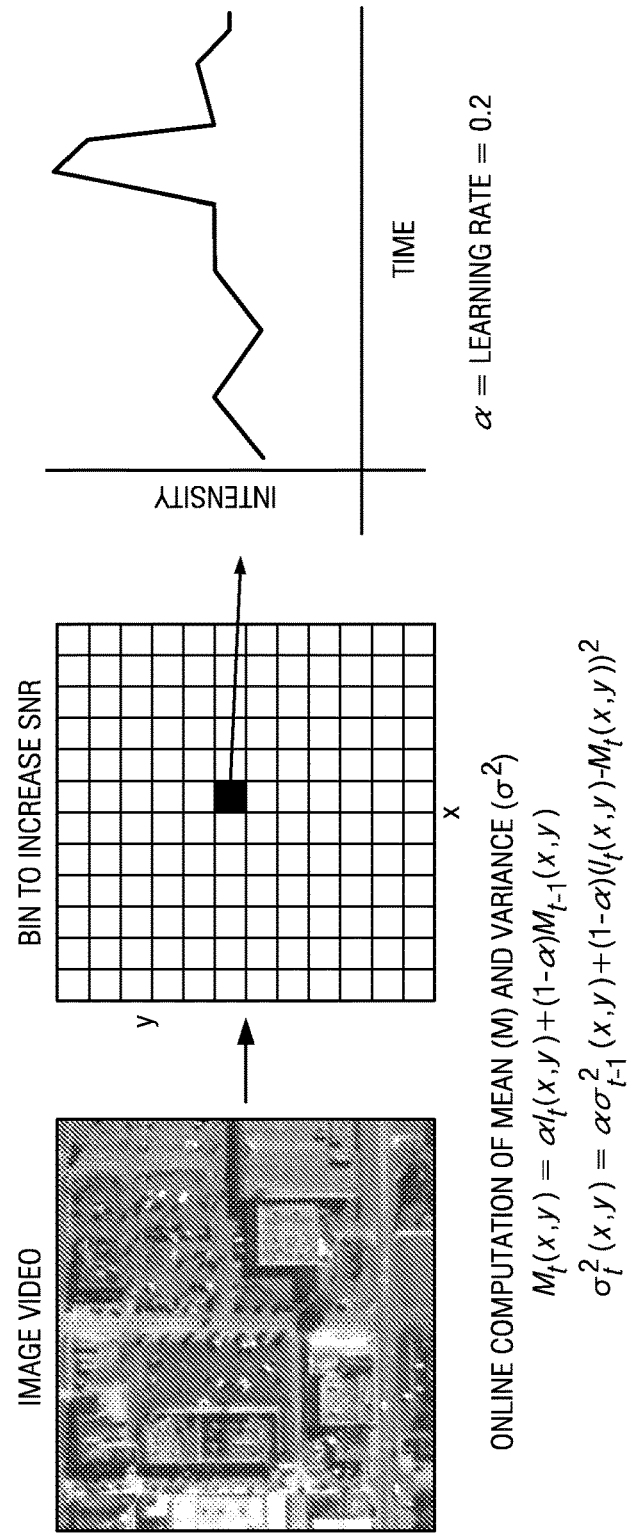
FIG. 10 illustrates adaptive statistical background modeling suitable for use with ISIS image data according to an embodiment of the present invention.

The user, through the viewer, can choose a field of view that can be screened for activity, which is defined as a change in the scene that deviates significantly from a statistical model of previous change in the scene. This process, which is shown in FIG. 10, can be described as follows:

1. A user specifies an angular field of view for analysis.
2. The ISIS system bins (downsamples) the rendered image representing the field of view to improve SNR.
3. The ISIS system computes pixel-wise mean m and pixel-wise variance σ2 of the downsampled image.
4. As each new image arrives, the ISIS system updates mean and variance based on a learning rate α such that the current mean and variance image represents a weighted average of the current mean/variance frame (multiplied by a) and the past mean/variance frame (multiplies by 1–α). The ISIS system may apply a secondary slower learning rate β in regions where the foreground has been identified from previous iterations.
5. The ISIS system computes a difference frame (absolute value of the current frame minus computed composite mean frame).
6. The ISIS system creates a binary detection map by applying the following rule: if a difference frame pixel exceeds the value of the standard deviation model scaled by a multiplier factor (e.g., 5.5), then the binary detection map for that frame is set to 1, otherwise 0. This multiplier factor can also be variable over the entire image and can be adjusted on the fly according to a rule, for example, the incidence of blobs in the image that fall below a detection threshold.
7. The ISIS system applies a de-speckling filter to the binary detection map. The filter includes a 2D box filter applied to the binary detection map. The resultant image is thresholded again and reduced to a new binary detection map to the false alarm rate.
8. The ISIS system identifies activity in a particular image if the number of pixels in the despeckled binary detection map is less than a maximum percentage of the image and greater than a minimum percentage of the image, and that these conditions are met for N consecutive frames, where N is a specifiable integer greater than zero.
9. The ISIS system applies connected components to identify individual objects in the binary image.
10. The ISIS system determines the "directionality" of the image as either up, down, left, right, none. To do determine directionally, the ISIS system computes the centroid of the largest object as determined by connected components for each frame. If the largest object is moving in a monotonically increasing or decreasing manner over a number of frames, directionality is determined.

Video Data Browsing Software (Viewer)

Figure 11:
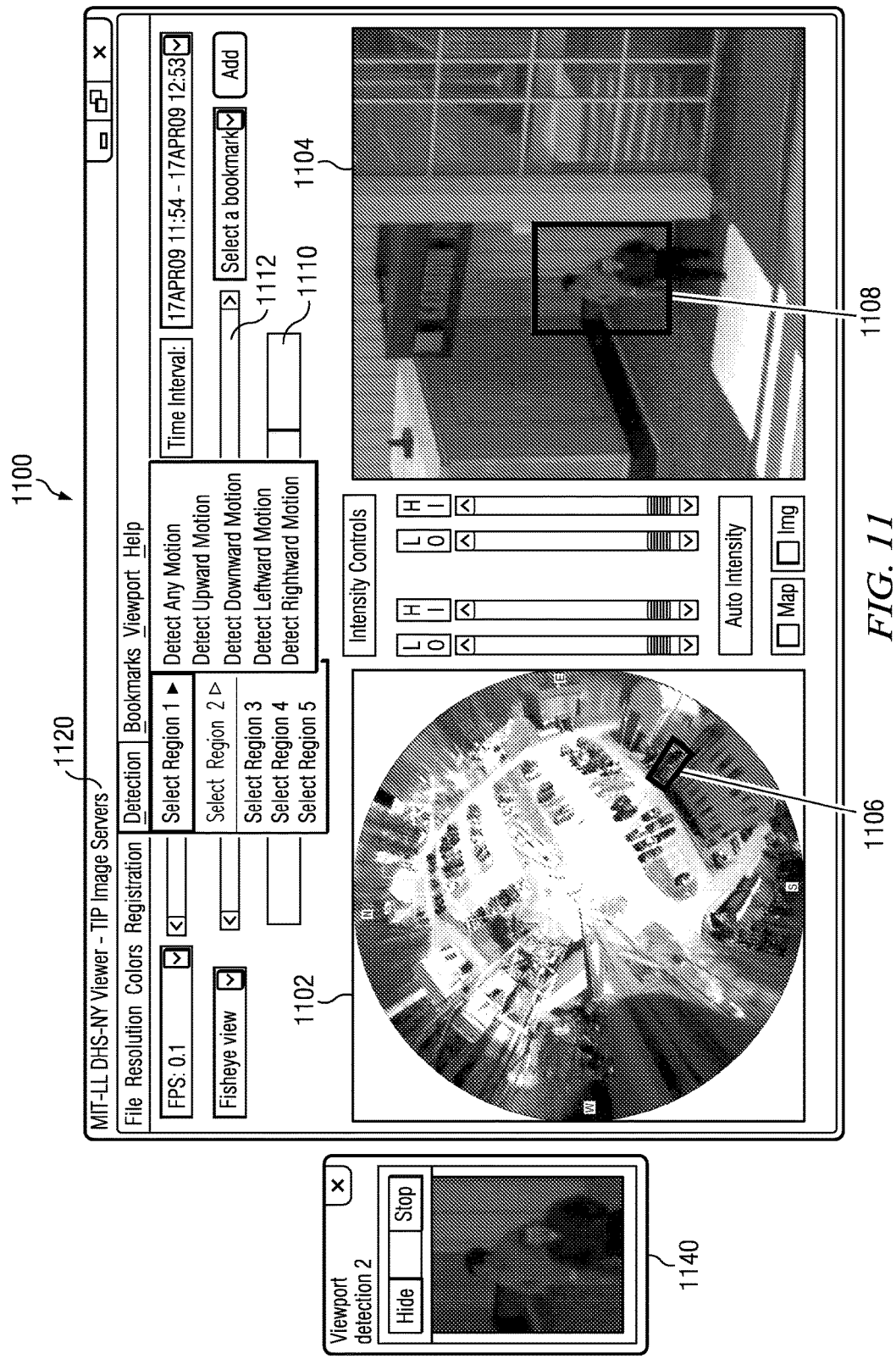
FIGS. 11-13 illustrate aspects of a user interface for an ISIS image viewer suitable for displaying and analyzing real-time and recorded data acquired by an ISIS system according to an embodiment of the present invention.
Figure 13:
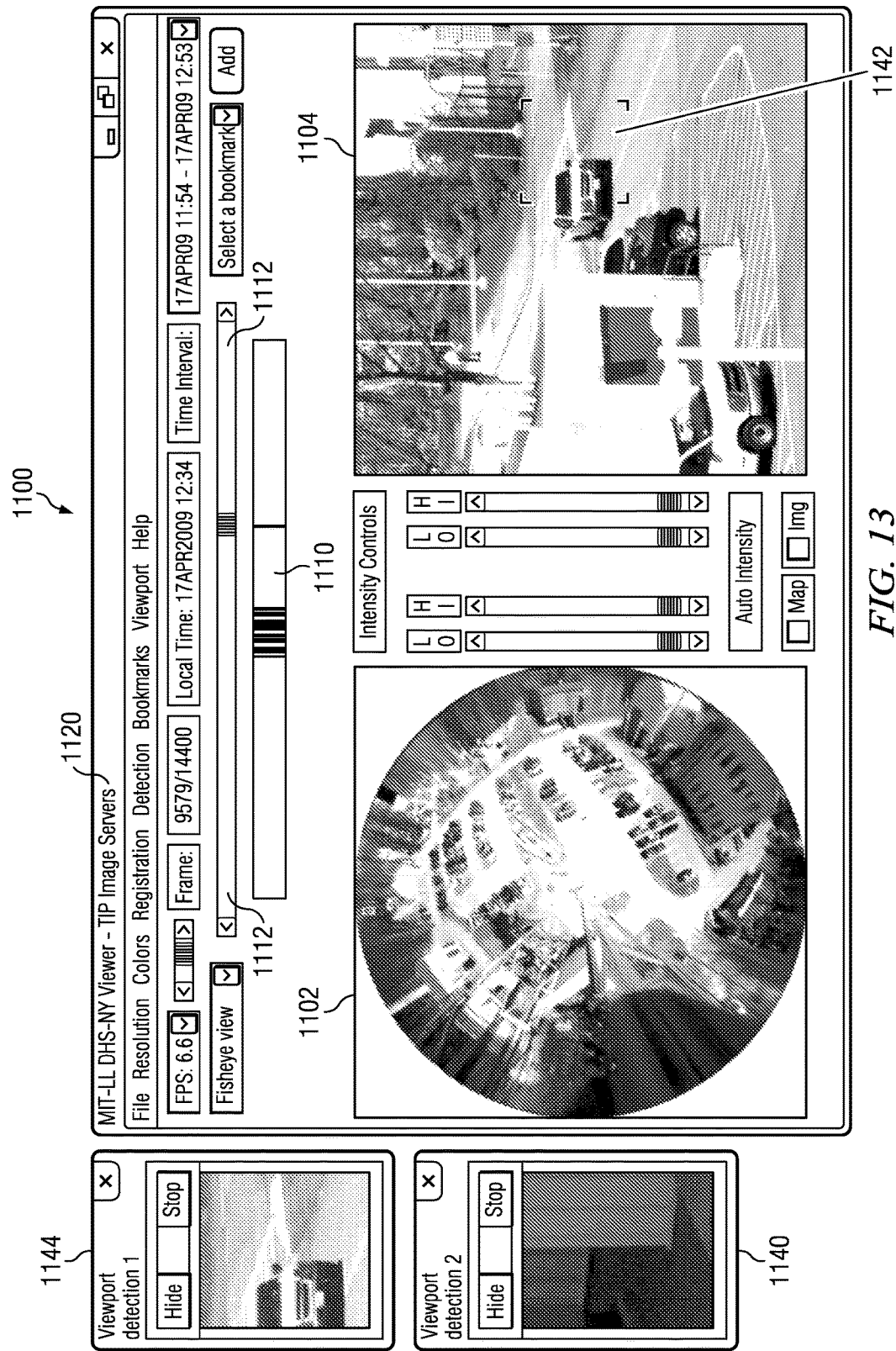

FIGS. 11 and 13 shows a screenshot of a user viewer 1100 of the interface/client 108 (FIG. 1) for displaying the imagery from the array of sensors 200 to the end user. The user view 1100 includes a 360-degree context view 1102 and a zoom view 1104 that shows a user-selected highlighted region 1106 in the context view 1102. The user view 1100 also includes an activity view 1110, which shows indications 1112 of activity in user-specified regions (exclusion zones) in the field of view, such as the highlighted region 1106. The indications 1112 may be color-coded to indicate the relative importance of the activity, in which zone the activity occurred, and/or which user initiated monitoring. The indications 1112 may also be arranged to illustrate when the activity was detected, e.g., from left to right. Menus 1120 allow the user to modify ISIS settings.

Figure 16A:
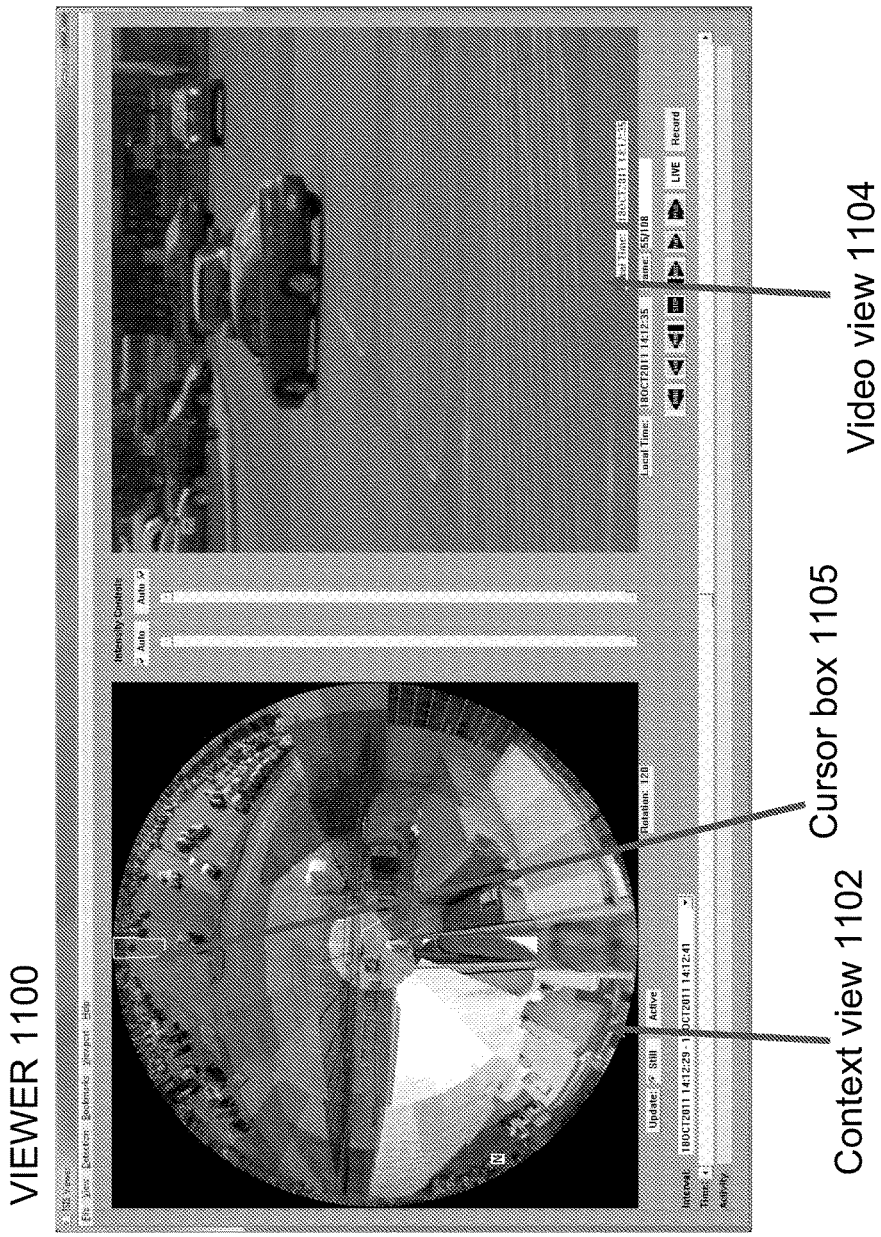
FIGS. 16A-16Q illustrates aspects of a user interface according to embodiments of the present invention.
Figure 16B:
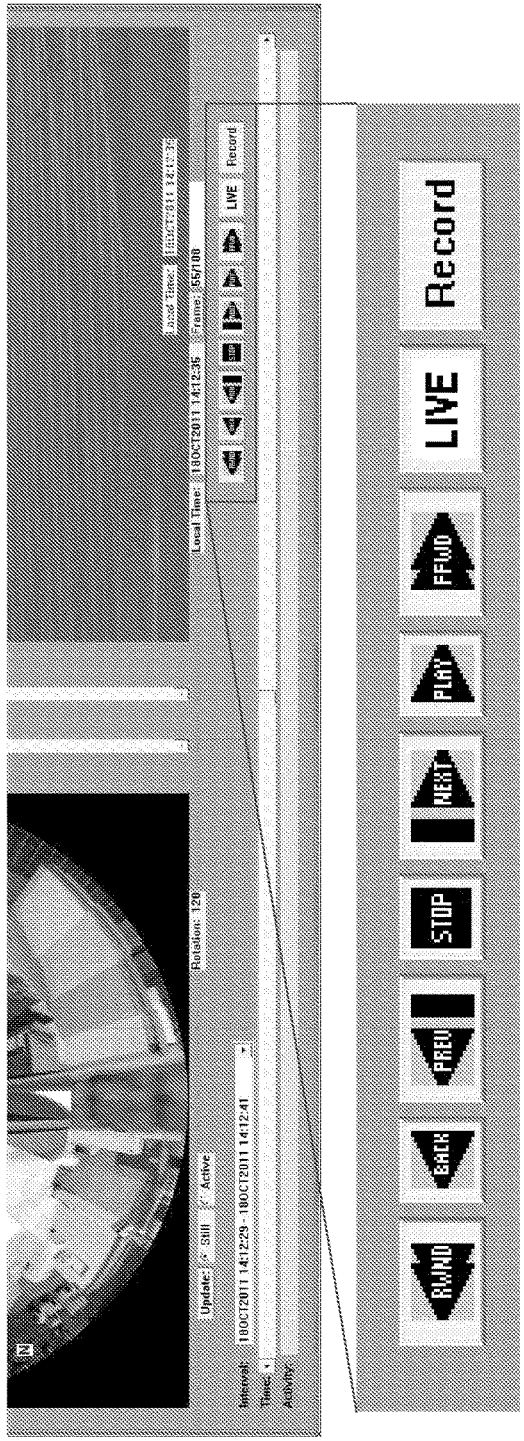
Figure 16B:
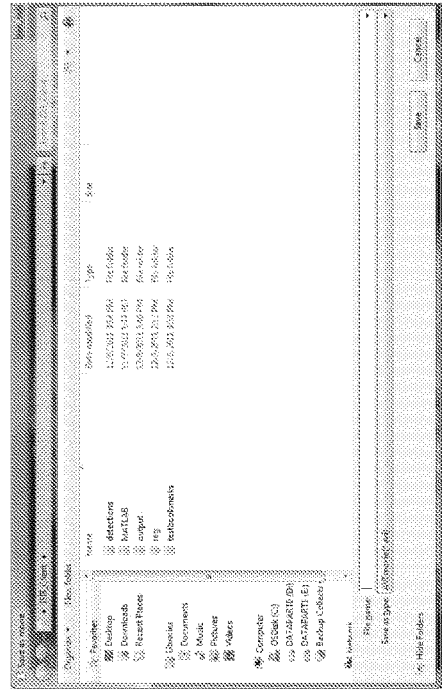

Because the data comes from many different imagers and lenses, video data from each lens/imager combination can be corrected and mathematically resampled, correcting for both perspective and distortion parameters. The viewer 1100 can also implement the video analytics and provide an interface for the user to both configure the video analytics as well as get feedback. Many of the video analytics are written for multi-threaded operation to take advantage of multiple cores on processors (parallel processing). The viewer interface 108 can also:

- Perform image warping to allow multiple camera views to be displayed as one single camera view;
- Display both 360-degree "context" view 1102 and flat rendered "video" view 1104;
- Perform virtual pan-tilt-zooms on the video view side, controllable via both keyboard and mouse click-and-drag;
- Automatically white balance and color correct to balance colors across sensors;
- Perform directional and non-directional activity detection;
- Monitor "exclusion" zones flagged by the user, e.g., in real time;
- Populate a shared activity database that includes information about directional and non-directional activity detection and/or exclusion zones;
- Determine camera regions necessary to render a particular angular view;
- Automatically pan and tilt to follow moving persons via automated tracking;
- Playback through multiple speeds, select specific frame numbers, and time intervals; and/or
- Automatically register images.
- Navigate between different hours of the day through a drop-down menu
- Change viewer sizes
- Determine an optimal dynamic range stretch in HSV space for user
- Bookmark a specific angular field of a view at a specific time in a drop-down menu that becomes available to all users on the network
- Record a video file that shows the viewer actions, including pans, tilts and zooms
- Record a specific field of view for a user-specified amount of time
- Save still images of either the context image or the narrow field of view Viewer/Dual Display: Pinching of Context Imagery FIGS. 11, 13, and 16A show that the viewer contains two major windows (more are possible and available by selecting the appropriate options). The left window, called the context view 1102, contains a "fisheye" view or modified constant angular view of the scene, stitched together from all of the imagery to provide a 360-degree view of the entire wide-area scene. This fisheye imagery is generated by using the registration data to project all of the imagery onto a three-dimensional sphere in (x, y, z) space, then projecting that image onto a plane for viewing.

The right hand view 1104, or the "video view," represents a virtual camera that can be controlled as a virtual pan, tilt and zoom. It shows a rendered image composed of one or more image tiles from one or more imagers. The video view may be operated as a virtual pan and tilt by click and dragging the image using the left mouse button. Zooming may be accomplished by using the scroll wheel or by clicking the zoom buttons on the viewer. For instance, the portion of the scene shown in the video view 1104 of FIG. 16 is over 100 meters from the sensor. Tracking objects in the video view can be accomplished by drawing a box around an object with the right button at any time and then commencing playback as described below.

The cursor box 1105 in the context view 1102 tells the viewer where the video view 1106 is located in the context view 1102. The box 1105 changes location and size as the viewer moves the field of view of the video view. The point angle of the video window (azimuth and elevation angles) can be changed in one of several ways: (1) clicking, dragging and releasing the video image view with the left mouse button will "grab" the imager and move it right, left up or down; (2) striking the arrow keys: up and down keys tilt the virtual camera up and down, and the right and left arrow keys pan right and left. The point angle can also be changed by clicking on the context image; (3) a left single click and release on the context image will immediately cue the virtual camera (video view) to be centered on the area being clicked; and (4) clicking and dragging on the context image will act like a magnifying glass, cuing the video view to the azimuth and elevation specified by the mouse location in the context window in real time as the mouse button is held down. All of these actions work while the imagery is being updated (e.g., during playback) or still (e.g., while playback is paused).

A user may zoom in and out using the mouse scroll wheel. Scrolling forwards zooms in and scrolling backwards zooms out. A double left click on the video view will zoom in and re-center the image on the point being clicked. A double right click on the video window will zoom out and recenter the video. Similarly, a double left click on the context view will zoom in and re-center the video view on the scene point being clicked, and a double right click on the context will zoom out and re-center on the point being clicked.

Figure 15:
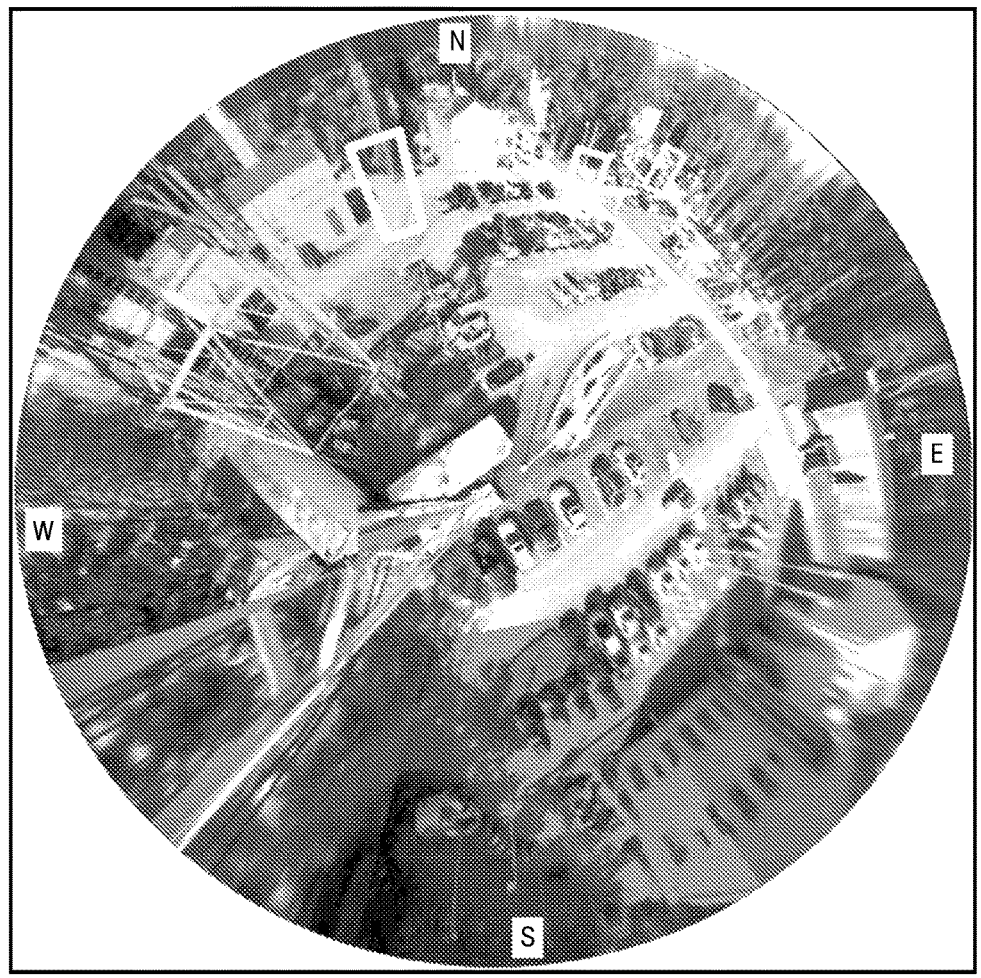
FIG. 15 shows a fisheye view that was acquired and corrected with an example ISIS system according to an embodiment of the present invention.

The object field in the fisheye view 1104 for wide-area surveillance tends to be concentrated along the "rim" of the picture, and the image is dominated by information from the near field in the center of them image. The ISIS system fixes this problem by reprojecting the imagery and "pinching" the imagery to the center, so that more detail is evident along the far field. This pinching is accomplished during projection by dividing the "z" component of the spherical (x, y, z) representation of the imagery by a scaling factor. To see how, imagine that the image is projected onto a hemispherical bowl from central point. Dividing Z by a factor greater than one (1) makes the hemisphere shallower, which reduces the values of the x and y coordinates of each point in the projected image. The overall effect is of the far field imagery being pulled to the center of the field of view. By compressing the sphere in this way, the projection emphasizes the far field and makes the user better able to see activity in the far field, as shown in FIG. 15.

Activity Detection User Interface

Figure 12:
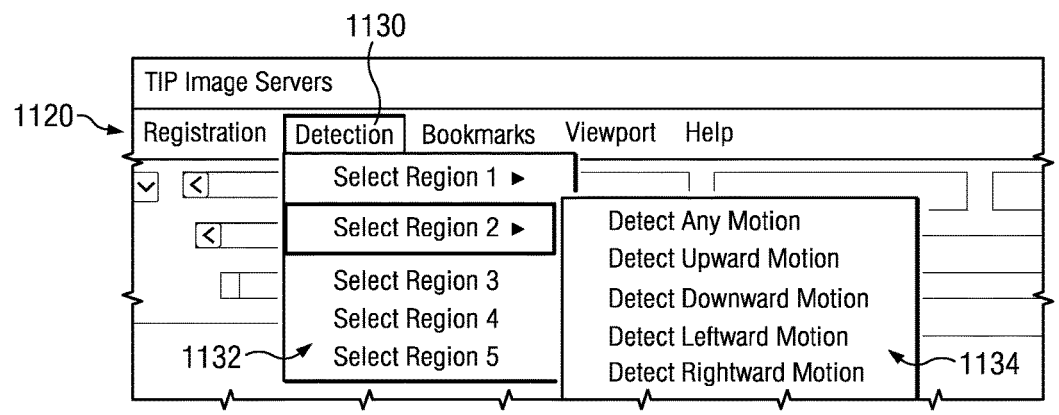

The user may configure the viewer 1100 to scan an angular region for activity, both on live data as well as stored data. The user can specify multiple such regions to watch simultaneously. The user specifies a single detection region by first using the "video" or right hand window to zoom into the area that will be watched. Then, as shown in FIG. 12, the user can choose a detection option 1130 in the main menu toolbar 1120, an index 1132 of the region that he/she wants to select, and then a direction of motion 1134 (e.g., upward, downward, leftward, rightward, any motion) that he/she wants to detect. Directional motion is determined based on the overall trajectory of the largest connected component in the binary detection image produced by the detection algorithm as described above.

After the user specifies the type of motion, the interface/client 108 prompts the user to specify the sub-region within the field of view for which activity detection is desired. The user selects the sub-region by drawing a box by depressing the right mouse button. Then the interface/client 108 breaks out a second window 1140 from the main window to show the selected sub-region. In this way, the operator can visually monitor the detection region even as he/she uses the main video window to browse elsewhere in the image. The user may repeat this process to specify other regions to observe, and other windows will be broken out as well. At any time, the user may specify additional detection regions.

Once the ISIS system 100 has acquired enough data, the user can click a play button, causing the interface/client 108 to begin playing video through at the viewer 1100 and the ISIS video analytics engine 106 to process the data played back through the viewer 1100. If the user wants to play very quickly through the data, he can click on a "detection mode" checkbox which will cease all image requests and rendering for all imagery in the viewer except for the image regions corresponding to the selected detection areas, speeding up the performance of the viewer.

In the view 1100 shown in FIG. 11, the user has drawn a box 1108 around a particular sub-region with within the right-hand video window 1104. Another box 1106 has been drawn around a doorway in another region of the image. The specified regions 1106, 1108 are shown as different-colored boxes in the left-hand 360 degree context view 1102 as well, and a break-out box 1140 on the left hand side shows sub-region 1108 at all times regardless of what the viewer is looking at in the right-hand video window. (See also sub-region 1142 and corresponding break-out box 1144 in FIG. 13.)

The lines 1112 in the activity bar 1110 underneath the main time bar indicate periods of time where detected activity has occurred. The color of the lines correspond to the color of the box around the user-specified area to monitor. The user may jump to these time periods in one of two ways: 1) by clicking on the line below the time bar, or 2) by clicking on the buttons with arrows "Nxt Det" below the window. Clicking on the buttons will jump the user to the next or previous detection relative to the current time frame. By clicking these buttons, the user can very quickly scan through all of the detections present over a longer time epoch—for example, an hour—in just seconds. As the viewer is playing through video looking for detections, if the video analytics engine 106 determines that there is activity, then the window will flash red, alerting the user that activity is present at that moment in time.

Object Tracking

Figure 16C:
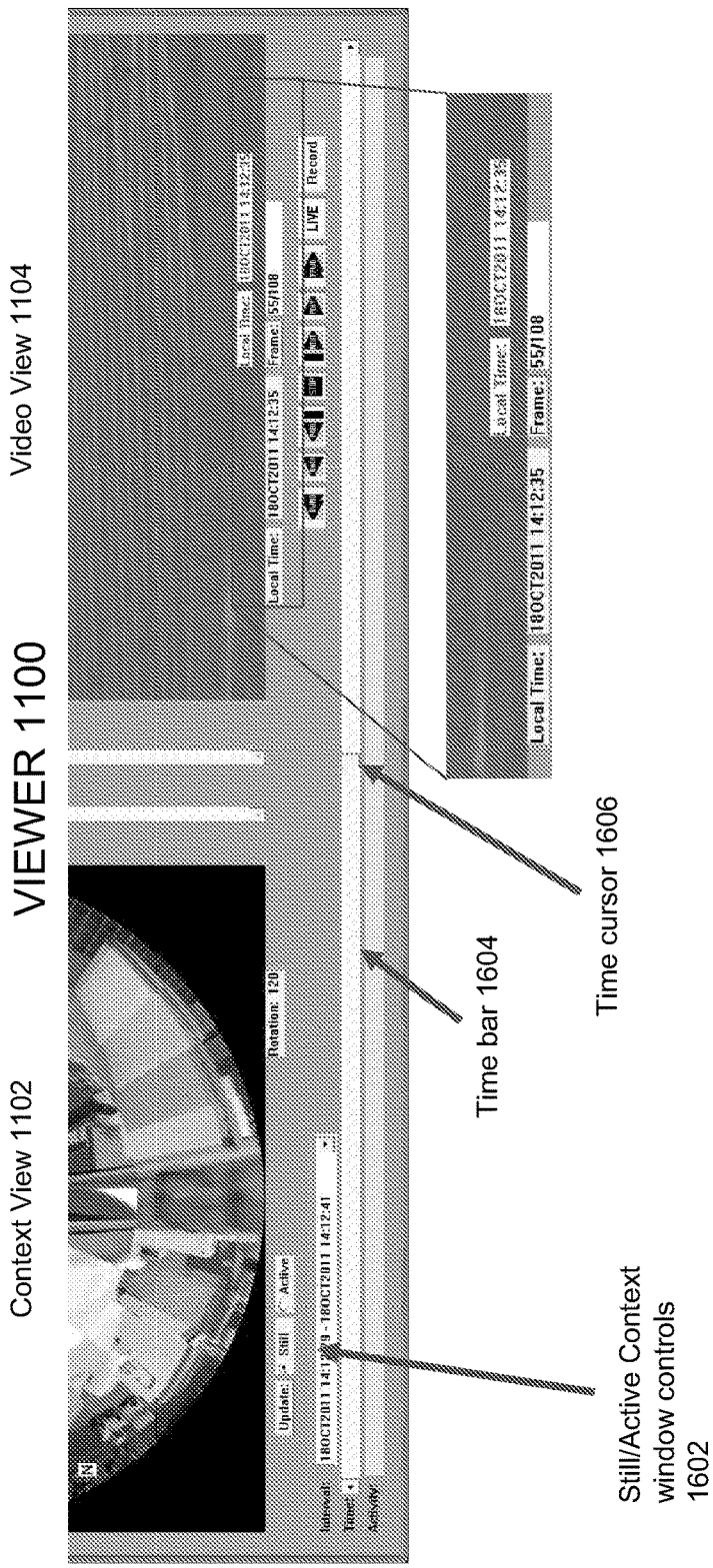
Figure 16D:
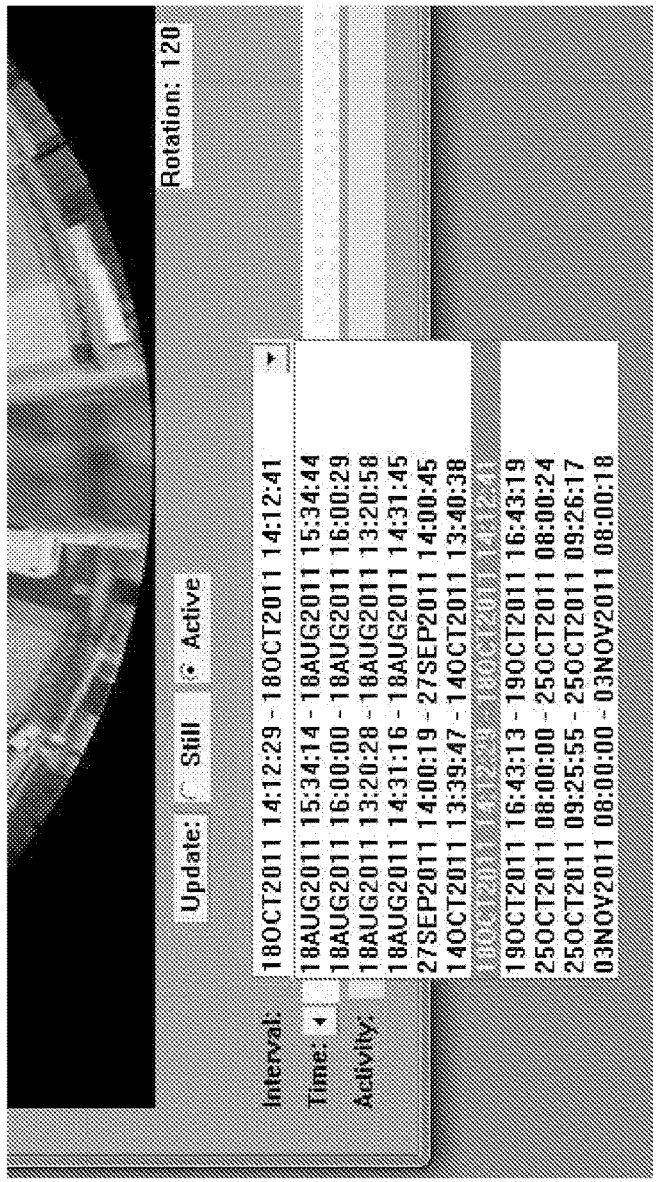
Figure 16E:
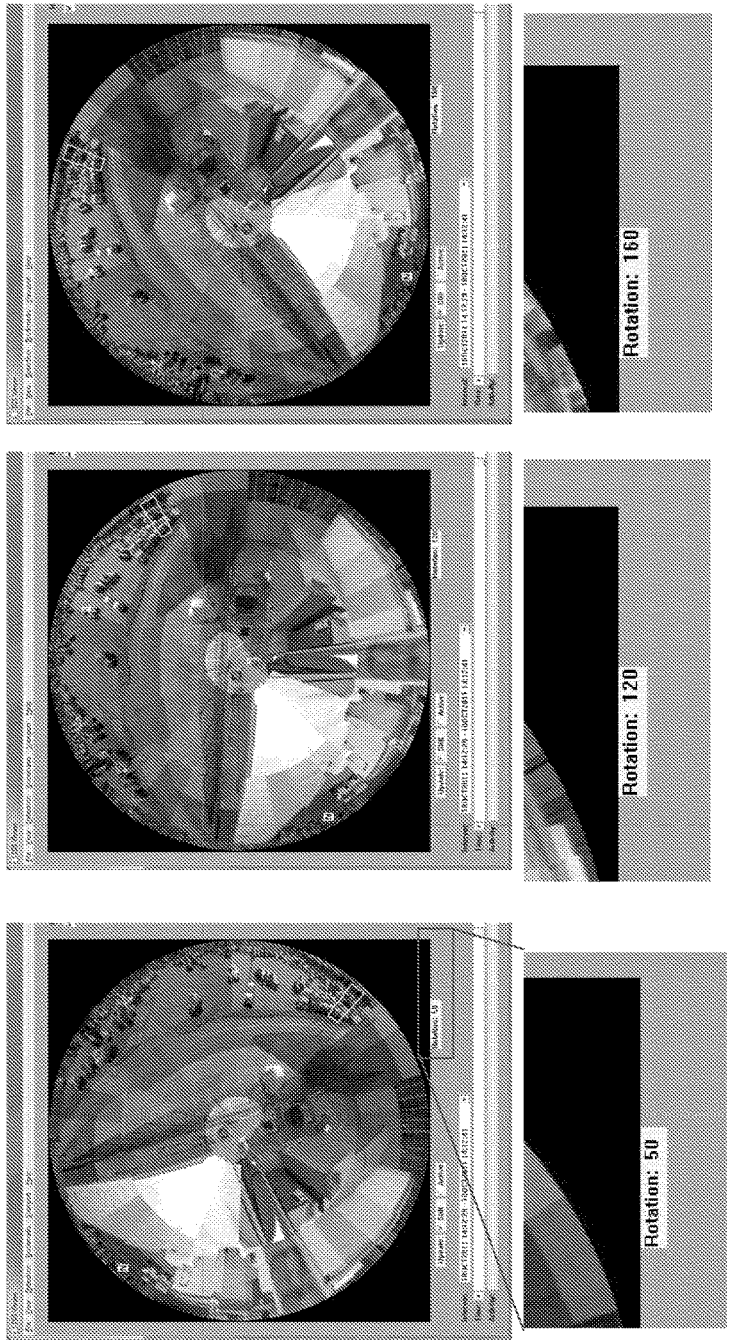
Figure 16F:
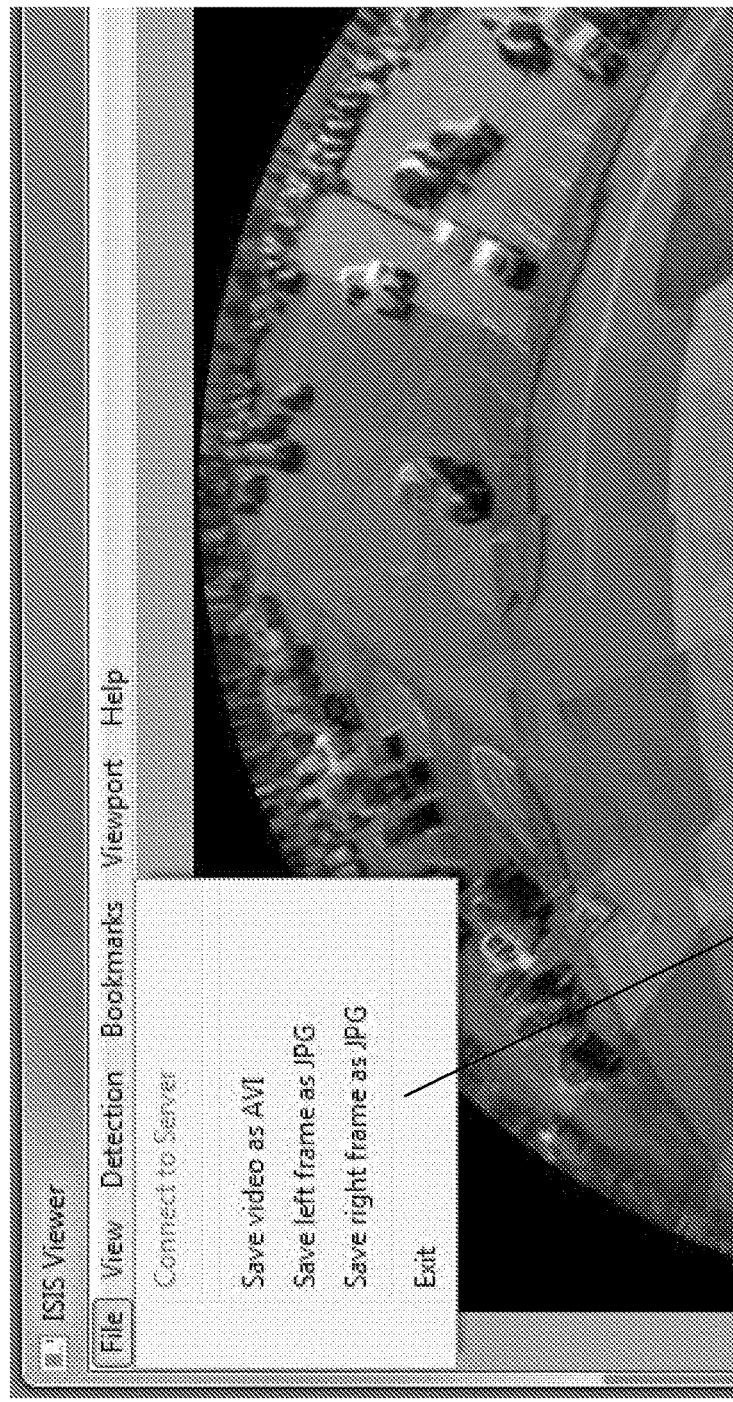
Figure 16G:
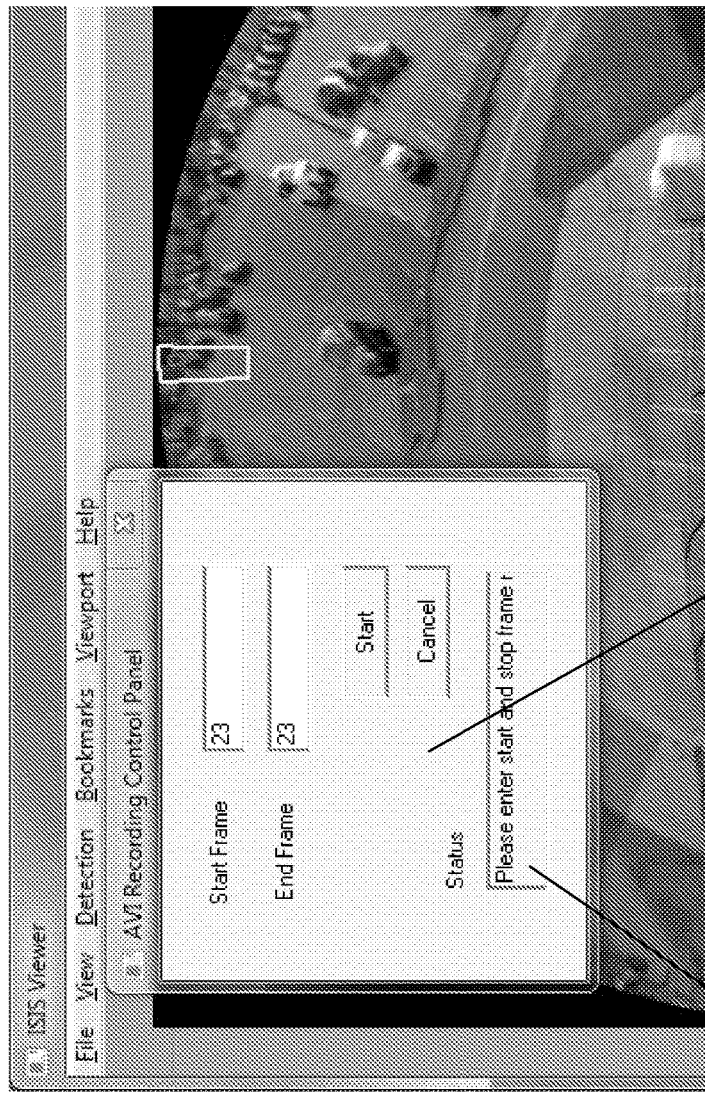
Figure 16H:
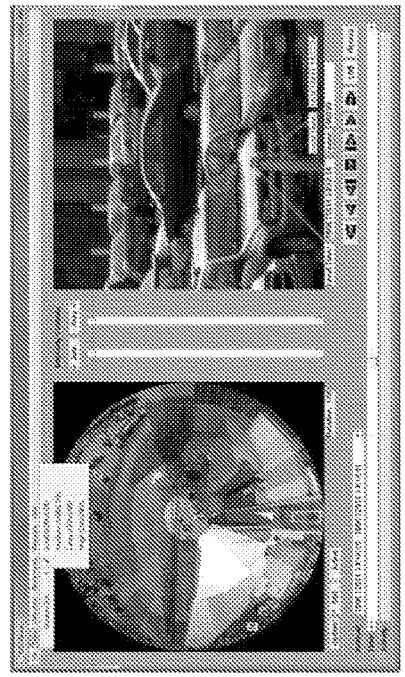
Figure 16H:
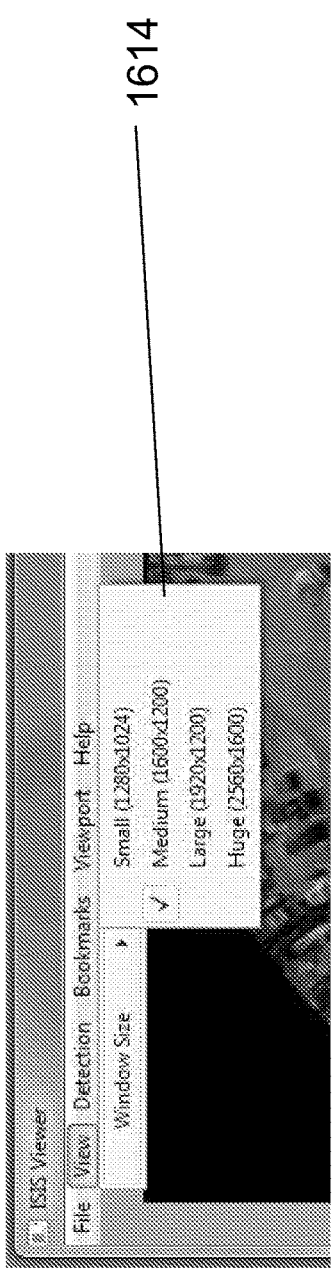
Figure 16H:
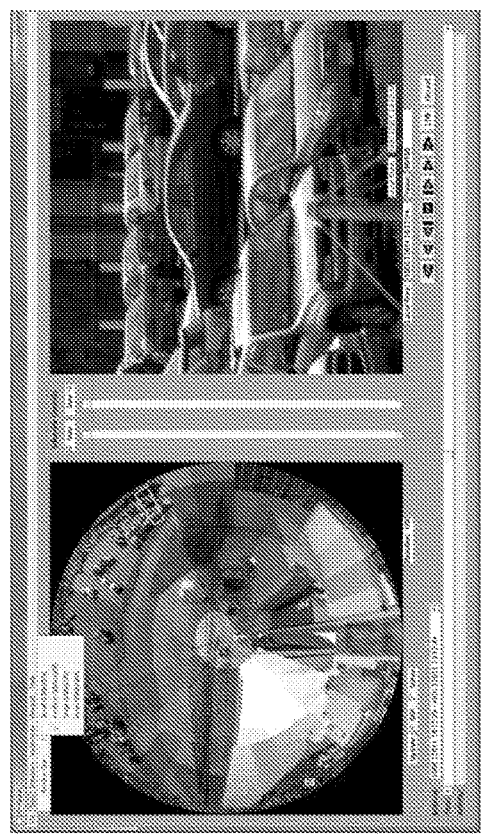
Figure 16I:
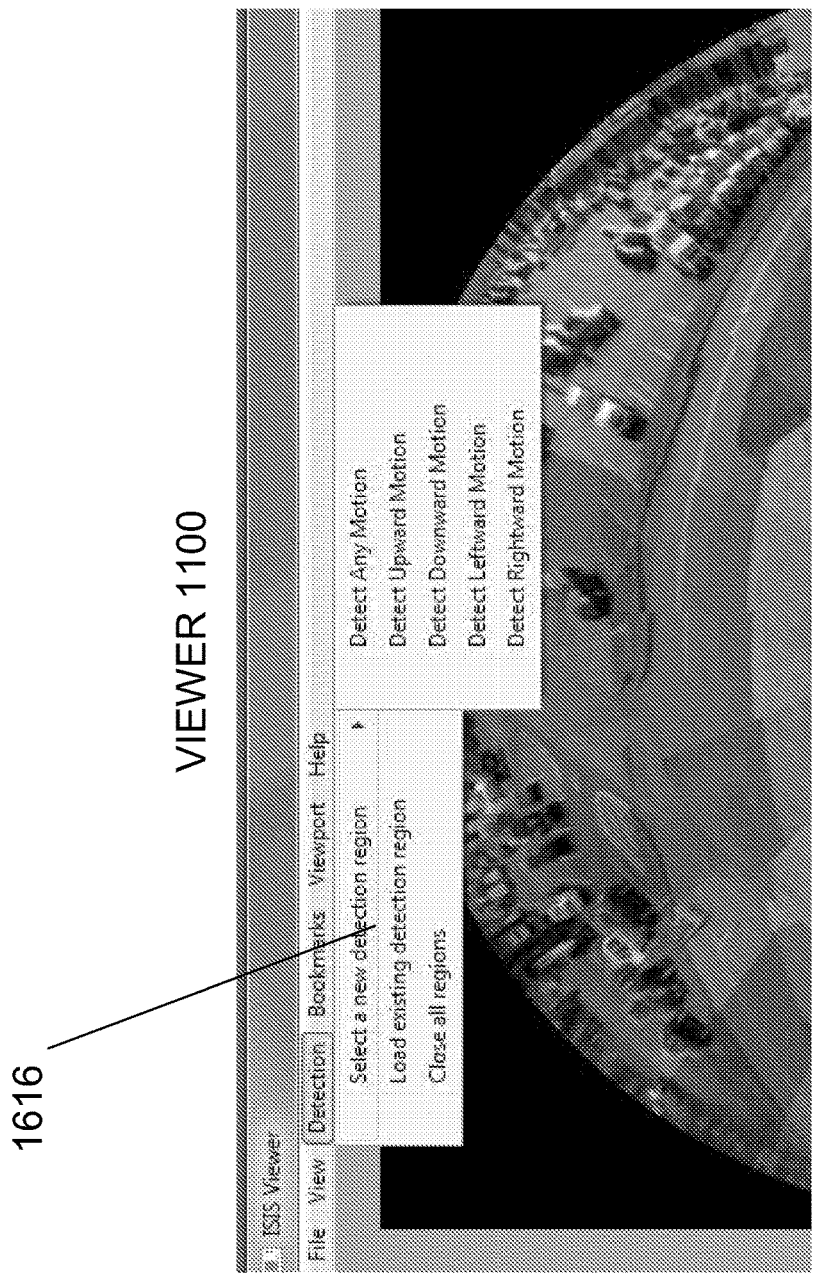
Figure 16J:
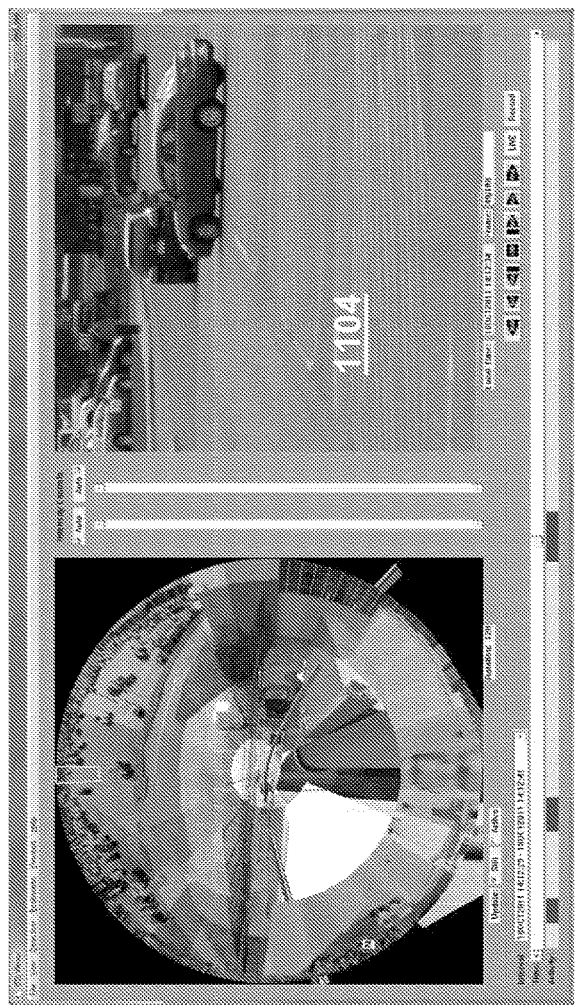
Figure 16J:
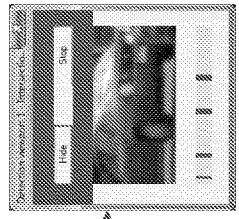
Figure 16J:
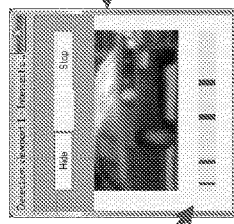
Figure 16K:
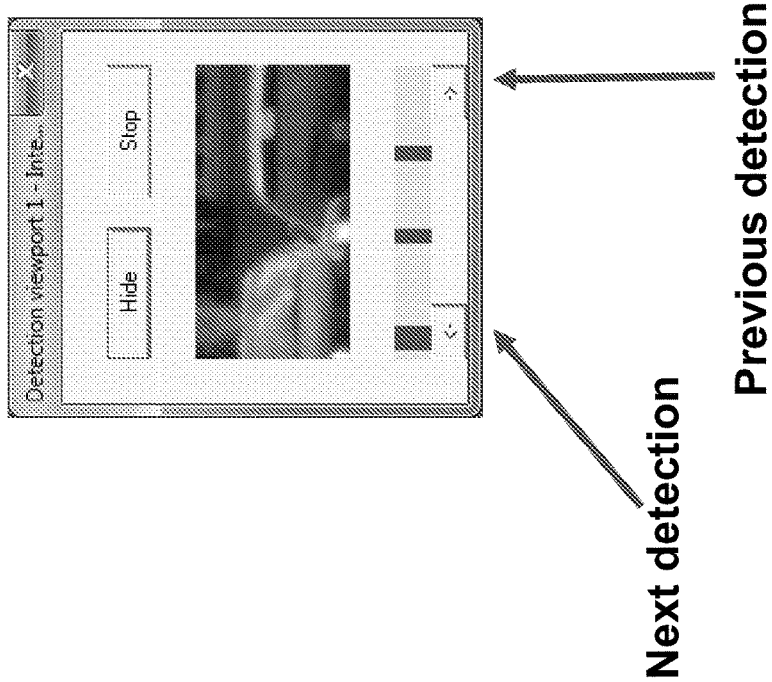
Figure 16L:
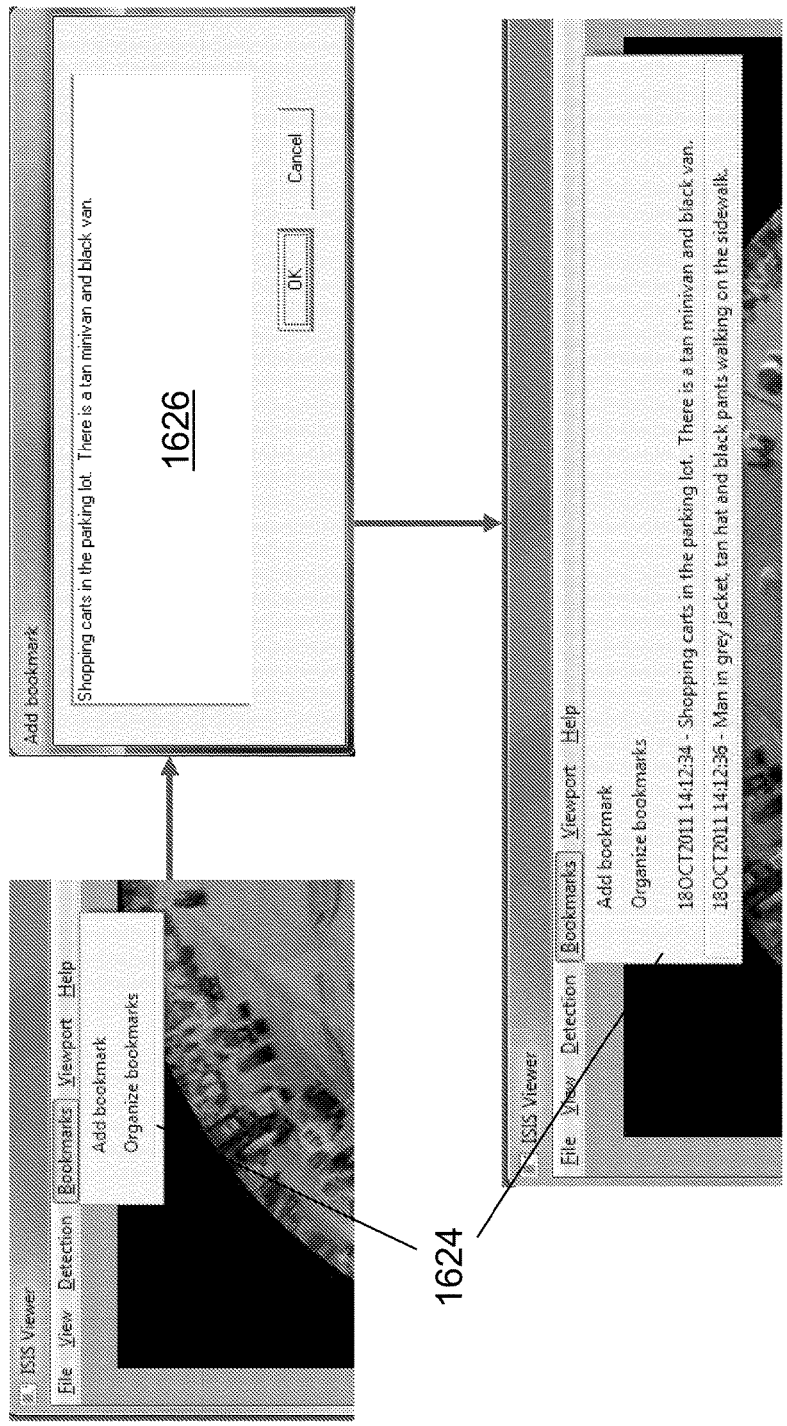
Figure 16M:
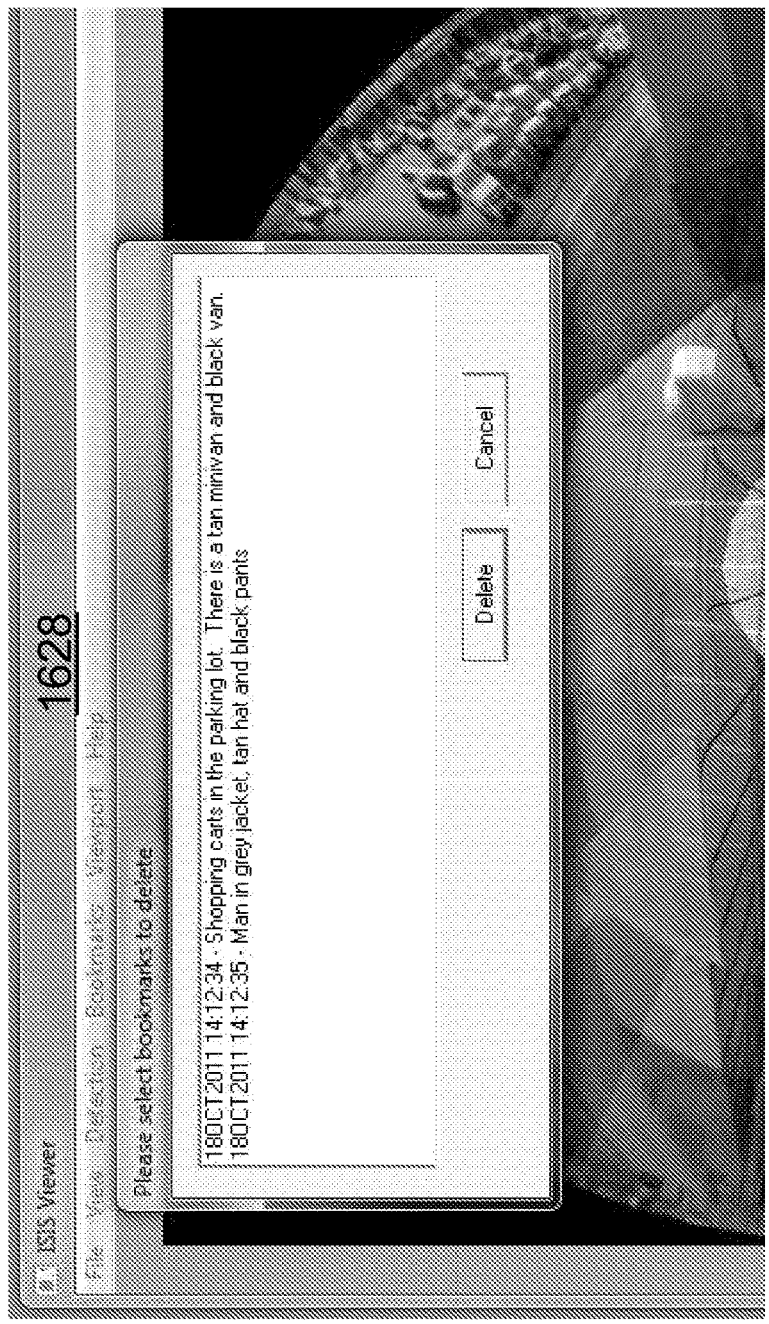
Figure 16N:
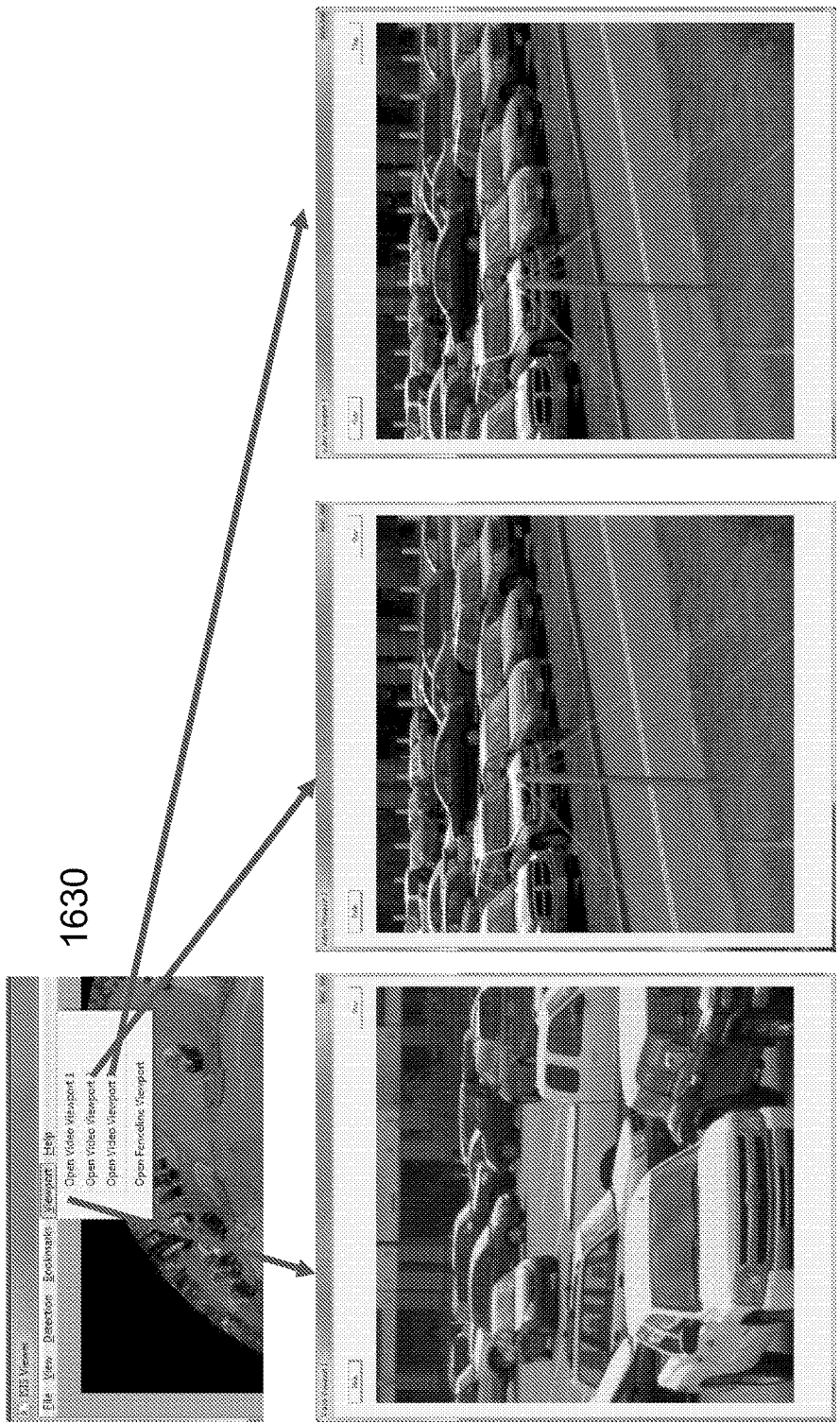
Figure 16O:
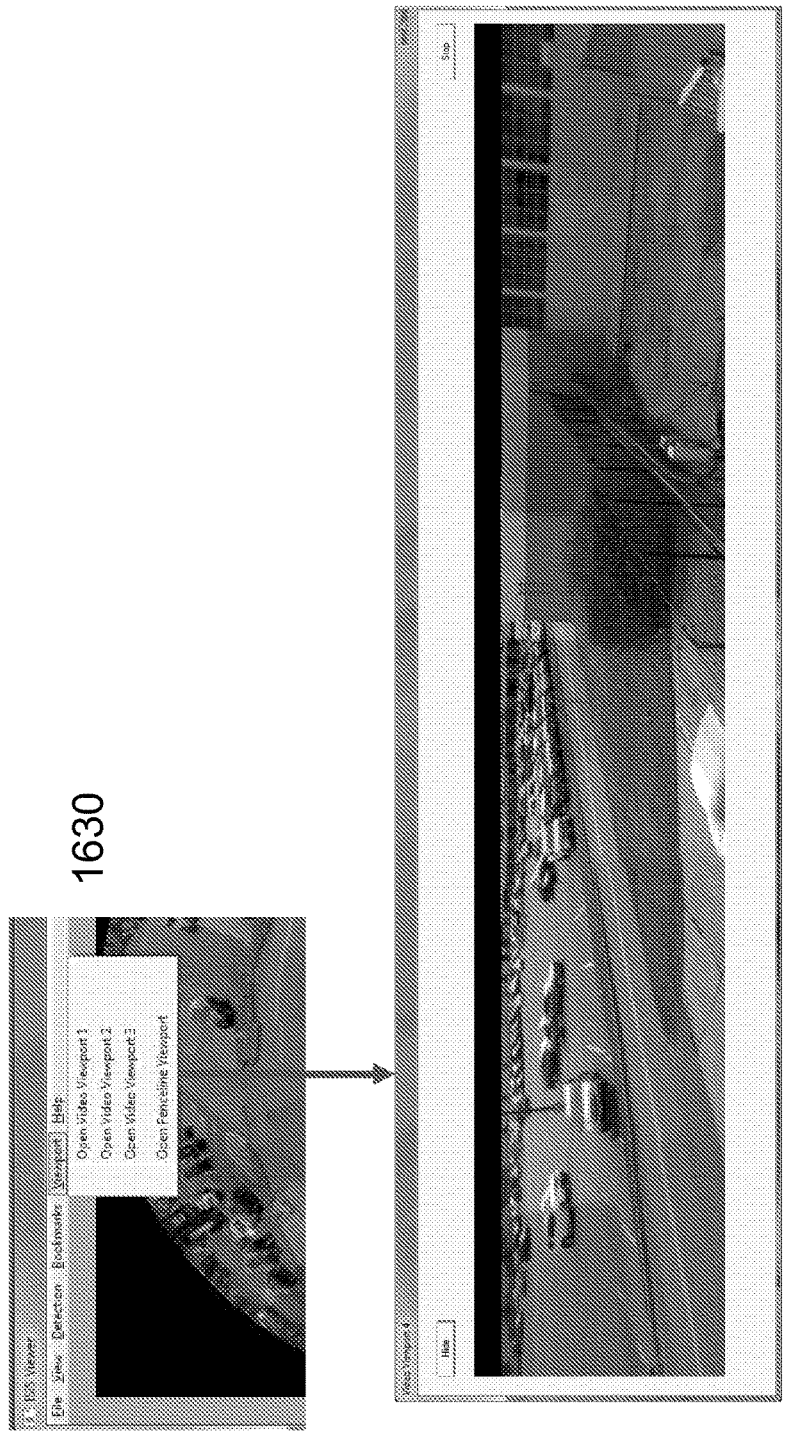
Figure 16P:
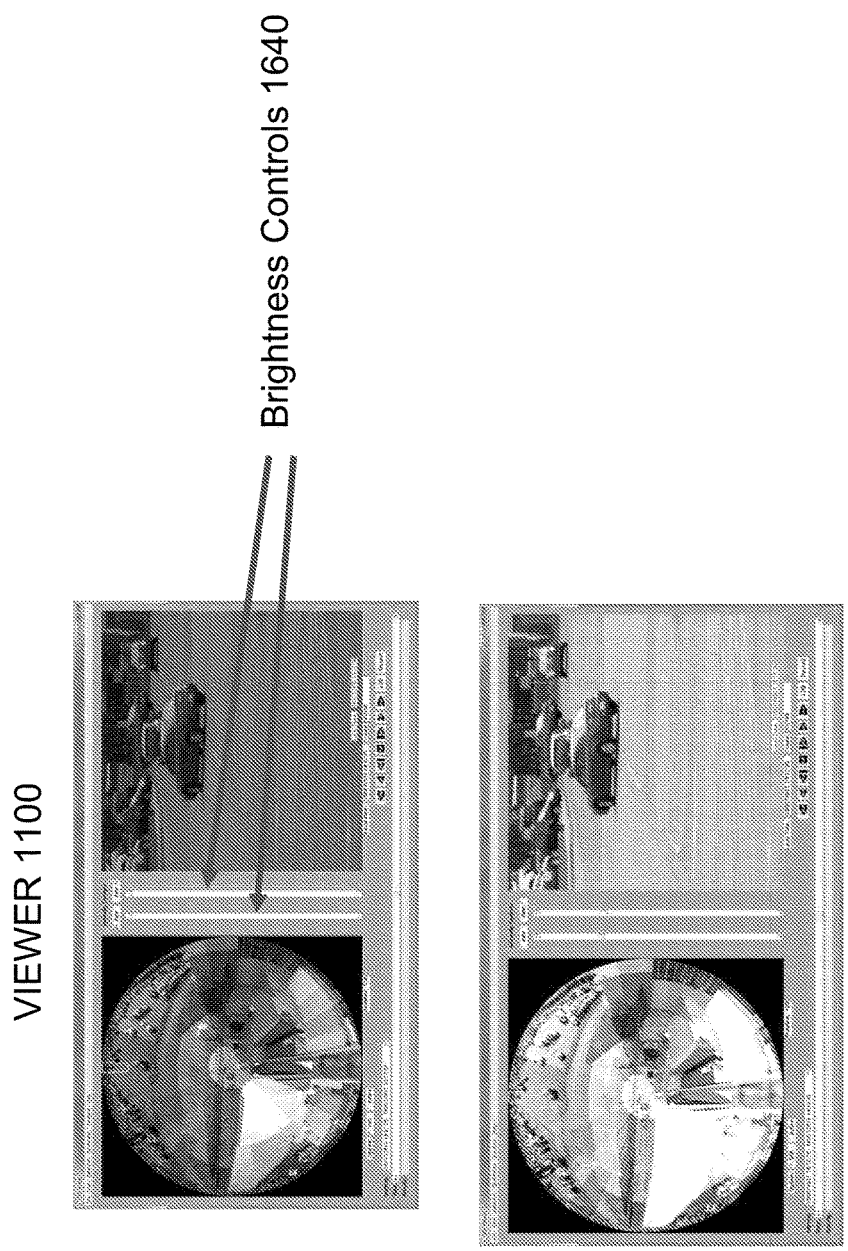
Figure 16Q:
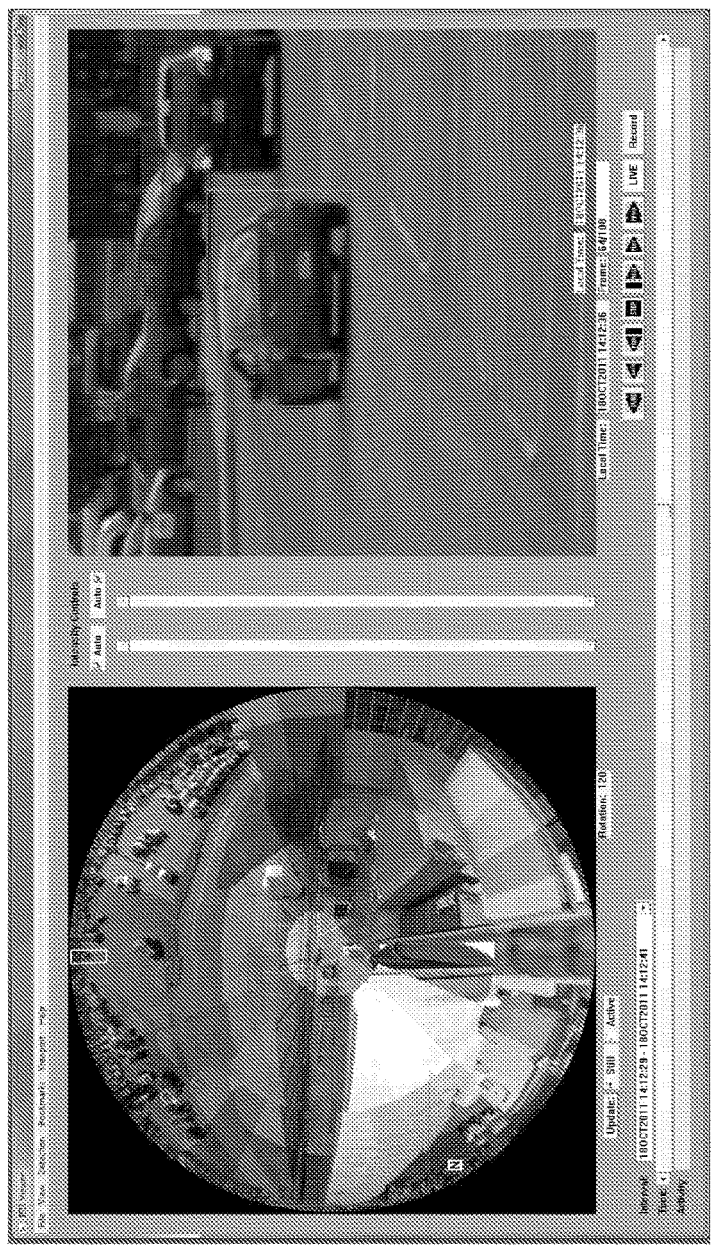

FIG. 16Q illustrates how a user can track and follow an object in the scene: the user simply uses the right mouse button at time to click, drag and release to draw a box around the object of interest. During subsequent playback either forward or backward, the virtual pan/tilt/zoom in the video view 1104 automatically re-centers itself on the object each frame. Modifications to the continuously adaptive mean shift (CAMSHIFT) and Markov chain Monte Carlo (MCMC) tracking techniques are incorporated into the viewer 1100. A segmentation front end based on the detection results separates foreground from background when tracking moving objects. Rules to switch between tracking moving and stationary targets were implemented and prototyped. For more on the CAMSHIFT and MCMC tracking techniques, see D. Comaniciu et al., "Real-time tracking of non-rigid objects using mean shift," IEEE Conf. on Computer Vision and Pattern Recognition, II, Hilton Head, S.C., pp. 142-149, and P. Perez et al., "Color-based probabilistic tracking," European Conf. on Computer Vision, pp. 661-675, each of which is incorporated herein by reference in its entirety.

Choosing Resolutions and Tiles During Viewing

When the interface/client 108 renders an image, it chooses the resolution at which the imagery is rendered, as well as the specific tiles from which the rendered image is created. Raw imagery from each imager is usually tiled into blocks, and then each tile is stored at multiple resolutions, with the dimension of the width and height halved at each successive resolution. For example, if the original tile is 128×128 pixels, the tile could be retrieved at a resolution of 128×128, 64×64, 32×32, 16×16, or 8×8. The tile and resolution that is chosen is based on the registration of the imagery done earlier in the calibration process.

For example, consider that the user wants to render a 512×512 view of scene at a particular point angle and angular field of view, (for example, a view centered at azimuth 190 degrees, elevation 44 degrees, field of view 6.3 degrees in both azimuth and elevation). The registration process 600 (FIG. 6B) allows the viewer to map directly each pixel in the rendered image back to a specific pixel from the original imager. Thus, the user can determine exactly which tiles he/she wants to retrieve from the compressed imager. To optimize bandwidth usage and facilitate real-time playback, the user can choose the resolution level of the tile that most closely matches the resolution at which the tile will be rendered. For example, if the 128×128 tile of raw imagery is to be rendered to a region in the requested angular field of view at the desired 512×512 resolution that is approximately 15×15 pixels in size—and this is determined through the registration process, then the user can choose the 16×16 resolution level of the compressed tile and optimize bandwidth by a factor of approximately 64 times as compared to requesting the frame at the full resolution.

The resolution is chosen by determining which the nearest compressed resolution (e.g., 128×128, 64×64, 32×32, 16×16, or 8×8) in a $\log_2$ sense. Thus, if the rendered image is N pixels wide, the viewer chooses a resolution with a $\log_2$ that is closest to log N. For example, if the width of the rendered region is 12 pixels, $\log_2 12=3.58$, $\log_2 16=4$, and $\log_2 8=3$, so the viewer would choose the 16×16 tile to render the imagery because 16 has the closest $\log_2$ value.

Examples of Stitched Imagery

Figure 14:
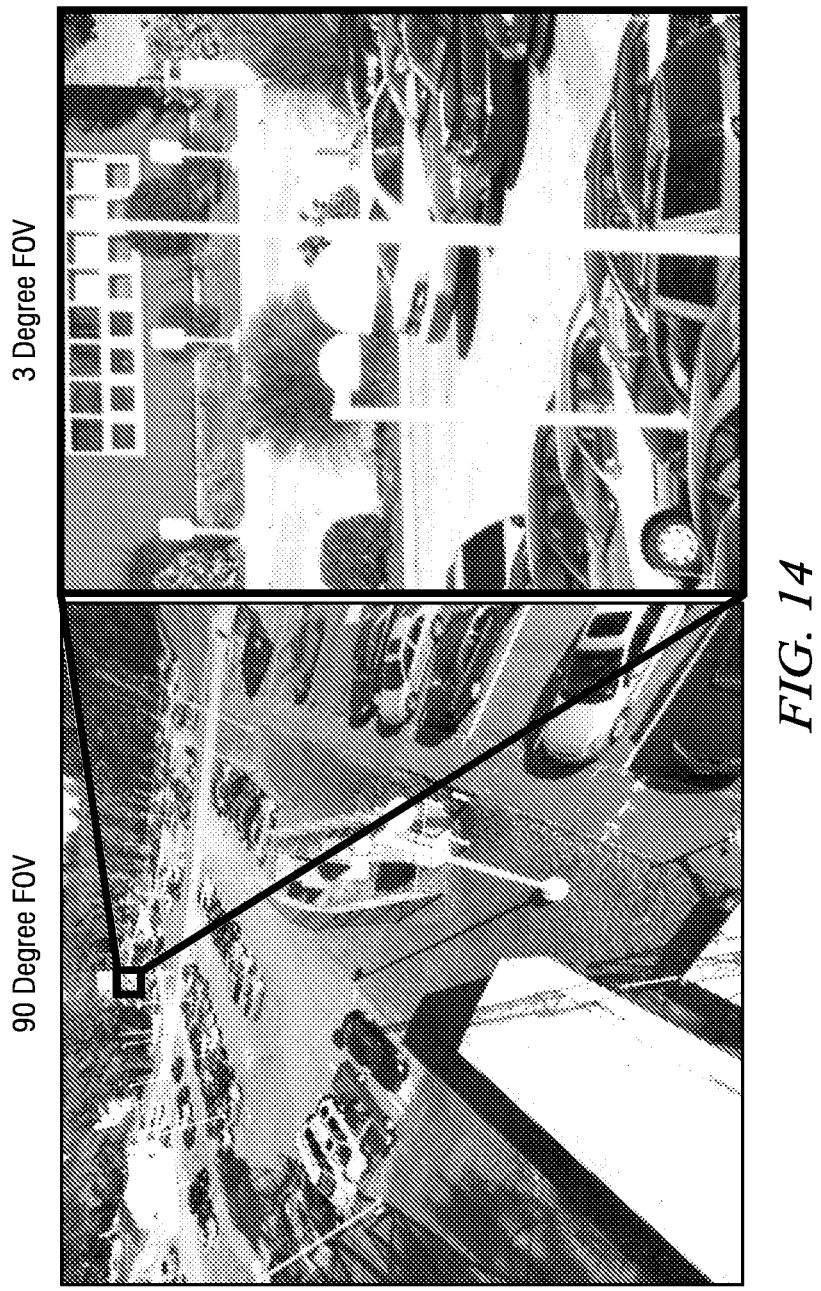
FIG. 14 shows rendered video views of 90-degree and 3-degree scenes acquired with an example ISIS system according to an embodiment of the present invention.

The imagery in FIG. 14 shows two rendered video views. The right hand view is rendered from several cameras to produce a single 90-degree view of the scene. To produce the image, the distortion of the lenses was removed, and the projection parameters for each camera was computed through registration. The right hand image shows a rendered 3-degree field of view, which shows the spatial resolution of imagery that is present throughout the entire scene, but not rendered unless needed.

Video Controls

FIG. 16C shows video controls that allow the user to play back, rewind, fast forward, and skip through record video data. The "Record" button records every frame being viewed by the user in the video view and writes it to a video file. In this way, all of the virtual pans, tilts and zooms maybe recorded by the user. Upon clicking the record button, a record dialog box appears to prompt the user to specify a file name.

Time and Frame Indicators

FIG. 16C illustrates time and frame indicators, including a time bar 1604 and a time cursor 1606. Each data interval (for example, a data interval composed of imagery collected over the course of one hour) contains a certain number of frames. The "Frame" button indicates the total number of frames and the current frame being watched. Implemented frame rates include four and eight frames per second, but different frames rates are possible. If the user types a frame number in the frame number field, the user may click the "Frame:" button and jump to that frame in the video window. The time cursor 1606 may also be used to move quickly through the data set. The location of the time cursor 1606 on the time bar 1604 indicates the temporal position of the currently viewed frame in the current data set. Left clicking and dragging the time cursor 1606 right and left updates the video view 1104 in real time as the user drags the cursor 1606 forward and backward (left and right) in time. The "Local Time" field on both the video view 1104 lower right hand corner as well as to the left of the frame indicator both indicates the real-world date and time of the current video view image.

FIG. 16C also shows the viewer's still/active context window controls 1602. Because the context window 1102 draws imagery from all of the cameras in the camera arrays, updating the context view 1102 can be more computationally intensive than updating the video view 1104. To keep from these updates from taxing the processor of the viewer computer, it may be desirable for the user to specify a static image for display in the context view 1102. The still/active radio buttons in the controls 1602 toggle the state of the context window 1102 between being still (no update) and updated as playback occurs (i.e., what is on the context view 1102 reflects the same moment in time as the video view 1104). The frame rate of the context window 1102 when in update mode may be adjusted to be N/M, where N is the frame rate of the overall video collect and M<N. The ratio of N to M depends on the desired computational load on the viewer computer.

Intervals

FIG. 16D illustrates different time periods, called "intervals," as they can be selected in the viewer 1100. The user can choose which interval the user wants to load at any given time by selecting an "Interval" dropdown box and clicking on a particular entry, which may be named according to date, start and end time. Intervals are usually one hour but may be shorter or longer depending on how the server collection software is configured. Once loaded, the imagery in the viewer is loaded from that hour in both the context and video windows, and the color calibration coefficients for that moment in time are computed and applied to the imagery. The viewer may also change intervals by playing forward through the end of a data set, when the next most recent data set will be loaded at the start, and by playing backward through the beginning of a data set, when the next least recent data set will be loaded at the last frame of the data set.

Rotating the Context Window

FIG. 16E illustrates how to rotate perspective of the image displayed in the context view 1102. Depending on the preference of the user, the user may specify how the user wants to orient the image of wide-area scene displayed in the context view 1102. Pressing the "r" button repeatedly rotates the view to the right, and pressing "l" rotates the context view to the left. The angle of rotation in degrees is indicated in the "Rotation: text field. The "N" text indicator on the rotation window indicates which direction is north and rotates with the context view to continue to indicate true north.

Saving, Recording, and Displaying Imagery

FIG. 16F illustrates a file menu 1608 with choices for saving displayed imagery. The file menu 1608 gives a user the option to export a time epoch at a fixed angular field of view, or to save the current video (right) or context (left) frame as a JPEG file. The "Save JPG" menus prompt the user for a file name and allow the user to save the resulting file to any folder in the user's file system.

FIG. 16G illustrates a recording control panel 1610. Different from the record button, the recording control panel 1610 allows the user to specify a starting and ending frame. The current angular video view's parameters (azimuth, elevation, field of view) may be used for the recorded video, which can be stored in AVI format or any other suitable format. Once the user clicks start, a status indicator 1612 informs the user of the progress of the video export by a status indicator; when recording is complete, the user can return to browsing the video normally.

FIG. 16H shows a view menu 1614 that lets the user specify the overall resolution of the viewer. In some examples, four sizes are available. The numbers in parentheses indicate the screen resolutions for which that viewer size is recommended. For example, if the user is using the viewer on a 1600×1200 screen, the medium size is recommended. The viewer may choose any viewer size regardless of screen size.

Activity Detection

FIG. 16I shows a detection menu 1616 allows the user to specify regions that the user wants to detect statistically significant motion in. Through the "Select a new detection region" item, the user may specify whether to detect any motion in a user-specified region, upward motion (increasing elevation), downward motion (decreasing elevation), rightward motion (increasing pan) or leftward motion (decreasing pan angle). Once the user has chosen a type of motion, the detection dialogue will be invoked. Multiple detection windows may be specified at the same time (i.e. another detection window may be opened even if another one is already active. The "Load existing detection region" entry allows the user to load the results of a past detection collection. Close all regions tells the viewer to stop all active detection windows.

FIG. 16J illustrates an example detection in progress. In this example, a car has driven through the user-defined detection area (noted by the red brackets in the video view 1104). A breakout window 1620 display a box that flashes red to notify the user that statistically significant motion is occurring in the video window 1104. The flashing will stop when there is no longer motion. The motion is indicate on the activity bar 1110 below the time bar 1604 as a color hatch mark. Detections from multiple windows will be referenced by different colors on the activity bar 1110. The activity bar 1110 is mirrored on the breakout window 1620 below the image as well.

FIG. 16K illustrates loading a detection database. To load the detection results for a detection region scanned at a previous time, or by someone else on another viewer on the network, the user may select "Load existing Detections" from a Detection menu (not shown). A list of existing detection files is displayed, and the user can choose the file and a detection sub-window 1622 is be loaded. The detection sub-window shows the field of view of the detection sub-window, the field of view of the video will jump to the same field of view that it was when the user original specified the detection region. Two buttons on the detection sub-window allow the user to skip to the next detection in time or the previous detection (there are three detections noted on the hash bar shown in FIG. 16K). Clicking the buttons causes both the detection sub-window 1622 and the main viewer 1100 to display imagery corresponding to the selected moment in time. Alternatively, the user may drag the time slider cursor 1602 (FIG. 16C) to the position in time that matches the detection indicators on the activity bar 1100 (FIG. 11) rather than using the next detection or previous detection buttons. Also, the user may click directly on the color detection indicators on the activity bar to jump to that detection time.

Bookmarking Time and Locations in the Wide-Area Scene

FIG. 16L illustrates how a user can set a bookmark corresponding to a particular time or location in the wide-area scene. The user may want to save a particular time and location in the scene to review at a later time, or to share with other users. Bookmarks allow the user to add menu items to the bookmark menu that, when selected, jump the user to a particular place and time in the scene. These bookmarks are populated in all viewers on the network. To create a bookmark, the user selects a bookmark menu 1624 and then clicks on the "add bookmark" menu item. An "add bookmark" dialogue box 1626 appears and the user can type any desired text describing the bookmark and click okay. Subsequently, the bookmark is added to the bookmark menu 1624 and can be selected by any user on the network. Upon selection of a bookmark, the user's viewer 1100 jumps to the interval, time, azimuthal angle, elevation angle, and field of view of the original bookmark.

FIG. 16M shows a pop-up menu 1628 that allows a user to organize his or her bookmarks. To manage the bookmarks that have already been specified, the user may click "Organize Bookmarks" from the bookmarks menu 1624 (FIG. 16L). The user may select different bookmarks with the mouse button and may delete bookmarks individually by clicking on the delete button.

Video Viewports

FIGS. 16N and 16O illustrate video viewports 1632a, 1632b, and 1632c (collectively, viewports 1632) and fenceline videoports 1634, respectively, that provide persistent coverage of fixed regions in the field of view in addition to the view provided by video window 1104 (FIG. 11). To create a viewport 1632 or 1634, the user specifies the desired field of view by cuing the video view to the desired view and selection one of the "Open Video Viewport #" menu items from a viewport menu 1630. The video viewports 1632 display what appears in the specified fields of view at the same moment in time being viewed in the video window. The user may minimize the window (title bar only) by clicking the "hide button" button, and close it by clicking the stop button the video port (or the "X" button).

The user may also specify a long rectangular view of the scene rendered in a panoramic fashion (using an equirectangular mapping, although other mappings may be used) for the monitoring of certain long features, like a fenceline, as shown in FIG. 16). The user selects a fenceline viewport 1634 by opening the viewport menu 1630 and selecting the "Open Fenceline Viewport" menu option.

Display Controls

FIG. 16P shows brightness controls 1640 that control the brightness, or mapping of the already color- and intensity-corrected video data to the screen pixel RGB values, of the images rendered in the context and video views. A linear stretch with shifting offsets are applied to make the imager brighter as the brightness slider cursor is slid upwards, and to make the image darker as the cursor is slid downwards. Other non-linear stretches (such as a power or log functions) may be used as well. To engage a brightness slider 1640, the "Auto" checkbox at the top of the brightness slider should be unchecked. If this checkbox is checked, the viewer may select the optimal stretch amount based on the histogram of the pixels. There are different sliders for the both the context and viewer views so that they can be adjusted independently.

Indoor and Outdoor Installation

The ISIS sensor 200 is appropriate for both indoor and outdoor installation. One example of an indoor installation is the mounting of the sensor to the ceiling of a large indoor public space like an airport terminal or train station, providing video coverage of the entire scene form a high vantage point. The sensor can also be mounted to the wall of an indoor space, providing hemispherical coverage of a room like a convention center. In an indoor basketball arena, the ISIS sensor can be mounted to the bottom of the scoreboard, either as a single sensor or several sub-sensors arranged around the edge of the scoreboard, providing coverage of the seats in the stadium as well as the basketball court itself.

Examples of outdoor installations points include a sensor mounted to a street-lamp or telephone pole overlooking a wide, open area of interest (like a city square, for example). Alternatively, the system can be attached to a mast for temporary emplacement or to the side of a building. Attaching the sensor to the corner of a building may maximize the azimuthal coverage of a wall or building-mounted sensor.

Additional features may be included to make the sensor assembly (camera head) robust to temperature extremes and moisture for outdoor use (as well as indoor use). For example, the interior chamber of the sensor assembly may be hermetically sealed to prevent air from entering or exiting. Grooves in the edges of the exterior shell pieces that form the sensor assembly cut in a way to accommodate O-rings which create the seal between the pieces. Internal dessicants may be used to keep the interior dry and indicate through color indicators the dryness of the interior. Fans between the tiers of boards and lenses circulate air within the camera head to maximize the air flow throughout the interior of the head. An illustrative ISIS camera head may also include heat sinks, such as those designed to be adhered to FPGAs, that pull heat away from the electronics (e.g., imager boards).

Figure 17A:
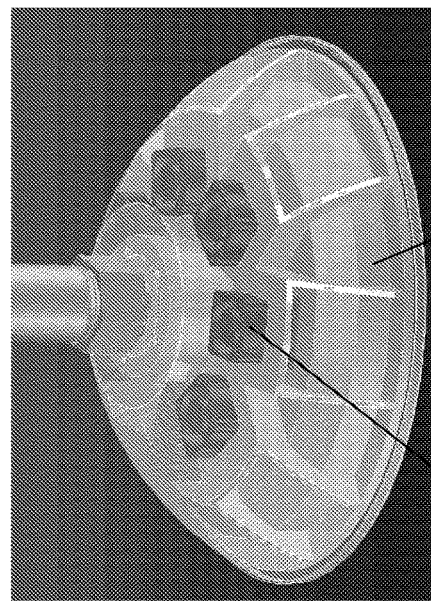
FIGS. 17A-17C illustrates aspects of an ISIS cooling system according to embodiments of the present invention.
Figure 17B:
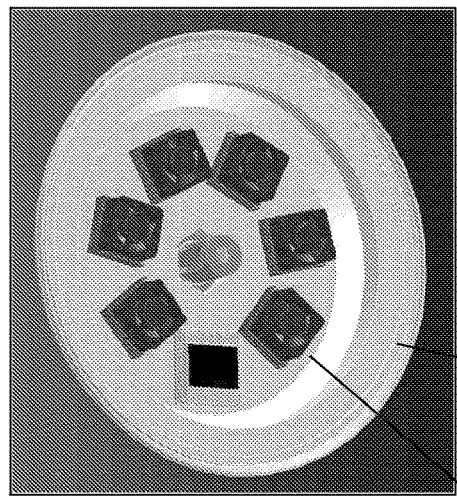
Figure 17C:
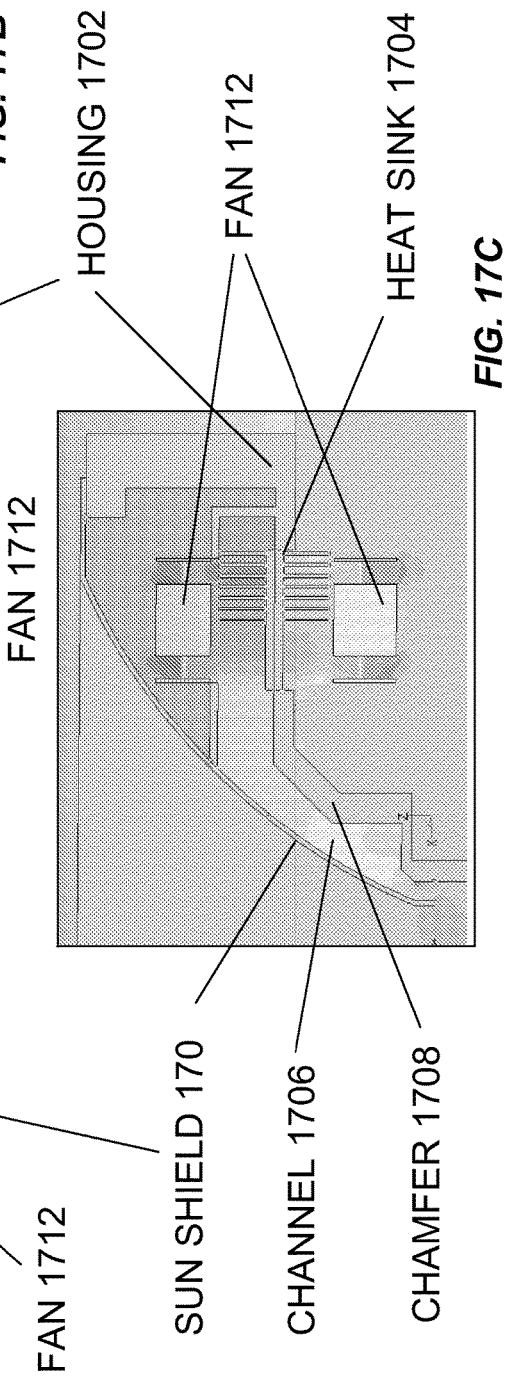

FIGS. 17A-17C illustrate a housing 1702 that holds the arrays of cameras (not shown) in the sensor assembly (camera head). It may be populated with one or more heat exchangers 1704 that have fins on both the interior, exterior, or both the interior and exterior of the camera head 200. One or more fans 1712 may be arranged blow directly on to the heat exchangers 1704 to pull heat from inside the camera head 200 to a space above the camera head 200 and increase the sensor heat transfer coefficient. The fans and heat exchangers can be covered by a rounded aluminum sun shield 1710 that extends slightly beyond the edge of the housing 1702 to minimize rain runoff onto the camera windows and to reflect heat and solar radiation from the camera head 200. The air between the fans and the sun shield can be circulated through separate intake and exhaust ports that accept and expel air, respectively, from a channel 1706 through a gap between the sun shield and the sensor. One or more chamfers 1708, or beveled edges that connect different surfaces, are disposed within the airflow channels 1706 to reduce exit losses. In some examples, the separate ports prevent hot and cool air from mixing. The sun shield 1710 may also include an overhang to prevent rain and wind from blowing water laterally or downward into the gap.

The rate of airflow and the size and rating of the heat exchangers may be chosen in such way as to maintain a desired difference in temperature between the interior and exterior of the camera head. For instance, the heat exchangers may be chosen so the interior temperature should not exceed the operating range of the interior components for a given ambient temperature operating range.

Mobile Surveillance Solution

The system, including sensor, storage/processing cluster, and viewer station may be packaged as a single mobile surveillance solution for either indoor or outdoor use. The system can be mounted on an adjustable, portable mast and adjusted to the desired height. The processing cluster and viewing stations can reside in a mobile truck or trailer, with power supplied by a generator or local power outlet. The fiber bundle can be run over the desired distance to the mobile trailer or truck. In this way, the mobile mast, truck/trailer, and generator form a mobile, high-resolution, wide-area surveillance solution that can be moved from site to site as desired.

Processing Architecture

The processing architecture described above includes registration, rendering/warping, detection and tracking and the associated detection and tracking databases on the client-side processing chain. Each of these processing areas could also be performed on the server-side processing chain as well. For example, object detection could be performed on the data as it arrives from the camera, and before it is written to disk. Later, the client can request data from the detection database via the networked link. Likewise, some processing that occurs on the server side, such as color balancing, gain correction, and demosaicing, can be performed on the client side.

Processing in Hardware Versus Software

In the current implementation, many of the processing functions are implemented in software in languages like C and C++, whereas other processing functions, like image compression, are implemented on Application Specific Integrated Circuits (ASICs) or Field Programmable Gate Arrays (FPGAs). It should be noted that the ISIS architecture does not require that any particular part of the processing be performed in software or hardware. For example, image registration and rendering can be performed on graphics processing units (GPUs), and image demosaicing can be performed on an FPGA. Compression can be performed in software if desired.

Data Link Between the Server Cluster and Client PC

While the system described is a wired, gigabit ethernet link, the link between the server cluster and client PC may be any packet-switching based network, including wireless and wired links. A wireless link would make a physical connection between the client PCs and server cluster unnecessary, for example. Other links, for example, free space optical links, might also be used.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An interface for a surveillance system that monitors a scene, the surveillance system comprising:
    a panoramic camera to acquire a real-time panoramic image of the scene;
    an array of cameras, each camera having a respective field of view and configured to provide respective first images of a corresponding portion of the scene, each first image being registered to the real-time panoramic image; and
    a display, operably coupled to the panoramic camera and the array of cameras, to display the interface, the interface comprising:
        a full-scene view configured to render the real-time panoramic image of the entire scene monitored by the surveillance system and acquired by the panoramic camera; and
        a zoom view configured to render a close-up of a region of the panoramic view, the close-up formed by registering, with respect to each other, and blending together at least portions of two first images acquired by at least two different cameras in the array of cameras,
        wherein the blending is implemented by first introducing an opacity mask for each pixel in the at least portions of the two first images based on a location of each pixel and then blending the opacity masks together.

2. The interface of claim 1 wherein the full-scene view is further configured to enable a user to select a region of the scene for display in the zoom view.

3. The interface of claim 1 wherein the interface is further configured to enable at least one user to set at least one zone in the panoramic image to be monitored for activity.

4. The interface of claim 3 wherein the interface is further configured to alert the at least one user upon detection of activity in the at least one zone.

5. The interface of claim 3 wherein the interface is further configured to populate an activity database with an indication of detected activity in the at least one zone.

6. The interface of claim 5 further comprising:
    an activity view configured to display the indication of detected activity to the at least one user in a manner that indicates a time and a location of the detected activity.

7. The interface of claim 5 wherein the interface is further configured to display images of detected activity in at least one of the full-scene view and the zoom view.

8. The interface of claim 3 wherein the interface is further configured to track a target throughout the scene and to display an indication of the target's location in at least one of the full-scene view and the zoom view.

9. The interface of claim 8 wherein the interface is further configured to enable a user to select the target.

10. The interface of claim 9 wherein the interface is further configured to display a pre-warped image in at least one of the full-scene view and the zoom view.

11. The interface of claim 1, wherein the zoom view is configured to provide virtual pan, tile, and zoom.

12. The interface of claim 11, wherein the zoom view is configured to render the close-up of the region at a first point angle in response to a first user input and at a second point angle in response to a second user input.

13. A surveillance system comprising:
    a panoramic camera to acquire a real-time panoramic image of a scene;
    an array of cameras, each camera having a respective field of view and configured to provide respective first images of a corresponding portion of the scene, each first image being registered to the real-time panoramic image;
    a display, operably coupled to the panoramic camera and the array of cameras, to display the interface, the interface comprising:
        a full-scene view configured to render the real-time panoramic image of the entire scene monitored by the surveillance system and acquired by the panoramic camera; and
        a zoom view configured to render a close-up of a region of the panoramic view, the close-up comprising at least portions of two first images acquired by at least two different cameras in the array of cameras; and
    a processor, operably coupled to the panoramic camera and the array of cameras, to register each first image to the real-time panoramic image by:
        projecting each first image onto a spherical plane to generate each first projected image,
        projecting the real-time panoramic image onto the spherical plane to generate a projected panoramic image,
        generating a planar projection of each first projected image and the projected panoramic image on a tangent plane, and
        registering each first image to the real-time panoramic image based at least in part on at least one robust image feature between each first image and the real-time panoramic image.

14. A surveillance system comprising:
    a panoramic camera to acquire a real-time panoramic image of a scene;
    an array of cameras, each camera having a respective field of view and configured to provide respective first images of a corresponding portion of the scene, each first image being registered to the real-time panoramic image;
    a display, operably coupled to the panoramic camera and the array of cameras, to display the interface, the interface comprising:
        a full-scene view configured to render the real-time panoramic image of the entire scene monitored by the surveillance system and acquired by the panoramic camera; and
        a zoom view configured to render a close-up of a region of the panoramic view, the close-up comprising at least portions of two first images acquired by at least two different cameras in the array of cameras;
    a processor operably coupled to the panoramic camera and the array of cameras and configured to decompose the real-time panoramic image and the first images into image tiles and to compress the image tiles at each of a plurality of resolutions; and
    a server operably coupled to the processor and configured to receive a request for an image of a particular portion of the scene and to serve one or more image tiles at a minimum resolution in the plurality of resolutions to render the image on the display in response to the request for the image of the particular portion of the scene.

15. The surveillance system of claim 14, wherein the server is configured to determine the minimum resolution based on the particular portion of the scene and a resolution of the display.

* * * * *